(12) United States Patent
Sato et al.

(10) Patent No.: US 7,209,422 B2
(45) Date of Patent: Apr. 24, 2007

(54) OPTICAL DISC RECORDING METHOD AND OPTICAL DISC REPRODUCING METHOD

(75) Inventors: Takahiro Sato, Mino (JP); Takashi Yumiba, Kyotanabe (JP); Takahiro Nagai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 450 days.

(21) Appl. No.: 10/493,249

(22) PCT Filed: Oct. 25, 2002

(86) PCT No.: PCT/JP02/11083

§ 371 (c)(1),
(2), (4) Date: Apr. 21, 2004

(87) PCT Pub. No.: WO03/036641

PCT Pub. Date: May 1, 2003

(65) Prior Publication Data

US 2004/0246866 A1    Dec. 9, 2004

(30) Foreign Application Priority Data

Oct. 25, 2001  (JP) ............................. 2001-327339

(51) Int. Cl.
  *G11B 20/10*    (2006.01)
(52) U.S. Cl. ................ 369/59.12; 369/59.23; 369/59.25
(58) Field of Classification Search ............. None
See application file for complete search history.

(56) References Cited

U.S. PATENT DOCUMENTS

| 5,572,507 | A * | 11/1996 | Ozaki et al. ............. 369/53.21 |
| 6,665,240 | B1 * | 12/2003 | Kobayashi et al. ....... 369/59.24 |
| 6,735,160 | B1 * | 5/2004 | Miyashita et al. ........ 369/59.12 |
| 2002/0118565 | A1 * | 8/2002 | Matsuo ........................ 365/94 |
| 2006/0031868 | A1 * | 2/2006 | Yamaoka et al. ........... 720/718 |

FOREIGN PATENT DOCUMENTS

| JP | 11-126426 | 5/1999 |
| JP | 2001-28128 | 1/2001 |
| JP | 2002-324362 | 11/2002 |

* cited by examiner

Primary Examiner—Thang V. Tran
(74) Attorney, Agent, or Firm—Wenderoth, Lind & Ponack, L.L.P.

(57) ABSTRACT

An optical disc recording method is provided for superimposing sub information by displacing edges of one or more optically-readable recording marks by a minute amount on the basis of a binary sequence code, when recording main information by forming said one or more recording marks, the optical disc recording method including a sequence generation step of generating a first binary sequence code and a second binary sequence code that is different from the first binary sequence code; a first displacement step of displacing one of the edges according to the first binary sequence code; and a second displacement step of displacing another of the edges according to the second binary sequence code.

73 Claims, 31 Drawing Sheets

OPTICAL DISC RECORDING METHOD AND OPTICAL DISC REPRODUCING METHOD

TECHNICAL FIELD

The present invention relates to a method for recording information onto an optical disc and a method for reproducing information recorded on an optical disc, and more particularly to an optical disc recording method for superimposing sub information into main information at the time of recording such main information and to an optical disc reproduction method for reproducing such sub information.

BACKGROUND ART

Optical discs represented by DVDs (Digital Versatile/Video Discs) are commonly used media capable of storing a large amount of digital data such as AV (Audio Video) data and computer data. For example, high-quality video which is over two hours in length is recorded on read-only optical discs and available on the market. In order to prevent such digital copyrighted works from being illicitly copied onto other recording media, a method known as content encryption is employed (See "Nikkei Electronics" Nov. 18 (1996): 13~14).

In the above method, compressed digital content such as movie content is encrypted by the use of three-layered secret keys (title key, disc key, and master key) and recorded in a user information area accessible by a user. Of these secret keys, the master key, which is most important of all, is notified only to a licensed authorized manufacturer, whereas the disc key and the title key required for each DVD and title are encrypted on the basis of the master key and stored in a control information area inaccessible by a user. This prevents a user's access to the secret keys required for decryption, and therefore an unauthorized copying such as by means of file copying cannot be carried out.

However, the above method allows encrypted content to be decrypted and reproduced by ordinary reproduction apparatuses, when the whole contents of a recording area including the control information area in which the secret keys are recorded is illicitly copied onto another optical disc.

In response to this problem, there is a method for recording sub information onto an optical disc that stores main information such as digital content and the like by means of phase modulation to displace standard edge positions of recording marks that constitute the main information in the track direction by a minute amount (See Japanese Laid-Open Patent publication No. 2001-357533 and Japanese Laid-Open Patent publication No. 2002-203374).

FIG. 1 is a signal waveform diagram illustrating the above recording method.

In this method, PE modulation is performed on a sub information correlation random number sequence obtained by carrying out exclusive OR between a pseudo random number sequence (random number sequence) and sub information to be recorded. When a resulting PE modulated signal is "H", the edge of a standard recording mark is advanced by a small amount (Δt) in the track direction, whereas when the PE modulated signal is "L", the edge of a standard recording mark is delayed by a small amount (Δt) in the track direction, so as to record a modulated recording mark including main information and sub information onto an optical disc.

Accordingly, since sub information superimposed on the edges of modulated recording marks cannot be copied even if the whole contents of a recording area including the control information area is illicitly bit-copied onto another optical disc, it becomes impossible for an ordinary reproduction apparatus and the like to decrypt an illicitly copied optical disc, by recording information including a secret key as sub information. Furthermore, by setting the amount of mark edge displacement Δt to a value smaller than or equal to a value represented by the following equation, it is possible to minimize an influence on existing reproduction apparatuses which are not capable of reading out sub information:

$$\sqrt{(\text{Allowable jitter of optical disc})^2 - (\text{Jitter only of main information on optical disc})^2}$$

FIG. 2 is a data structure diagram showing the data structure of an optical disc 2200 on which information has been recorded using the above method.

As FIG. 2 shows, the optical disc 2200 has a sector structure in which a certain number of data is included for recording main information. Moreover, respective ECC blocks j1, j2, . . . are made up of 16 sectors i0~i15.

Each of the sectors i0~i15 in an ECC block is comprised of 26 frames f0~f25 made up of synchronization areas and data areas 2204 storing main information.

Each of the synchronization areas sy0~sy25 is intended for generating a timing signal for reproducing their respective contiguous data areas 2204 on a byte-by-byte basis, and each data area 2204 is demodulated every 16-channel bits on the basis of the timing indicated by a timing signal so as to obtain main information. An address ID 2206 for identifying the sector i10 is placed at the top of a data area 2204 of the top frame f0, and such address ID 2206 is used at the time of reproduction to find a sector to be read out.

In FIG. 2, sub information sdb0~sdb7 are superimposed only on recording marks in the data areas 2204 included in 24 frames f1~f24 except for the top frame f0 (the frame that includes the address ID 2206) and the last frame f25 in the sector i10, and 1-bit sub information sdb0~sdb7 are superimposed on a plurality of frames (three frames in FIG. 2). For example, sub information sdb3 is superimposed on recording marks that constitute data areas 2204 of the frames f10~f12. As a result, 8-bit sub information is recorded per sector, and 16-byte sub information is recorded per ECC block.

As described above, the existing recording method utilizes the fact that main information is recorded in a distributed manner in a plurality of frames which are made up of synchronization areas and data areas, in order to correctly reproduce sub information subsequent to the synchronization areas even when bit misalignment occurs in the data areas due to flaw, dust, fingerprints and other factors on the surface of an optical disc, by detecting the synchronization areas and initializing the random number sequence always with an identical initial value.

Referring to FIG. 3, an explanation is given of the structure of an ECC block.

An ECC block is comprised of main information data 2301, a parity A2302, and a parity B2303. Assuming that consecutive 172 bytes are equivalent to one row in the main information data 2301 on an optical disc, 16-byte Reed-Solomon code parity A2302 is added to each 192-byte main information data made up of 172 columns, and an inner code 2304 is formed. Furthermore, 10-byte parity B2303 is added to each 172-byte data made up of 208 rows which is a combination of the main information data 2301 and the parity A, and an outer code 2305 is formed.

As shown above, an ECC block in an optical disc is made up of a product code of an inner code 2304 and an outer code 2305. Since the minimum distances of the outer code 2305 is 17 and the inner code 2304 is 11, the inner code 2304 is capable of correcting an 8-byte error and the outer code 2305 is capable of correcting a 5-byte error. Furthermore, by utilizing extinction correction, the inner code 2304 which is a vertical code, is capable of correcting a 16-byte error.

However, such existing technology, which uses a fixed value for initializing random number sequences as explained with reference to FIG. 2, has a problem that the whole sub information will be illicitly detected if those who illegally attempt to detect sub information discover an initial value that generates a random number sequence strongly correlated with a random number sequence which is actually used for the superimposition of sub information.

Furthermore, although main information can be reproduced even when a burst error occurs because of the reason that a burst error up to 16 rows can be corrected in the vertical direction through an error correction as explained in FIG. 3, sub information, which is recorded in consecutive frames, is likely to become unable to be reproduced due to bit misalignment or other factors. This means that there arises a problem that reliability concerning reproduction will be decreased.

In other words, the aforementioned existing example has a problem that sub information is vulnerable to unauthorized detection and is easy to become unable to be reproduced. This is the problem that decreases reliability.

The present invention has been conceived in view of the above problem, and it is an object of the present invention to provide an optical disc recording method and an optical disc reproduction method with increased reliability. More specifically, the first object of the present invention is to provide an optical disc recording method and an optical disc reproduction method capable of preventing unauthorized detection of sub information, and the second object of the present invention is to provide an optical disc recording method and an optical disc reproduction method capable of reproducing sub information even in the event of a burst error.

SUMMARY OF THE INVENTION

In order to achieve the first object, the optical disc recording method according to the present invention is an optical disc recording method for superimposing sub information by displacing edges of one or more optically-readable recording marks by a minute amount on the basis of a binary sequence code, when recording main information by forming said one or more recording marks, the optical disc recording method comprising: a sequence generation step of generating a first binary sequence code and a second binary sequence code that is different from the first binary sequence code; a first displacement step of displacing one of the edges according to the first binary sequence code; and a second displacement step of displacing another of the edges according to the second binary sequence code.

Accordingly, even if a binary sequence code which is strongly correlated with a binary sequence code used for superimposing some of the sub information is discovered, since another binary sequence code is used for superimposing another sub information, it is possible to prevent such binary sequence code strongly correlated with said binary sequence code from being discovered and therefore the whole sub information from being illegally detected. As a result, increased reliability of the detection of sub information can be achieved.

Here, the optical disc recording method according to the present invention may further comprise a main information division step of dividing the main information into a plurality of consecutive frames, and in the first and second displacement steps, the edges may be displaced so that M-bit (M is a natural number) sub information is superimposed on N (N is a natural number) of the frames.

Accordingly, it becomes possible to record sub information on an N-frame basis.

Also, in the optical disc recording apparatus, in the first and second displacement steps, the N frames may be consecutive.

Accordingly, sub information can be reproduced from consecutive frames, allowing the configuration of an optical disc reproduction apparatus to be simple.

Moreover, in the above optical disc recording method, in the first displacement step, said one of the edges of any one of the plurality of frames may be displaced on the basis of the first binary sequence code, and in the second displacement step, said another of the edges of another one of the plurality of frames may be displaced on the basis of the second binary sequence code.

Accordingly, since a binary sequence code used for edge displacement is changed between the first binary sequence code and the second binary sequence code on a frame-by-frame basis, it is possible to change binary sequence codes easily by the use of an existing recording method in which main information is divided and recorded in a plurality of frames.

Here, in order to achieve the second object, in the above optical disc recording apparatus, in the first and second displacement steps, the N frames may be inconsecutive, and the edges may be displaced so that identical M-bit sub information is superimposed on each of said frames.

Accordingly, since sub information is recorded in a distributed manner, it is possible to reproduce sub information superimposed on frames other than one where a burst error occurs, and therefore to further improve reliability from the standpoint of sub information reproduction, even in the event of a burst error.

Furthermore, the optical disc recording apparatus according to the present invention is an optical disc recording method for superimposing sub information by displacing an edge of an optically-readable recording mark by a minute amount on the basis of a binary sequence code, when recording main information by forming said recording mark, the optical disc recording method comprising: a main information division step of dividing the main information into a plurality of consecutive frames; and a displacement step of displacing the edge so that identical M-bit (M is a natural number) sub information is superimposed on each of N (N is a natural number) of the frames which are inconsecutive.

Accordingly, since sub information is recorded in a distributed manner, it is possible to reproduce sub information superimposed on frames other than one where a burst error occurs and therefore to improve the reliability of sub information reproduction even in the event of a burst error.

Note that it is also possible to embody the present invention as an optical disc on which information is recorded by the use of the above optical disc recording method, as an optical disc recording apparatus for recording information on an optical disc using said recording method, and as an optical disc reproduction method and an optical disc reproduction apparatus for reproducing an optical disc on which information is recorded by such recording apparatus.

DETAILED DESCRIPTION OF THE INVENTION

First Embodiment

The following explains an optical disc recording apparatus according to the first embodiment of the present invention with reference to the figures.

Figure 1:
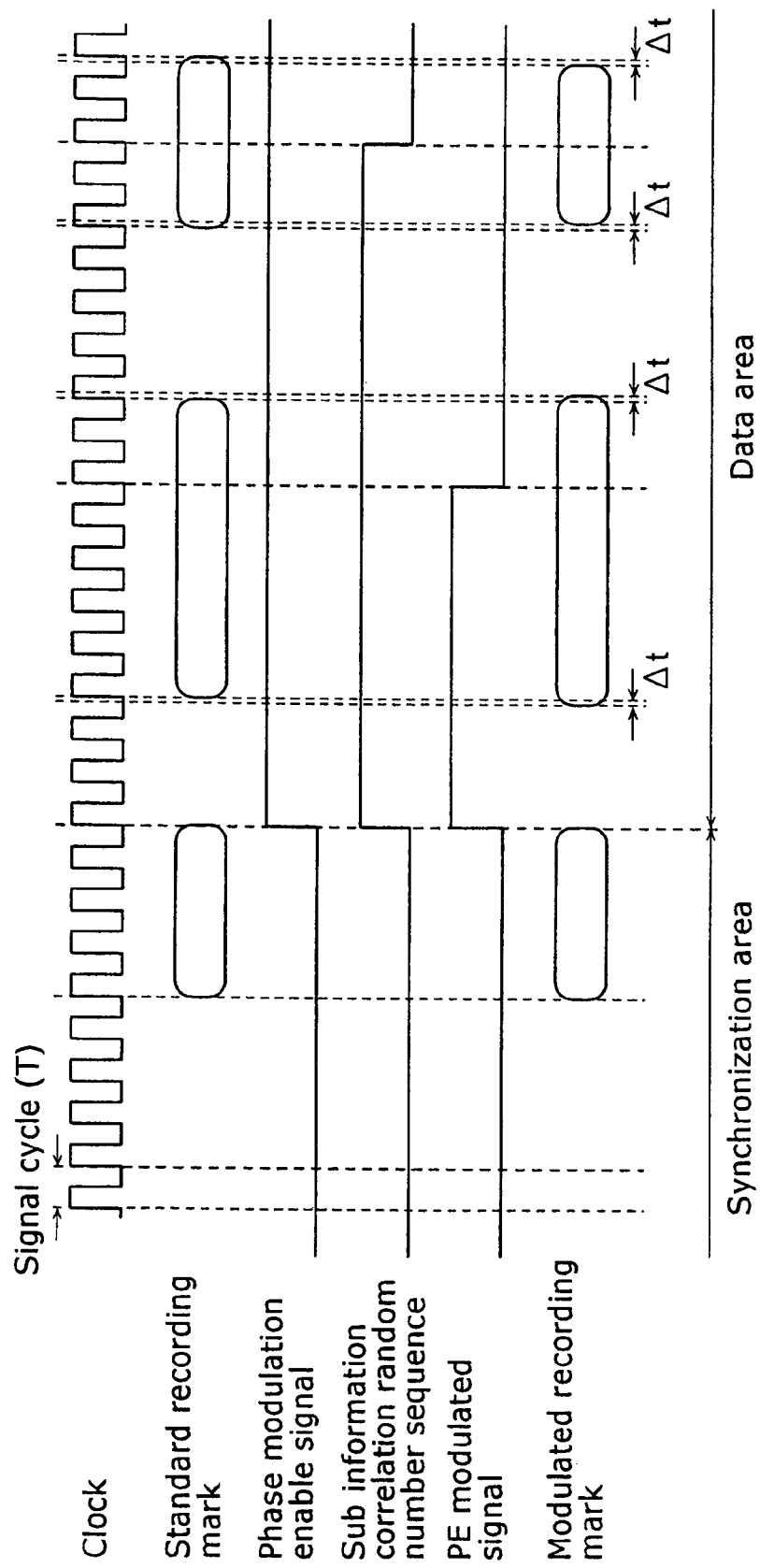
FIG. 1 is a signal waveform diagram showing a recording method used for an optical disc.
Figure 2:
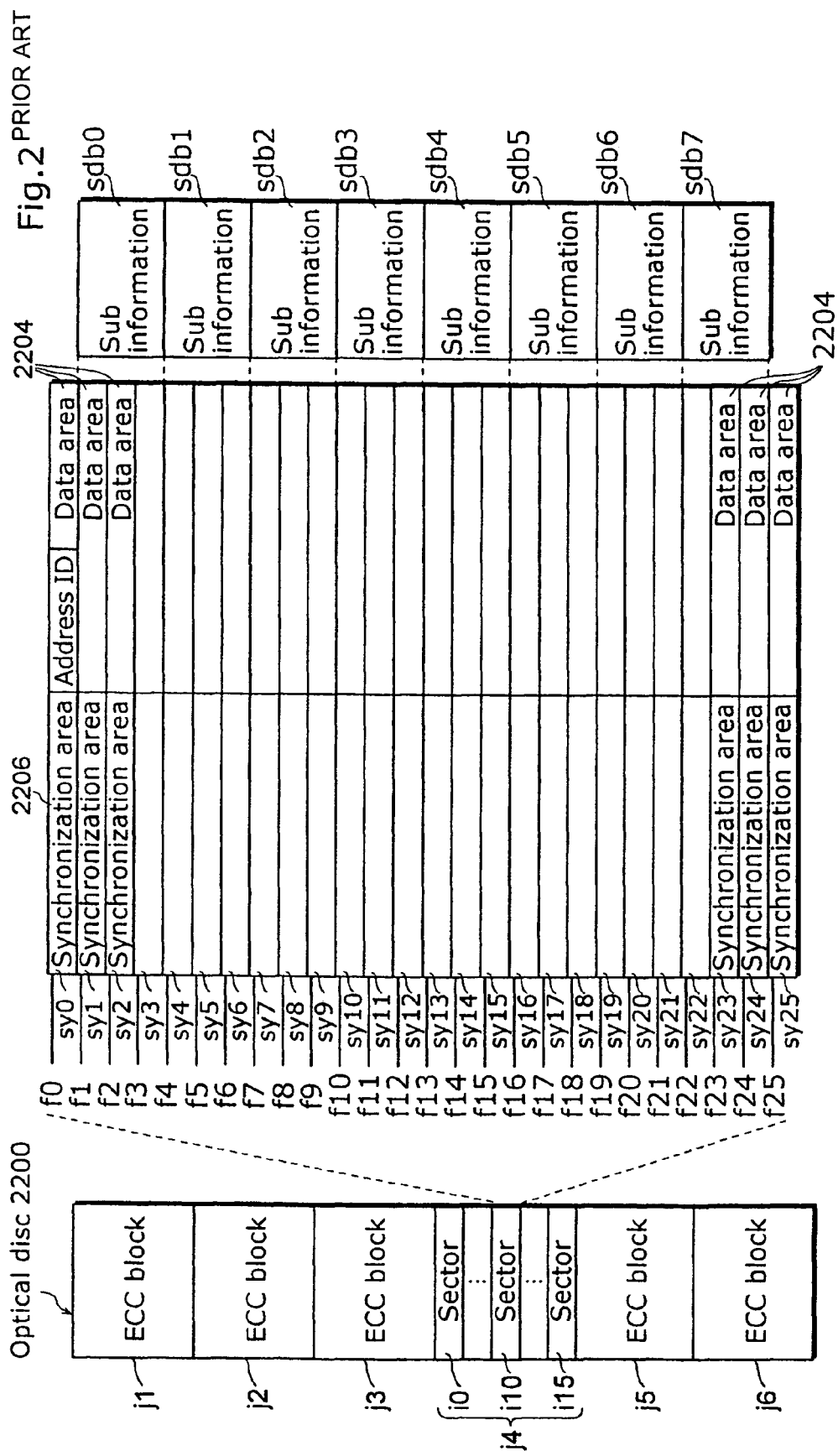
FIG. 2 is a data structure diagram showing a data structure of an optical disc on which information has been recorded using an existing method.
Figure 3:
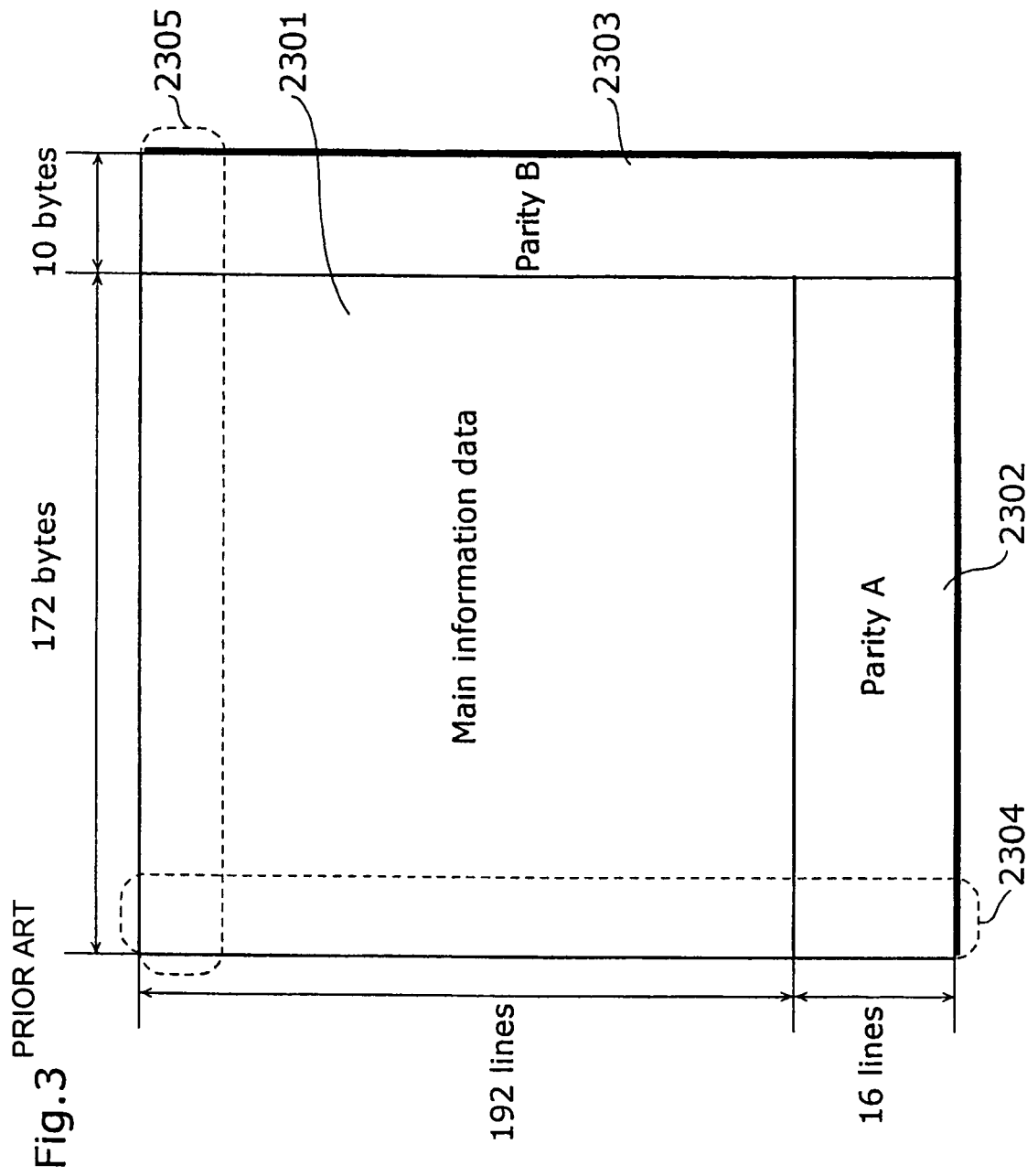
FIG. 3 is a structure diagram showing a structure of an ECC block in an optical disc.
Figure 4:
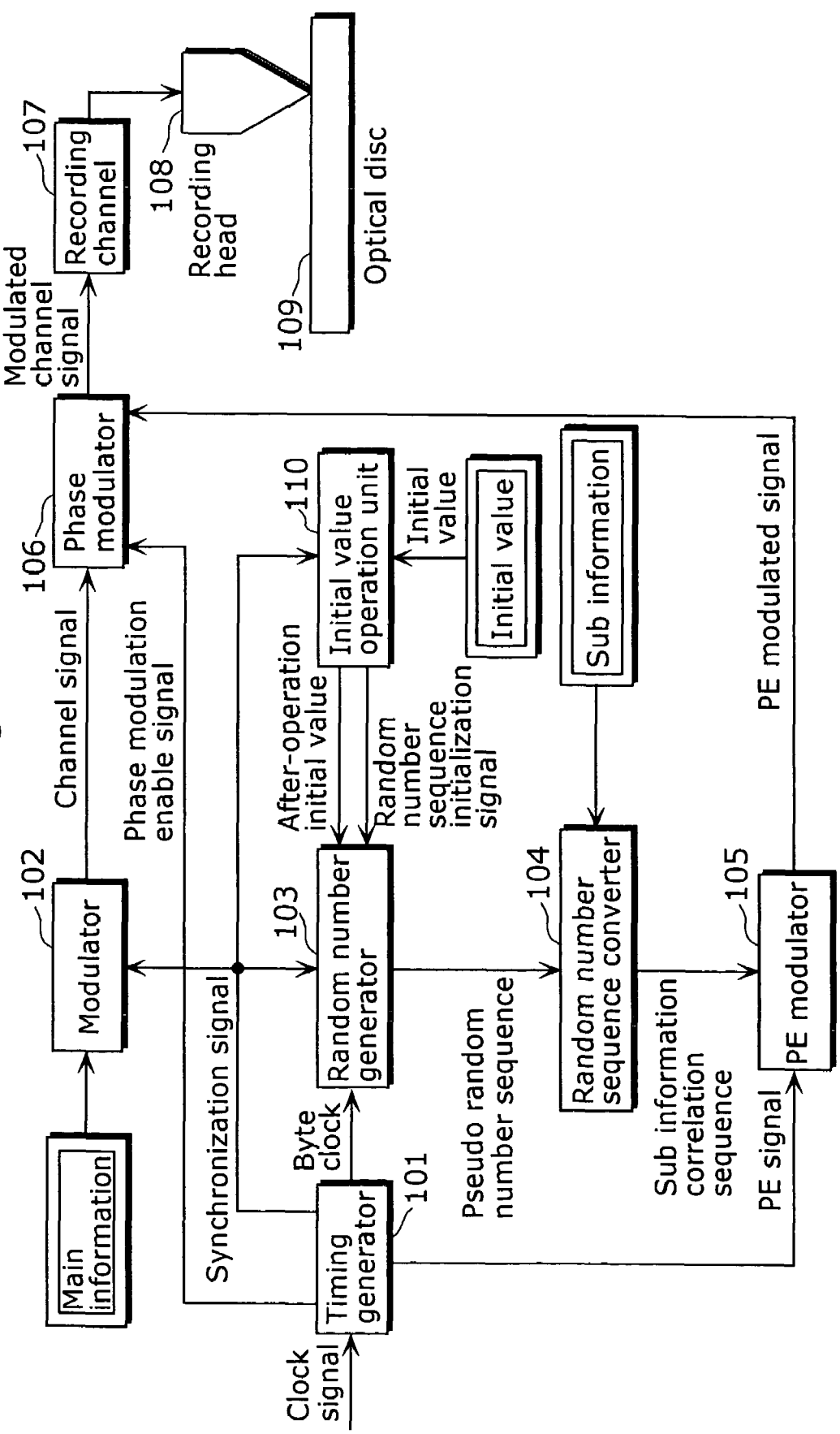
FIG. 4 is a block diagram showing a configuration of an optical disc recording apparatus according to a first embodiment of the present invention.

FIG. 4 is a block diagram showing the configuration of the optical disc recording apparatus according to the first embodiment of the present invention.

This optical disc recording apparatus, which records main information not only by forming optically-readable recording marks, but also by superimposing sub information on main information as watermark information in the course of recording such main information, by means of phase modulation to advance and delay the edge phases of recording marks that constitute data other than synchronization areas.

More particularly, this optical disc recording apparatus is characterized by recording each sub information by associating it with a random number sequence that has been initialized with an initial value which differs on a unit recording frame basis. Note that, in the optical disc recording apparatus of the present embodiment, 3 frames shall be the unit recording frame, and 1-bit sub information shall be superimposed and recorded on 3 frames in which main information is recorded.

As shown in FIG. 4, such an optical disc recording apparatus is comprised of a timing generator 101, a modulator 102, a random number generator 103, a random number sequence converter 104, a PE (Phase Encoding) modulator 105, a phase modulator 106, a recording channel 107, a recording head 108, and an initial value operation unit 110.

The timing generator 101 outputs, to the modulator 102, the random number generator 103, and the initial value operation unit 110, a synchronization signal indicating timing at which synchronization patterns should be inserted into recorded data, when receiving a notification instructing that the recording of main information and sub information should be started from a controller or the like not illustrated in the diagram. Furthermore, based on such synchronization signal and a clock signal, the timing generator 101 outputs a byte clock (which is a 16th of the frequency of the clock signal) synchronized with each byte of the recorded data, and outputs, to the PE modulator 105, a PE signal at the same time that allows H intervals and L intervals to be half and half in each byte. Furthermore, the timing generator 101 outputs, to the phase modulator 106, a phase modulation enable signal indicating an area where sub information should be recorded.

The modulator 102 inserts the synchronization patterns into the recorded data, which is input main information, on the basis of the synchronization signal from the timing generator 101. At the same time, the modulator 102 generates a channel signal by performing NRZI conversion on such main information after converting it into a corresponding 16-bit code every 8-bit code (byte), and outputs such channel signal to the phase modulator 106.

The initial value operation unit 110 generates a random number sequence initialization signal according to the synchronization signal from the timing generator 101, performs an operation on an initial value at that timing, and outputs a resulting after-operation initial value and the random number sequence initialization signal to the random number generator 103.

Figure 5:
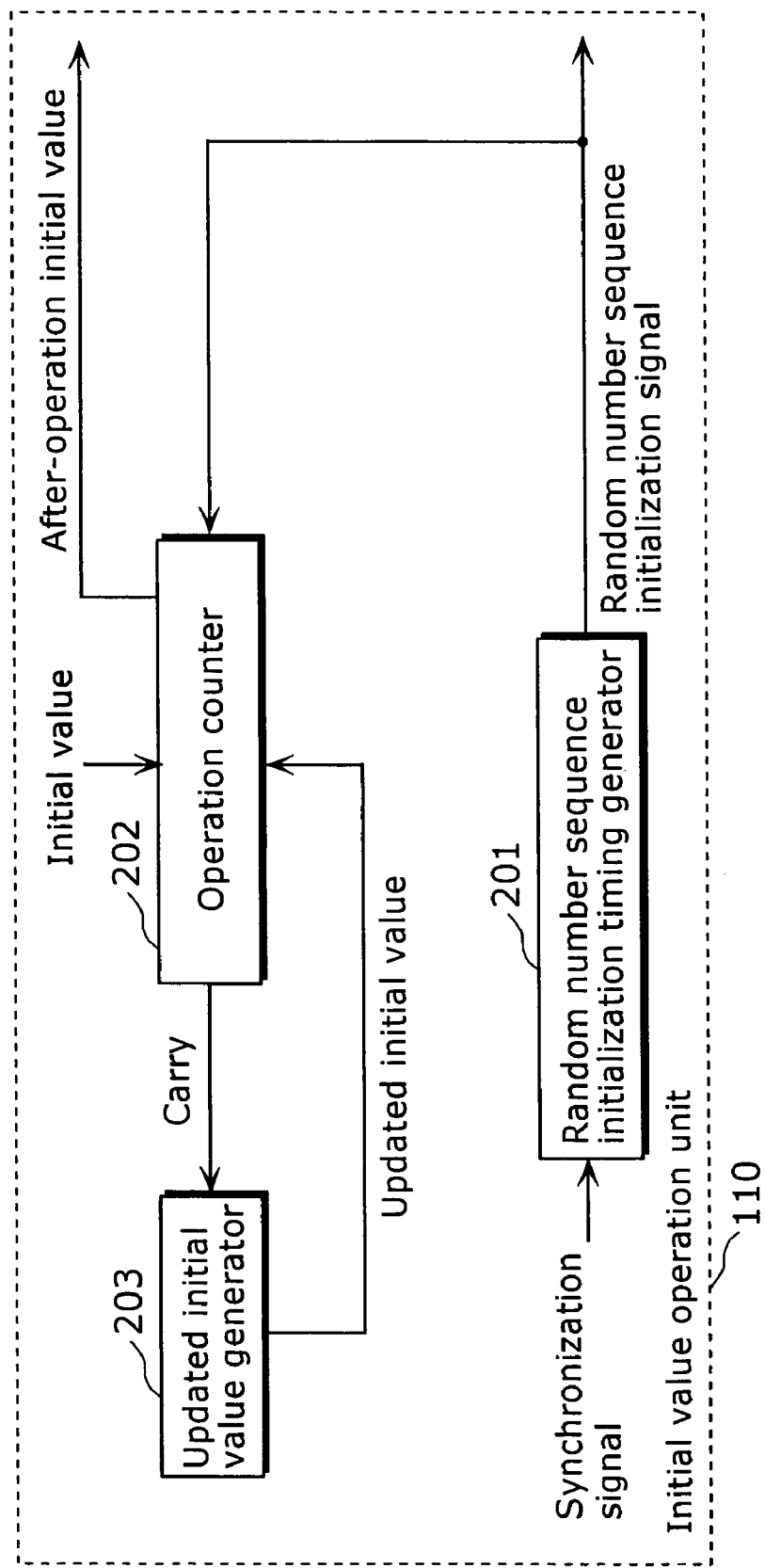
FIG. 5 is a block diagram showing a configuration of an initial value operation unit in the optical disc recording apparatus according to the first embodiment of the present invention.

FIG. 5 is a block diagram showing a detailed configuration of the initial value operation unit 110.

This initial value operation unit 110 is comprised of a random number sequence initialization timing generator 201, an operation counter 202, and an updated initial value generator 203.

On the first detection of "H" in the synchronization signal obtained from the timing generator 101, the random number sequence initialization timing generator 201 generates a random number sequence initialization signal. After this, the random number sequence initialization timing generator 201 generates a random number sequence initialization signal every three times "H" in the synchronization signal obtained from the timing generator 101 is detected.

The operation counter 202, after outputting the input initial value as an after-operation initial value to the random number generator 103 at the timing indicated by the random number sequence initialization signal, adds "1" to such after-operation initial value and holds the resulting value. Then, when a random number sequence initialization signal is outputted next time, the operation counter 202, after outputting the value it holds to the random number generator 103 as an after-operation initial value at such timing, adds "1" to that value repeatedly.

When a carry to be occurring due to an overflow in the operation counter 202 is inputted, the updated initial value generator 203 outputs an updated initial value to the operation counter 202 and updates the value held in the operation counter 202, in order to prevent the occurrence of all zero due to an overflow caused by a result of an addition performed in the operation counter 202. Note that the updated initial value in the present embodiment shall be "0x0001". Here, "0x" denotes hexadecimal.

Assume that "0xAB12" is provided to the operation counter 202 as an initial value. When a random number sequence initialization signal is inputted to the operation counter 202, "1" is added to "0xAB12" held in the operation counter 202 after the initial value "0xAB12" is outputted to the random number generator 103 as an after-operation initial value, and the resultant will be "0xAB13". Next, assume that "0xFFFF" is inputted to the operation counter 202 as an initial value. When a random number sequence initialization signal is inputted to the operation counter 202, the value held in the operation counter 202 will be "0x0000" after "0xFFFF" is outputted to the random number generator 103 as an after-operation initial value. Here, since an overflow occurs in the operation counter 202, a carry is outputted to the updated initial value generator 203. Then, an updated initial value "0x0001" is outputted by the updated initial value generator 203 to the operation counter 202, and the value held in the operation counter 202 is updated to "0x0001".

Figure 6:
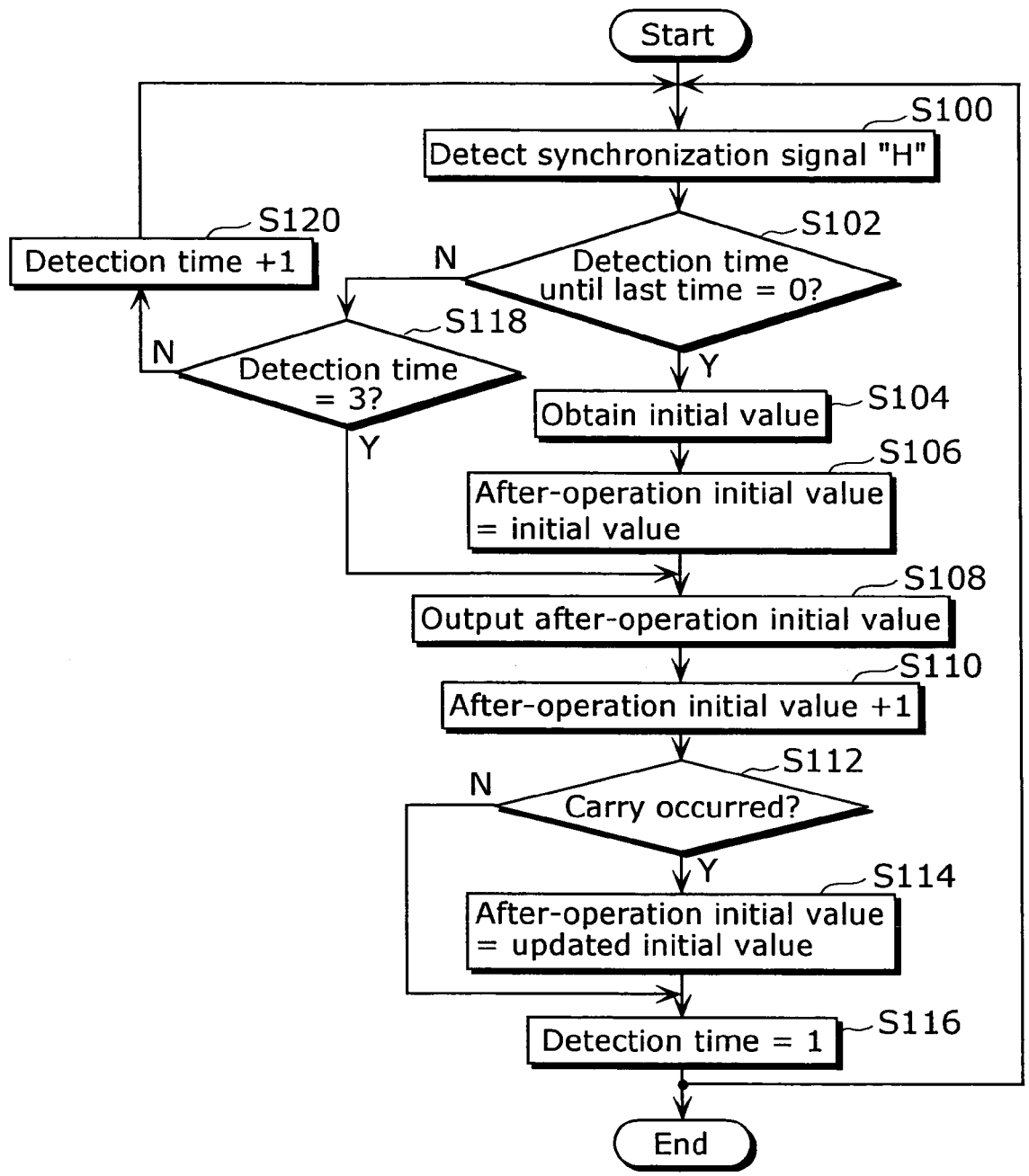
FIG. 6 is a flowchart showing an operation of the initial value operation unit in the optical disc recording apparatus according to the first embodiment of the present invention.

FIG. 6 is a flowchart showing the operation of the initial value operation unit 110 with the above configuration.

First, when the random number sequence initialization timing generator 201 detects "H" in the synchronization signal (Step S100), a judgment is made on whether the number of times "H" has been detected before such detection is "0" or not (Step S102).

When judging that the number of detections is "0" (Y in Step S102), the random number sequence initialization timing generator 201 outputs a random number sequence initialization signal to the operation counter 202. As a result, the operation counter 202 obtains an initial value (Step S104), holds such initial value as an after-operation initial value (Step S106), and outputs such after-operation initial value to the random number generator 103 (Step S108). Note that the above-mentioned number of detections is set to "0" in advance as the default.

Subsequently, the operation counter 202 adds "1" to the aforementioned after-operation initial value, and holds the resultant (Step S110). Here, when a carry occurs due to the above addition (Y in Step S112), the operation counter 202 requests an updated initial value from the updated initial value generator 203 and obtains such value, and holds such updated initial value as an after-operation initial value (Step S114). Then, the random number sequence initialization timing generator 201 recognizes that the number of detections is "1" (Step S116).

Also, when the random number sequence initialization timing generator 201 detects "H" in the synchronization signal again (Step S100), the random number sequence initialization timing generator 201, after judging that the number of detections is not "0" (N in Step S102), judges whether the number of detections is "3" or not (Step S118).

Here, when judging that the number of detections is not "3" (N in Step S118), the random number sequence initialization timing generator 201 adds "1" to the number of detections (Step S120). Meanwhile, when judging that the number of detections is "3" (Y in Step S118), the random number sequence initialization timing generator 201 causes the operation counter 202 to output the after-operation initial value held in such operation counter 202 to the random number generator 103 by outputting a random number sequence initialization signal to the operation counter 202 (Step S108). After this, the above operation starting from Step S110 is repeated.

Figure 7:
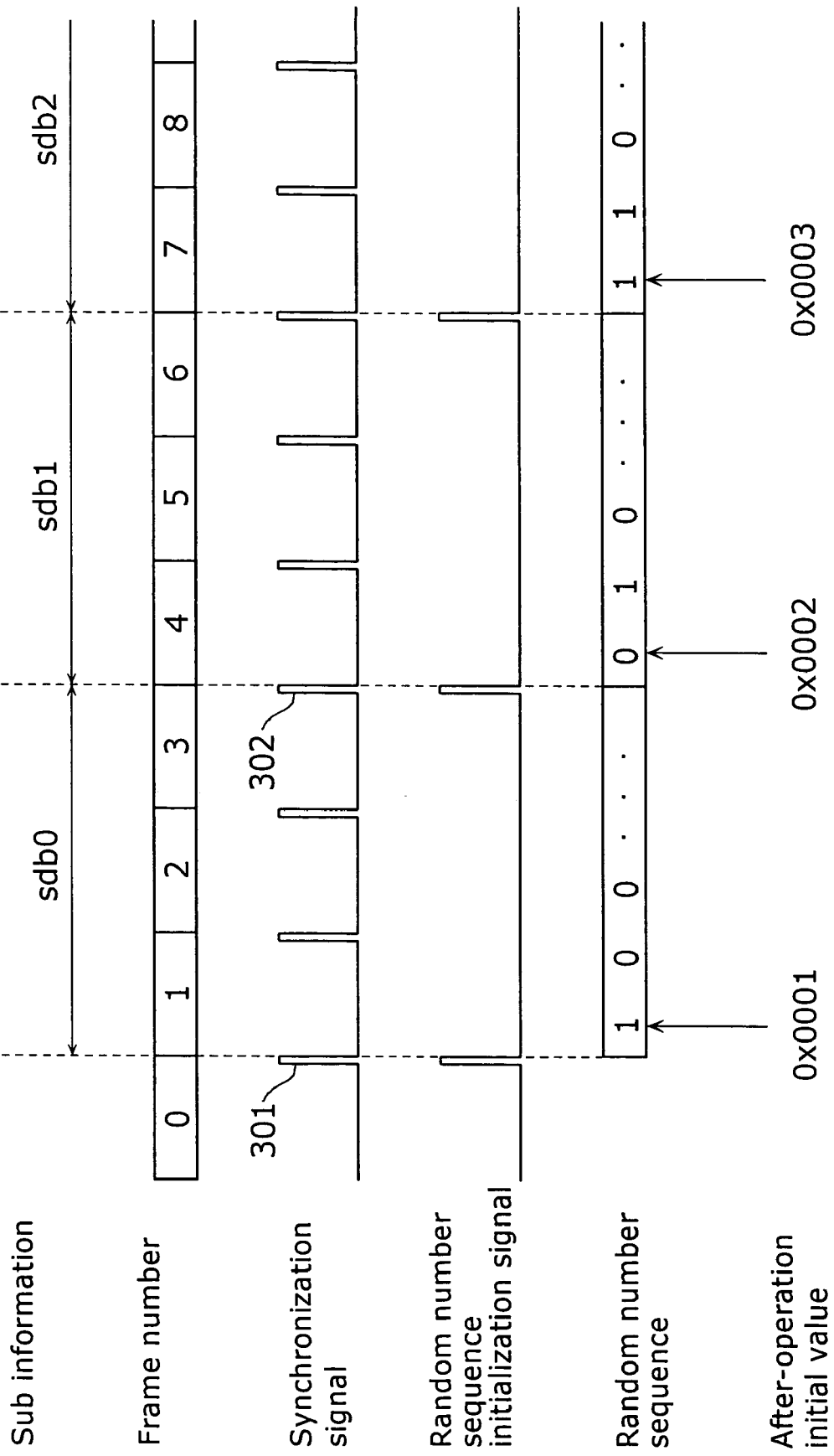
FIG. 7 is a signal waveform diagram showing an example of the initial value operation unit performing operations in the optical disc recording apparatus according to the first embodiment of the present invention.

FIG. 7 is a signal waveform diagram showing an example of the initial value operation unit 110 when performing operations.

In an example shown in FIG. 7, an initial value "0x0001" is provided to the initial value operation unit 110, and sub information sdb0, sdb1, and sdb2 are to be recorded.

First, when the random number sequence initialization timing generator 201 detects an H signal 301 in the synchronization signal, a random number sequence initialization signal is outputted to the operation counter 202. After outputting "0x0001" as an after-operation initial value, the operation counter 202 adds "1" to "0x0001", and holds "0x0002" as an after-operation initial value. The outputted after-operation initial value "0x0001" causes the random number generator 103 to initialize the random number sequence and generate the resultant, and then the sub information sdb0 is recorded. Next, when detecting a third H signal 302 in the synchronization signal after the H signal 301, the random number sequence initialization timing generator 201 outputs a random number sequence initialization signal to the operation counter 202. The operation counter 202, after outputting "0x0002" it holds as an after-operation initial value, adds "1" to "0x0002", and holds "0x0003" as an after-operation initial value. The outputted after-operation initial value "0x0002" causes the random number generator 103 to initialize the random number sequence and generate the resultant, and then the sub information sdb1 is recorded. After this, the initial value of a random number sequence is changed and sub information is recorded, every three times the random number sequence initialization timing generator 201 detects "H" in the synchronization signal.

The random number generator 103 pre-sets the after-operation initial value obtained from the initial value operation unit 110 at the timing the random number sequence initialization signal is detected, and generates 1 bit of random number sequence (M sequence) at the timing indicated by the byte clock.

Figure 8:
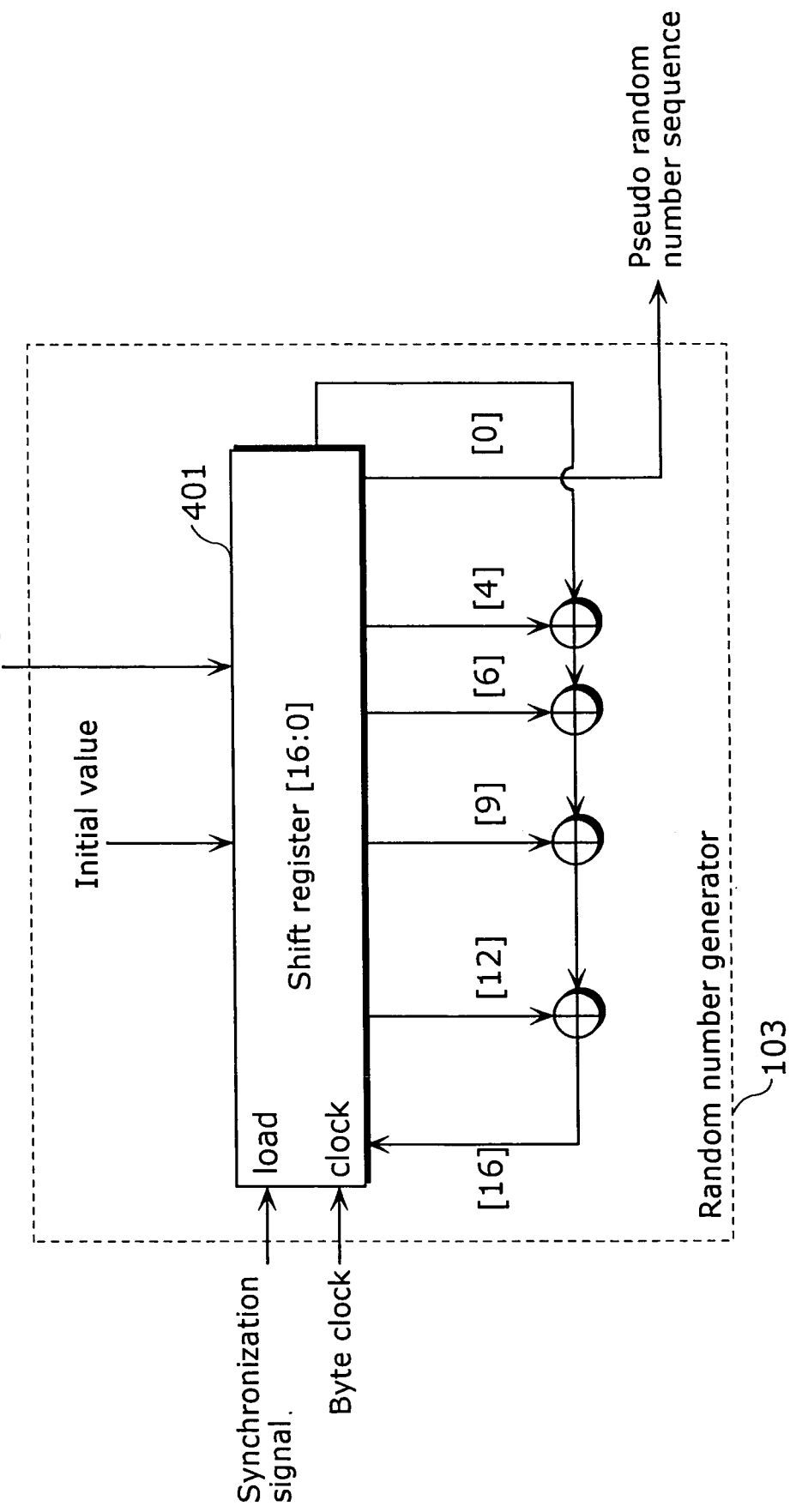
FIG. 8 is a block diagram showing a configuration of a random number generator in the optical disc recording apparatus according to the first embodiment of the present invention.

FIG. 8 is a block diagram showing a detailed configuration of the random number generator 103.

This random number generator 103, which is a pseudo random number generator operating with $(2^{16}-1)$ bit sequences as 1 cycle, includes a 16-bit-long shift register 401 in its configuration. In the shift register 401, 1-bit shift right is performed at the timing indicated by the byte clock, and exclusive OR carried out among output values of bit [0] (LSB), bit [4], bit [6], bit [9] and bit [12] is feed-backed to bit [16] (MSB). Bit [0] (LSB) generated in the above manner is outputted to the random number sequence converter 104 as a pseudo random number sequence.

The random number sequence converter 104 performs an operation to give a correlation between a random number sequence from the random number generator 103 and each bit of sub information. In the present embodiment, the random number sequence converter 104 carries out exclusive OR between a random number sequence and sub information, and performs inversion/non-inversion of the random number sequence depending on each bit of sub information to be recorded. The resulting sub information correlation random number sequence in which sub information has been converted in the above manner is then outputted to the PE modulator 105.

On the basis of a PE signal from the timing generator 101, the PE modulator 105 carries out exclusive OR between the sub information correlation random number sequence outputted from the random number sequence converter 104 and the PE signal, so as to perform PE modulation on the sub information correlation random number sequence, and outputs, to the phase modulator 106, a PE modulated signal on which sub information has been superimposed. Subsequently, the PE modulated signal rises down in the middle of each byte in the byte clock when the sub information correlation random number sequence is "L", whereas it rises up in the middle of each byte in the byte clock when the sub information correlation random number sequence is "H". By performing PE modulation described above, it is possible to obtain a signal that allows the number of "L" and "H" intervals to be approximately the same even in the case where there is a sequence of the same random numbers in the sub information correlation random number sequence.

The phase modulator 106 performs phase modulation on a channel signal from the modulator 102 on the basis of the PE modulated signal from the PE modulator 105, and outputs a modulated channel signal. To put it another way, the phase modulator 106 exerts control for delaying or advancing the formation of recording mark edges only for a minute period of time by means of the above phase modulation only when a phase modulation enable signal is "H". In the other case (when the phase modulation enable signal is "L"), the phase modulator 106 outputs, to the recording channel 107, the channel signal as a modulated channel signal so as not to delay or advance the time of forming recording mark edges.

Figure 9:
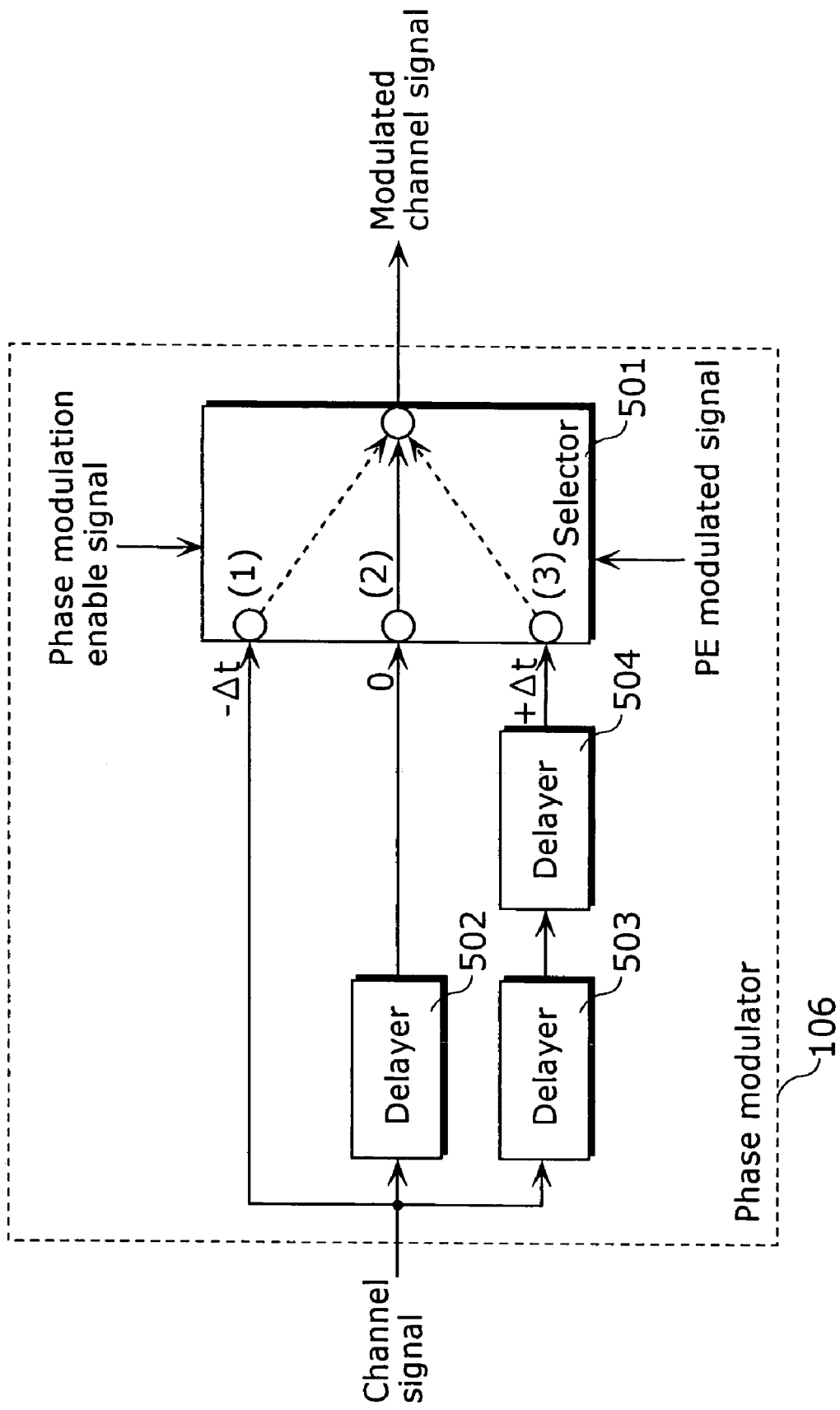
FIG. 9 is a block diagram showing a configuration of a phase modulator in the optical disc recording apparatus according to the first embodiment of the present invention.

FIG. 9 is a block diagram showing a detailed configuration of the phase modulator 106.

The phase modulator 106 is made up of delayers 502~504 for delaying a signal only for said minute period of time and a selector 501 that accepts three inputs and generates one output. The selector 501 outputs a modulated channel signal (2) resulted by delaying the channel signal inputted by the modulator 102 through the single delayer 502 when the phase modulation enable signal inputted as a control signal is "L", outputs the channel signal inputted by the modulator 102 as it is as a modulated channel signal (1) when the phase modulation enable signal is "H" and the PE modulated signal is "H", and outputs a modulated channel signal (3) resulted by delaying the channel signal inputted by the modulator 102 through two delayers 503 and 504 when the phase modulation enable signal is "H" and the PE modulated signal is "L".

As a result, the edge phases of recording marks indicating frames and synchronization areas on which no sub information is superimposed are not changed, and the phases of data areas on which sub information is superimposed are advanced by the above-mentioned minute period of time when the PE modulated signal is "H", whereas their phases are to be delayed when the PE modulated signal is "L".

The recording channel 107 generates a control signal for changing the recording power of a laser beam outputted to an optical disc 109 in synchronization with H/L in the modulated channel signal from the phase modulator 106, and outputs it to the recording head 108. The recording head 108 forms optically-readable modulated recording marks on the optical disc 109, by increasing/decreasing the power of the laser beam based on the control signal from the recording channel 107.

As a result, each bit of sub information is superimposed on every three frames out of 24 frames except for the top and the last two frames in each sector. Note that sub information may be recorded on the number of frames other than 3 frames as a unit recording frame.

Figure 10:
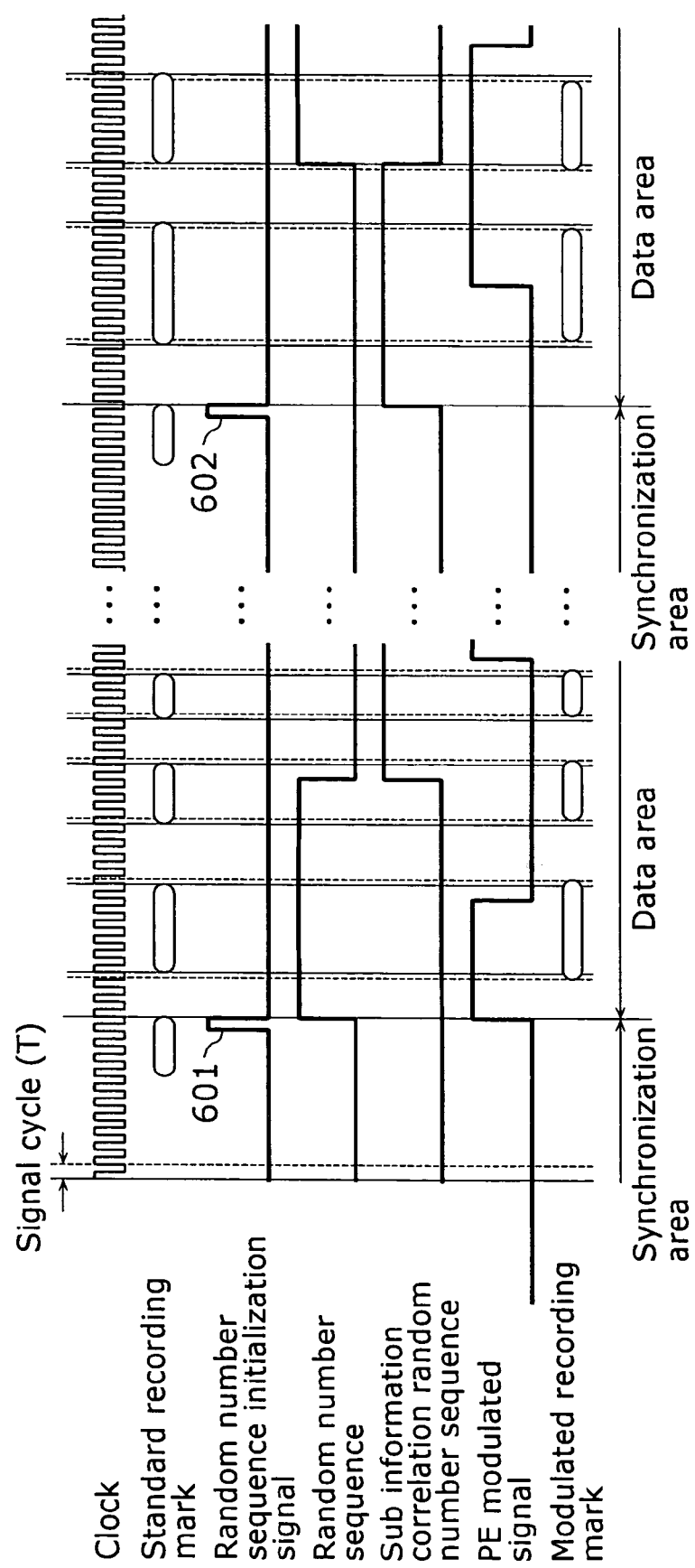
FIG. 10 is a signal waveform diagram showing an overall recording operation of the optical disc recording apparatus according to the first embodiment of the present invention.

FIG. 10 is a signal waveform diagram showing the recording operation of the optical disc recording apparatus according to the present embodiment. FIG. 10 shows how sub information associated with an initialized random number sequence is recorded when the random number sequence initialization signal is detected at each edge of standard recording marks, which constitute main information and which are synchronized with the clock. Note that an initial value of the random number sequence shall be "0x0001" and the first bit and the second bit of sub information to be recorded shall be "1" and "1", respectively.

First, when the random number sequence initialization timing generator 201 of the initial value operation unit 110 detects "H" in the synchronization signal outputted by the timing generator 101, an H signal 601 in the random number sequence initialization signal is outputted. On the detection of the H signal 601 in the random number sequence initialization signal, the operation counter 202 adds "1" to "0x0001" after outputting "0x0001" as an after-operation initial value to the random number generator 103, and holds "0x0002". The random number generator 103 initializes the initial value to "0x0001" so as to generate a random number sequence, and outputs such random number sequence to the random number sequence converter 104. The random number sequence converter 104 generates a sub information correlation random number sequence which is correlated with sub information, by carrying out exclusive OR between the random number sequence and sub information, and outputs it to the PE modulator 105.

Based on the PE signal from the timing generator 101, the PE modulator 105 obtains a PE modulated signal by performing PE modulation on the sub information correlation random number sequence so that phase advance and delay performed on edges will be approximately equal on a byte-by-byte basis, and outputs the PE modulated signal to the phase modulator 106. The phase modulator 106 outputs, to the recording channel 107, a modulated channel signal for advancing and delaying the edges of standard recording marks of main information in the track direction, on the basis of such PE modulated signal. The laser is controlled by such modulated channel signal, and modulated recording marks are formed on the optical disc.

Next, when "H" in the synchronization signal outputted by the timing generator 101 is detected for three times by the random number sequence initialization timing generator 201 of the initial value operation unit 110, an H signal 602 in the random number sequence initialization signal is outputted. The operation counter 202, after outputting "0x0002" it holds to the random number generator 103 as an after-operation initial value, adds "1" to "0x0002", and holds "0x0003". Then, the initial value of the random number sequence is initialized to "0x0002", and the second sub information "1" is recorded.

As shown by the above operation, the optical disc recording apparatus according to the present embodiment records sub information while initializing, at the same time, the random number sequence by the use of a different initial value each time the random number sequence initialization signal is detected. Accordingly, even if a random number sequence which is strongly correlated with a random number sequence used for superimposing sub information on 3 frames is discovered, since another random number sequence is used for superimposing another sub information, it is possible to prevent such random number sequence strongly correlated with said random number sequence from being discovered and therefore the whole sub information from being illegally detected. As a result, increased reliability of the detection of sub information can be achieved.

Note that a random number sequence is initialized by updating the initial value of the random number sequence every three frames, but this does not limit the scope of application. Therefore, therefore it does not matter if a random number sequence is initialized on a frame-by-frame basis. Moreover, a value to be added in the operation counter 202 of the initial value operation unit 110 may be a value other than "1". Also, an operation to be carried out may be other than addition. Furthermore, the initialization of a random number sequence may be carried out by changing the generating polynomial for generating the random number sequence.

In order to verify the effect of the present invention, a calculation is performed below to determine the probability with which sub information will be detected when an attempt is made to illegally detect sub information using a randomly-selected sequence. To be more specific, a calculation will be made to determine the probability with which correct sub information will be detected because of the fact that a unit recording frame has been detected (sub information detection rate), i.e. the probability with which the positive and negative of a sub information detection value obtained by using a wrong random number sequence will be equal to that of a sub information detection value obtained by using a correct random number sequence, when an attempt is made to detect sub information using a sequence which is different from a random number sequence used for recording sub information in an optical disc on which sub information is superimposed according to the present embodiment.

The following shows a method of determining a sub information detection rate when a wrong sequence is used. Assume that "x" is the rate at which a phase error (advance and delay), which is superimposed on the edge of a recording mark of main information at the time of recording, will be correctly detected at the time of reproduction (phase error detection rate). In other words, if a phase error in the edge of a recording mark is detected using a wrong sequence when each element in a correct random number sequence and a wrong random number sequence matches each other, the phase error is phase advance and the PE signal is "H" or the phase error is phase delay and the PE signal is "L" (Correlation OK) with a probability "x", or the phase error is phase delay and the PE signal is "H" or the phase error is phase advance and the PE signal is "H" (Correlation NG) with a probability (1-"x"). Here, assuming that the number of matching elements between the correct random number sequence and the wrong random number sequence is N, expected values of the number of elements in the sequences which are Correlation OK and Correlation NG when the elements of such random number sequences match and mismatch, are as listed in the table below. Here, "T" is the number of elements in a random number sequence which will be associated with sub information within a unit recording frame.

|  | Number of elements | Correlation OK | Correlation NG |
|---|---|---|---|
| Match | n | nx | n(1 − x) |
| Mismatch | T − n | (T − n)(1 − x) | (T − n)x |

Here, assume that "N" is the number of recording mark edges in a unit recording frame. Since the number of edges which match those in a correct random number sequence is "nN/T", and the number of edges which do not match those of a random number sequence with a correct initial value is "(T−n)N/T" when the number of matching elements between the random number sequences is N, the above table can be rewritten into the table below by replacing the number of elements by the number of edges in a unit recording frame.

|  | Number of edges | Correlation OK | Correlation NG |
|---|---|---|---|
| Match | $\frac{n}{T} \times N$ | $\frac{nx}{T} \times N$ | $\frac{n(1-x)}{T} \times N$ |
| Mismatch | $\frac{T-n}{T} \times N$ | $\frac{(T-n)(1-x)}{T} \times N$ | $\frac{(T-n)x}{T} \times N$ |

Here, since sub information is proven to be correctly detected when "random number sequences match each other and correlation OK" and "random number sequences mismatch and the correlation NG", whereas sub information is proven not to be correctly detected when "random number sequences mismatch and correlation OK" and "random number sequences match each other and the correlation NG", an expected value of an integrated value determined by integrating sub information detection values can be represented by the following equation:

$$\frac{[\{nx + (T-n)(1-x)\} - \{n(1-x) + (T-n)x\}] \times N}{T}$$

An actual integrated value can be approximately represented as a normal distribution of an average of these values.

Based on the above, the table below lists results of calculating detection rates of 1-bit sub information and 128-bit sub information. Here, each calculation is made on the assumption that a unit recording frame is 3 frames (the number of bytes=273, the number of edges "N"=900), a phase error detection rate "x" is 0.6, and the dispersion of the integrated value distribution of sub information detection values is 30. Here, a 128-bit sub information detection rate denotes a sub information detection rate in the case where sequences are not changed on a unit recording frame basis.

| No. of matching elements | Sub information detection rate (1 bit) | Sub information detection rate (128 bit) |
|---|---|---|
| 140 | $5.5 \times 10^{-1}$ | $7.9 \times 10^{-34}$ |
| 150 | $6.9 \times 10^{-1}$ | $2.6 \times 10^{-21}$ |
| 160 | $8.1 \times 10^{-1}$ | $1.1 \times 10^{-12}$ |
| 170 | $8.9 \times 10^{-1}$ | $4.1 \times 10^{-7}$ |
| 176 | $9.3 \times 10^{-1}$ | $6.3 \times 10^{-5}$ |
| 180 | $9.5 \times 10^{-1}$ | $7.7 \times 10^{-4}$ |
| 200 | $9.9 \times 10^{-1}$ | $2.9 \times 10^{-1}$ |
| 215 | $1 - (2.0 \times 10^{-3})$ | $7.8 \times 10^{-1}$ |
| 230 | $1 - (2.9 \times 10^{-4})$ | $9.6 \times 10^{-1}$ |
| 273 | $1 - (2.4 \times 10^{-7})$ | $1 - (3.1 \times 10^{-5})$ |

When the number of matching elements is 273, a detection rate will be the same as the one when sub information is detected using a correct random number sequence (1-bit error detection rate is $2.4 \times 10^{-7}$).

Next, a comparison is made between 128-bit sub information detection rates determined by the use of the existing method in which the same sequence is used for each unit recording frame and a method according to the present invention in which a different sequence is used for each unit recording frame, when a sequence which includes the largest number of elements matching those of a correct sequence is discovered.

Here, by the respective methods, sub information detection rates will be determined in the case where a sequence which includes the largest number of elements matching those of a correct sequence (the number of matching elements 176: 1-bit sub information detection rate 0.927) is discovered, using a M sequence of degree 16 represented by a polynomial ($x^{16}+x^{12}+x^9+x^6+1$) as a generating polynomial for generating a random number sequence. When using, as a correct sequence, a sequence generated by inputting "0x0001" as an initial value into the feedback shift register that represents the above polynomial, a sequence which includes the largest number of elements matching those of a correct sequence shall be a sequence resulted by using "0xD945" as an initial value in the same feedback shift register.

Results are shown in the table below.

| No. of sub information bits | Existing method (using same sequence) | | | | Method of present invention (using different sequence) | | | |
|---|---|---|---|---|---|---|---|---|
|  | Correct sequence | Wrong sequence | No. of matching elements | Sub information detection rate | Correct sequence | Wrong sequence | No. of matching elements | Sub information detection rate |
| 0 | 0x0001 | 0xD945 | 176 | 0.927 | 0x0001 | 0xD945 | 176 | 0.927 |
| 1 | 0x0001 | 0xD945 | 176 | 0.927 | 0x0002 | 0xD946 | 176 | 0.927 |
| 2 | 0x0001 | 0xD945 | 176 | 0.927 | 0x0003 | 0xD947 | 176 | 0.927 |

-continued

| | Existing method (using same sequence) | | | | Method of present invention (using different sequence) | | | |
|---|---|---|---|---|---|---|---|---|
| No. of sub information bits | Correct sequence | Wrong sequence | No. of matching elements | Sub information detection rate | Correct sequence | Wrong sequence | No. of matching elements | Sub information detection rate |
| 3 | 0x0001 | 0xD945 | 176 | 0.927 | 0x0004 | 0xD948 | 146 | 0.637 |
| 4 | 0x0001 | 0xD945 | 176 | 0.927 | 0x0005 | 0xD949 | 146 | 0.637 |
| 5 | 0x0001 | 0xD945 | 176 | 0.927 | 0x0006 | 0xD94A | 146 | 0.637 |
| : | : | : | : | : | : | : | : | : |
| 125 | 0x0001 | 0xD945 | 176 | 0.927 | 0x007E | 0xD9C2 | 125 | 0.336 |
| 126 | 0x0001 | 0xD945 | 176 | 0.927 | 0x007F | 0xD9C3 | 125 | 0.336 |
| 127 | 0x0001 | 0xD945 | 176 | 0.927 | 0x0080 | 0xD9C4 | 176 | 0.927 |
| 128-bit detection rate | $6.5 \times 10^{-5}$ | | | | $1.5 \times 10^{-36}$ | | | |

As shown above, in the existing method, once a sequence which includes a large number of elements matching those of a correct sequence is discovered, the other 127 bits are also subject to detection at an equivalent rate, resulting in a higher rate of detection of the whole 128 bits. In the present invention, on the other hand, since it does not necessarily mean that other bits are also likely to be detected at a high rate even when 1-bit sub information is wrongly detected at a high rate, it is possible to significantly lower a sub information detection rate for the whole 128 bits.

Next, an explanation is given of a sub information detection rate for the whole 128 bits and of an occurrence rate at which one sequence occurs when using the existing method in which an initial value is not changed on a unit recording frame basis.

The distribution of the number of matching elements in the case where a sub-sequence in the M sequence (the number of elements is 273) includes a certain initial value (results are the same regardless of initial values) and where a sub-sequence in the M sequence includes another initial value, can be approximately represented as a normal distribution in which an average is 136.5 and dispersion is 67.95.

Figure 11:
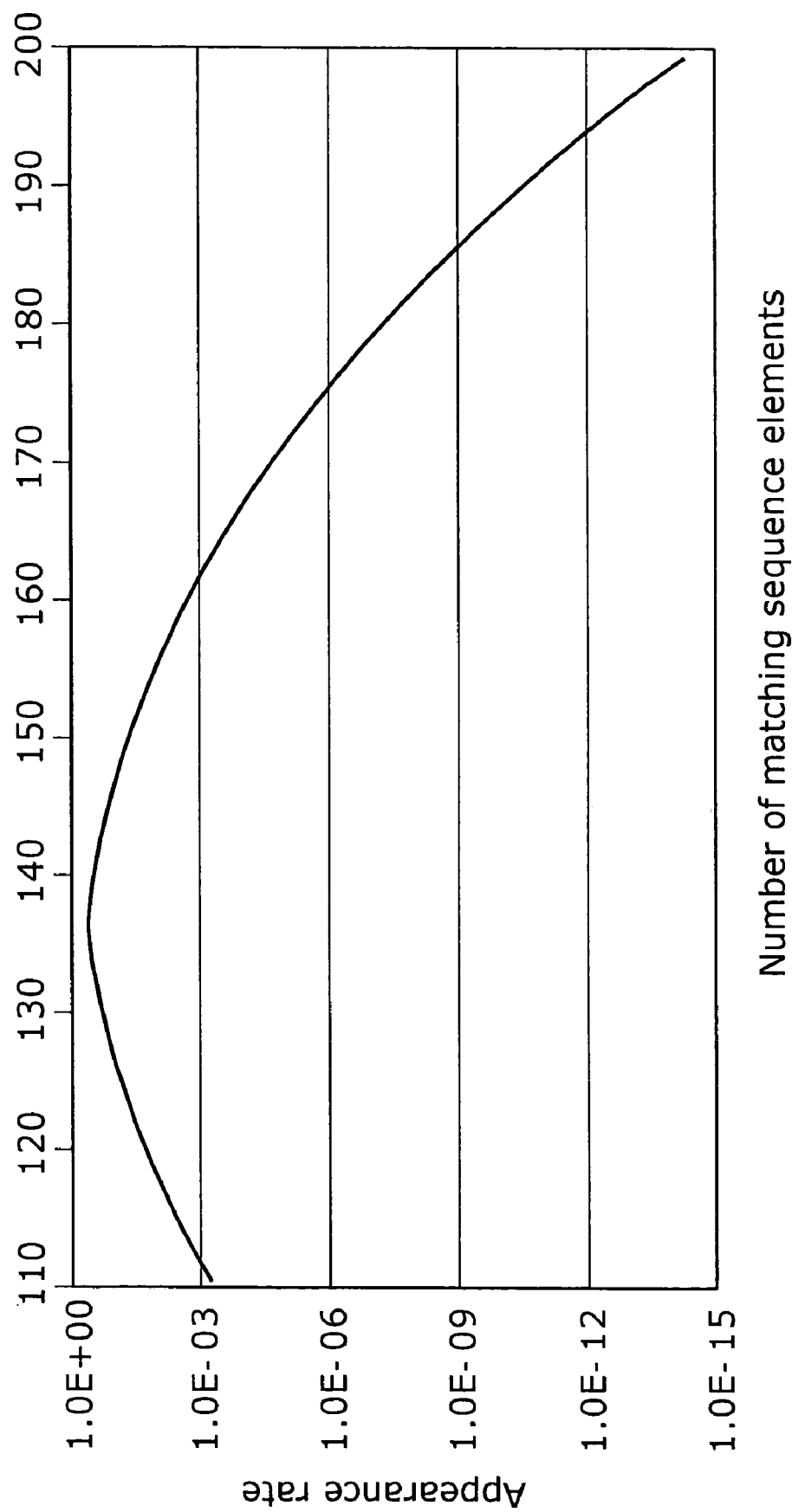
FIG. 11 is an occurrence rate indication diagram showing an occurrence rate at which matching elements occur between the sequences in the optical disc recording apparatus according to the first embodiment of the present invention.

FIG. 11 is an occurrence rate indication diagram showing an occurrence rate that indicates an occurrence rate with respect to the number of matching elements between the above sequences, by the use of the above average and dispersion. According to this diagram, assuming that a target sub information detection rate for the whole 128 bits when a sequence is a wrong one in which no change is made to sequences is $10^{-3}$ or below, an occurrence rate at which a sequence with the number of matching elements of "180" or more satisfying such condition (the sub information detection rate is $7.7 \times 10^{-4}$) occurs is $6.6 \times 10^{-8}$. In other words, by changing initial values on a unit recording frame basis, the whole 128-bit sub information becomes subject to detection only when a sequence which occurs only at the above occurrence rate is selected on a unit frame basis. Since a sequence with a smaller number of matching elements is selected in the other cases, it is possible to lower a rate at which the whole sub information is detected.

According to the optical disc recording apparatus of the present invention, by changing random number sequences on a unit recording frame basis and by recording sub information by associating it with such random number sequences, it is possible to lower a rate at which the whole bits of sub information will be subject to detection even if a sequence that allows an illegal detection of 1-bit of sub information at a high rate is discovered. Moreover, as shown in the above tables, it is possible to lower a rate at which the whole bits of sub information are subject to detection, even if an initial value is incremented one by one.

The optical disc recording apparatus according to the present invention related to jitter modulation has been explained on the basis of the present embodiment, but it should be understood that the present invention is not restricted to such embodiment. Also note that it is also possible to embody the present invention as a recording method which includes, as its steps, the characteristic constituent elements of the optical disc recording apparatus.

Second Embodiment

The following gives an explanation of an optical disc reproduction apparatus according to the second embodiment of the present invention with reference to the figures.

Figure 12:
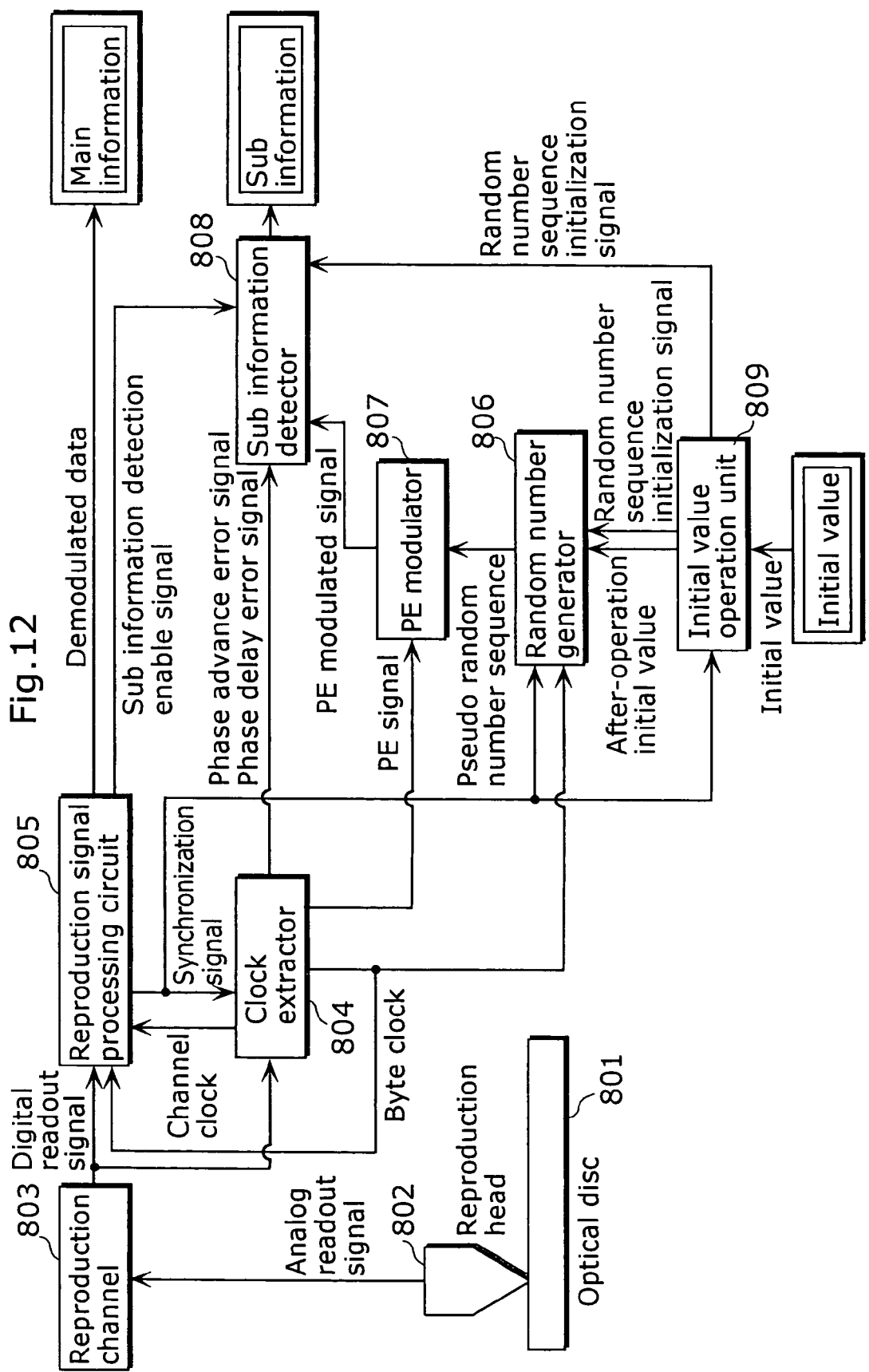
FIG. 12 is a block diagram showing a configuration of an optical disc reproduction apparatus according to a second embodiment of the present invention.

FIG. 12 is a block diagram showing the configuration of the optical disc reproduction apparatus according to the second embodiment of the present invention.

This optical disc reproduction apparatus is capable of reproducing main information on the basis of recording marks on an optical disc which information has been recorded by the optical disc recording apparatus of the first embodiment as well as capable of detecting and reproducing sub information superimposed on jitters of the recording marks to be observed at the time of reproduction. Such optical disc reproduction apparatus is comprised of a reproduction head 802, a reproduction channel 803, a clock extractor 804, a reproduction signal processing circuit 805, a PE modulator 807, a random number generator 806, a sub information detector 808, and an initial value operation unit 809.

The reproduction head 802 generates an analog readout signal by converging optical beams so as to radiate them over the recording marks on a rotating optical disc 801 and by amplifying reflected beams received by a photodiode, and outputs such analog readout signal to the reproduction channel 803. The reproduction channel 803 converts the analog readout signal from the reproduction head 802 into a digital readout signal by performing waveform equalization and sharpening on such analog readout signal, and outputs the resulting digital readout signal to the clock extractor 804 and the reproduction signal processing circuit 805.

Based on such digital readout signal from the reproduction channel 803, the clock extractor 804 outputs a channel clock synchronized with channel bits to the reproduction signal processing circuit 805, and generates a byte clock synchronized with each recorded data (on a byte-by-byte basis) in the digital readout signal, and outputs it to the reproduction signal processing circuit 805 and the random number generator 806. At the same time, the clock extractor 804 detects a phase error in the digital readout signal with reference to the channel clock, and generates a phase advance error signal when a phase advance is detected, whereas it generates a phase delay error signal when a phase delay is detected, so as to output the generated signal to the sub information detector 808.

Figure 13:
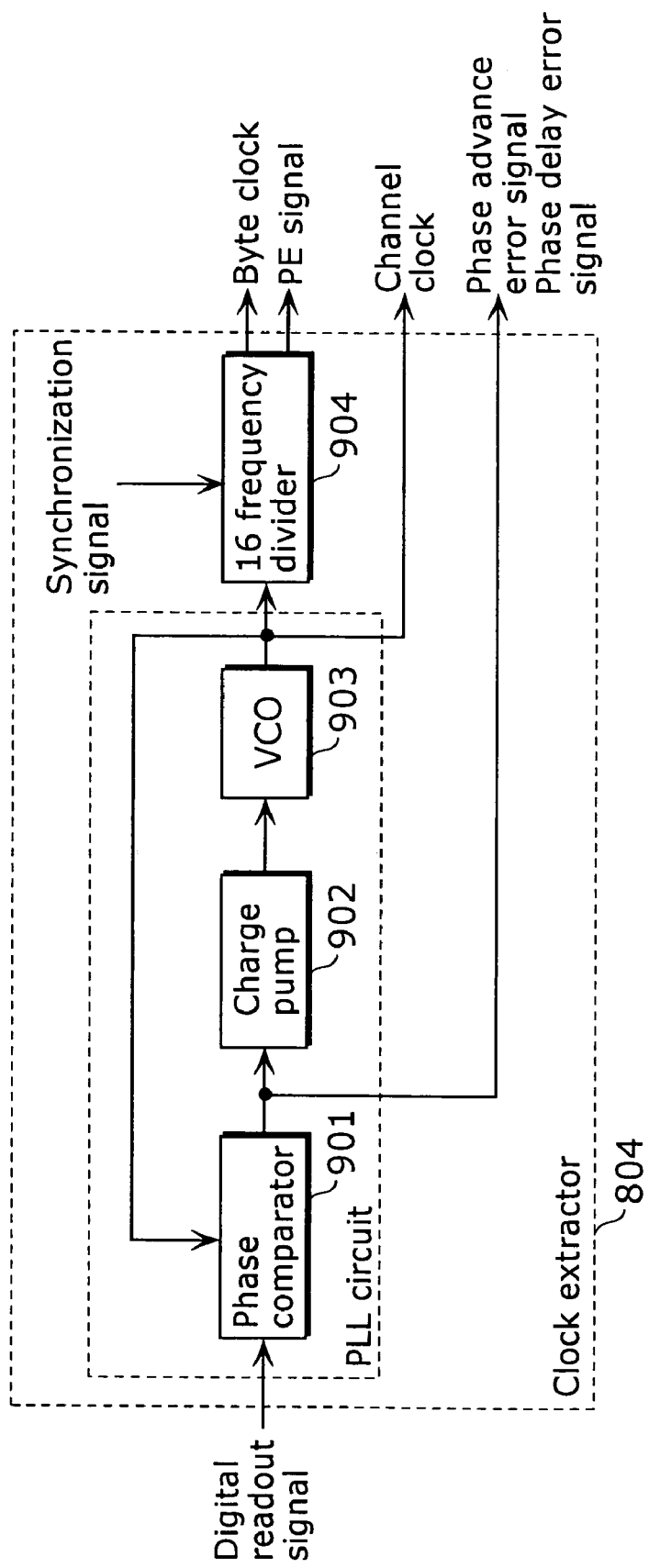
FIG. 13 is a block diagram showing a configuration of a clock extractor in the optical disc reproduction apparatus according to the second embodiment of the present invention.

FIG. 13 is a block diagram showing the configuration of the clock extractor 804.

The clock extractor 804 is comprised of a PLL circuit that includes a phase comparator 901, a charge pump 902 and a VCO (Voltage Controlled Oscillator) 903, and of a 16 frequency divider 904.

The phase comparator 901 calculates, from the channel clock feed-backed and inputted from the VCO 903 and the digital readout signal from the reproduction channel 803, a phase error between a leading edge/trailing edge in such digital readout signal and a leading edge in the channel clock which is closest to such edge, and outputs, to the charge pump 902, the result of the calculation as a phase advance error signal or a phase delay error signal.

The charge pump 902 controls output voltage according to the input phase advance error signal and input phase delay error signal. Output voltage is decreased in order to make the frequency of the channel clock lower when the phase advance error signal is inputted, whereas output voltage is increased in order to make the frequency of the channel clock higher when the phase delay error signal is inputted. The VCO 903 is a voltage controlled oscillator that generates a channel clock at a frequency corresponding to output voltage from the charge pump 902.

The 16 frequency divider 904, which is a counter that divides the frequency of channel clock from the VCO 903 into 16 frequency divisions, is reset by a synchronization signal from the reproduction signal processing circuit 805. Subsequently, the 16 frequency divider 904 generates a PE signal and a byte clock synchronized with each recorded data (on a byte-by-byte basis) in the digital readout signal with reference to a synchronization area.

The reproduction signal processing circuit 805 is a circuit for detecting a synchronization area from the digital readout signal sent from the reproduction channel 803 and demodulating the digital readout signal with reference to the synchronization area.

Figure 14:
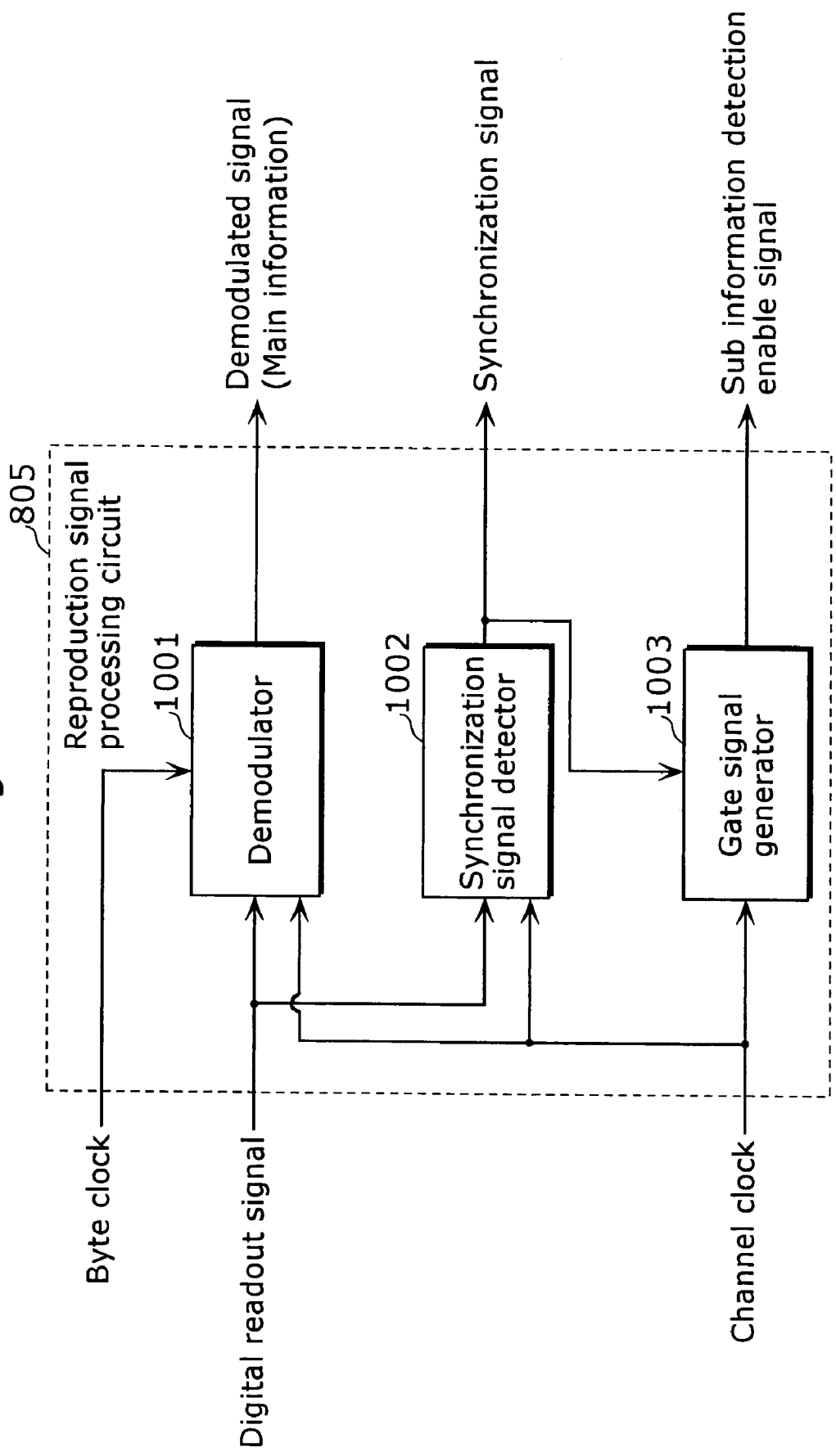
FIG. 14 is a block diagram showing a configuration of a reproduction signal processing circuit in the optical disc reproduction apparatus according to the second embodiment of the present invention.

FIG. 14 is a block diagram showing the configuration of the reproduction signal processing circuit 805.

The reproduction signal processing circuit 805 is comprised of a synchronization signal detector 1002, a demodulator 1001, and a gate signal generator 1003.

The synchronization signal detector 1002 generates a synchronization signal on the detection of a synchronization area (synchronization pattern) included in the digital readout signal, and outputs it to the clock extractor 804, the random number generator 806, and the initial value operation unit 809.

The demodulator 1001, which is a demodulation circuit paired with the modulator 102 of the optical disc recording apparatus, samples the digital readout signal sent from the reproduction channel 803 in synchronization with the channel clock from the clock extractor 804, and converts it into 8-bit recorded data corresponding to a 16-bit channel code in synchronization with the byte clock from the clock extractor 804, and outputs it as main information.

The gate signal generator 1003 outputs, to the sub information detector 808, a sub information detection enable signal indicating data areas in frames (except for the top and the last frames in each sector) in which sub information is recorded, with reference to the synchronization signal.

The initial value operation unit 809, which has the same functionality and configuration as those of the initial value operation unit 110 of the optical disc recording apparatus, operates in the same manner as shown in FIG. 6. In other words, the initial value operation unit 809 generates a random number sequence initialization signal through its random number sequence initialization timing generator, according to the synchronization signal from the reproduction signal processing circuit 805, and outputs the resulting random number sequence initialization signal to the sub information detector 808 and the random number generator 806. Furthermore, the initial value operation unit 809 performs an operation on an initial value at the timing indicated by the random number sequence initialization signal, and outputs an after-operation initial value to the random number generator 806. Note that an initial value to be inputted to the initial value operation unit 809 is set to be equal to an initial value that is inputted to the initial value operation unit 110 of the optical disc recording apparatus.

The random number generator 806, which has the same functionality and configuration as those of the random number generator 103 of the optical disc recording apparatus, presets the after-operation initial value outputted by the initial value operation unit 809 at the timing indicated by the random number sequence initialization signal, and generates a random number sequence (M sequence) at the timing indicated by the byte clock from the clock extractor 804 so as to output the resultant to the PE modulator 807.

The PE modulator 807, which has the same functionality and configuration as those of the PE modulator 105 of the optical disc recording apparatus, performs PE modulation on a pseudo random number sequence outputted from the random number generator 806 according to the PE signal from the clock extractor 804, and outputs the resultant as a PE modulated signal to the sub information detector 808.

The sub information detector 808 is a circuit for detecting correlation between the phase advance error signal/phase delay error signal outputted from the clock extractor 804 and the PE modulated signal from the PE modulator 807.

Figure 15:
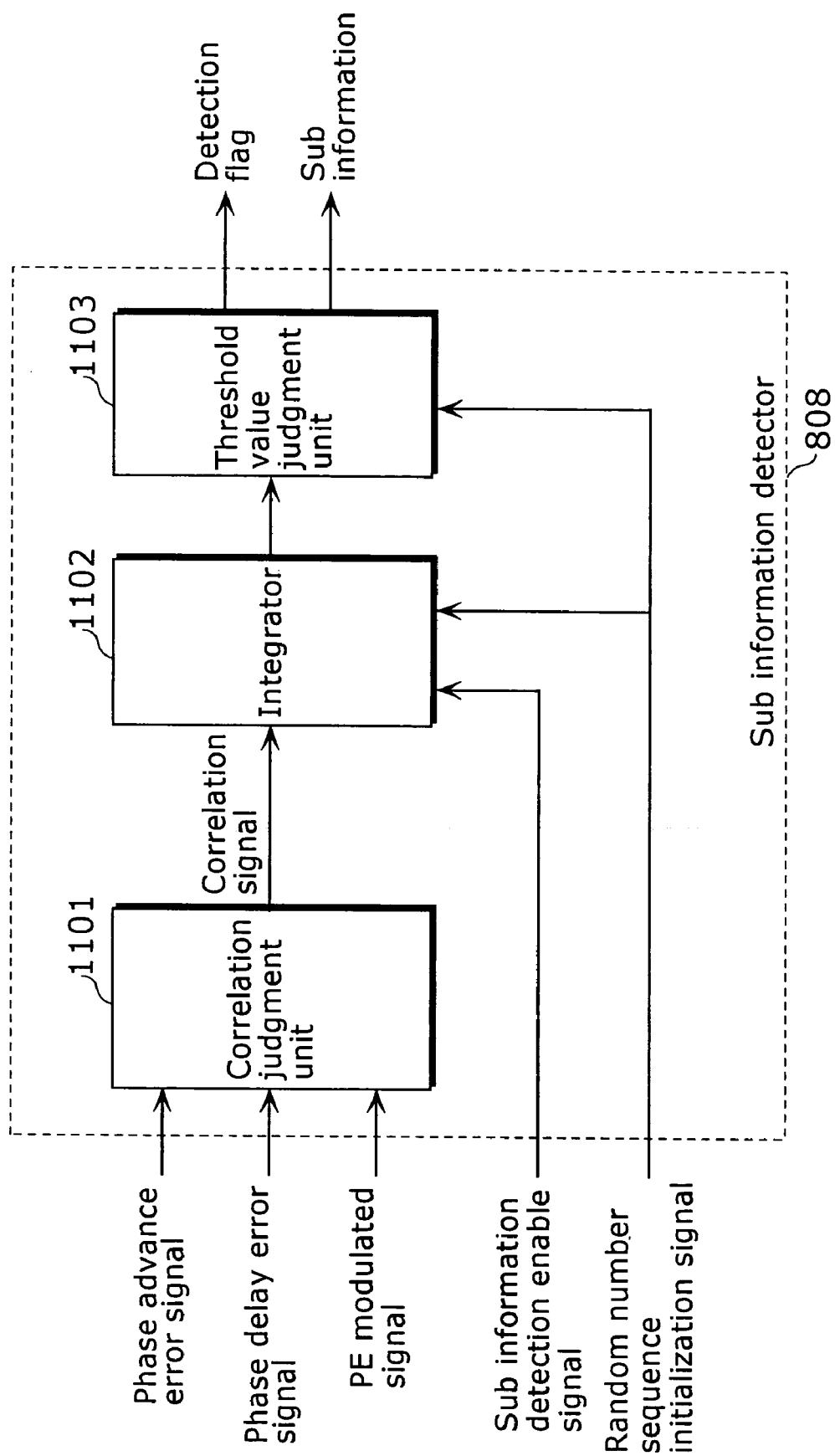
FIG. 15 is a block diagram showing a configuration of a sub information detector in the optical disc reproduction apparatus according to the second embodiment of the present invention.

FIG. 15 is a block diagram showing the configuration of the sub information detector 808 according to the present embodiment. The sub information detector 808 is comprised of a correlation judgment unit 1101, an integrator 1102, and a threshold judgment unit 1103.

The correlation judgment unit 1101 outputs, to the integrator 1102, "+1" as a correlation signal when the phase advance error signal is "H" and the PE modulated random number sequence is "H", or when the phase delay error signal is "H" and the PE modulated random number sequence is "L". On the other hand, the correlation judgment unit 1101 outputs, to the integrator 1102, "−1" as a correlation signal when the phase advance error signal is "H" and the PE modulated random number sequence is "L", or when the phase delay error signal is "H" and the PE modulated random number sequence is "H".

The integrator 1102, which is an UP/DOWN counter, adds values indicated by respective correlation signals from the correlation judgment unit 1101, when the sub information detection enable signal is "H". Subsequently, on the detection of the random number sequence initialization signal, the integrator 1102 outputs, to the threshold judgment unit 1103, an integrated value (sub information detection value) as an integrated value signal obtained by addition performed in the counter, and then clears the counter.

The threshold judgment unit 1103 is made up of a comparator and the like which decides, when detecting the integrated value signal from the integrator 1102, where in three sections separated by a predetermined positive threshold and a negative threshold, the integrated value indicated by such integrated value signal belongs to. The threshold judgment unit 1103 outputs an NRZ-format code string which shall be "1" when the integrated value is bigger than the above positive threshold and which shall be "0" when the integrated value is smaller than the above negative threshold, at the point of time when the integrated value signal is inputted from the integrator 1102, as well as setting a detection flag to "H". Moreover, the threshold judgment unit 1103 sets a detection flag to "L" when the integrated value belongs to the section between the above-mentioned two thresholds.

Figure 16:
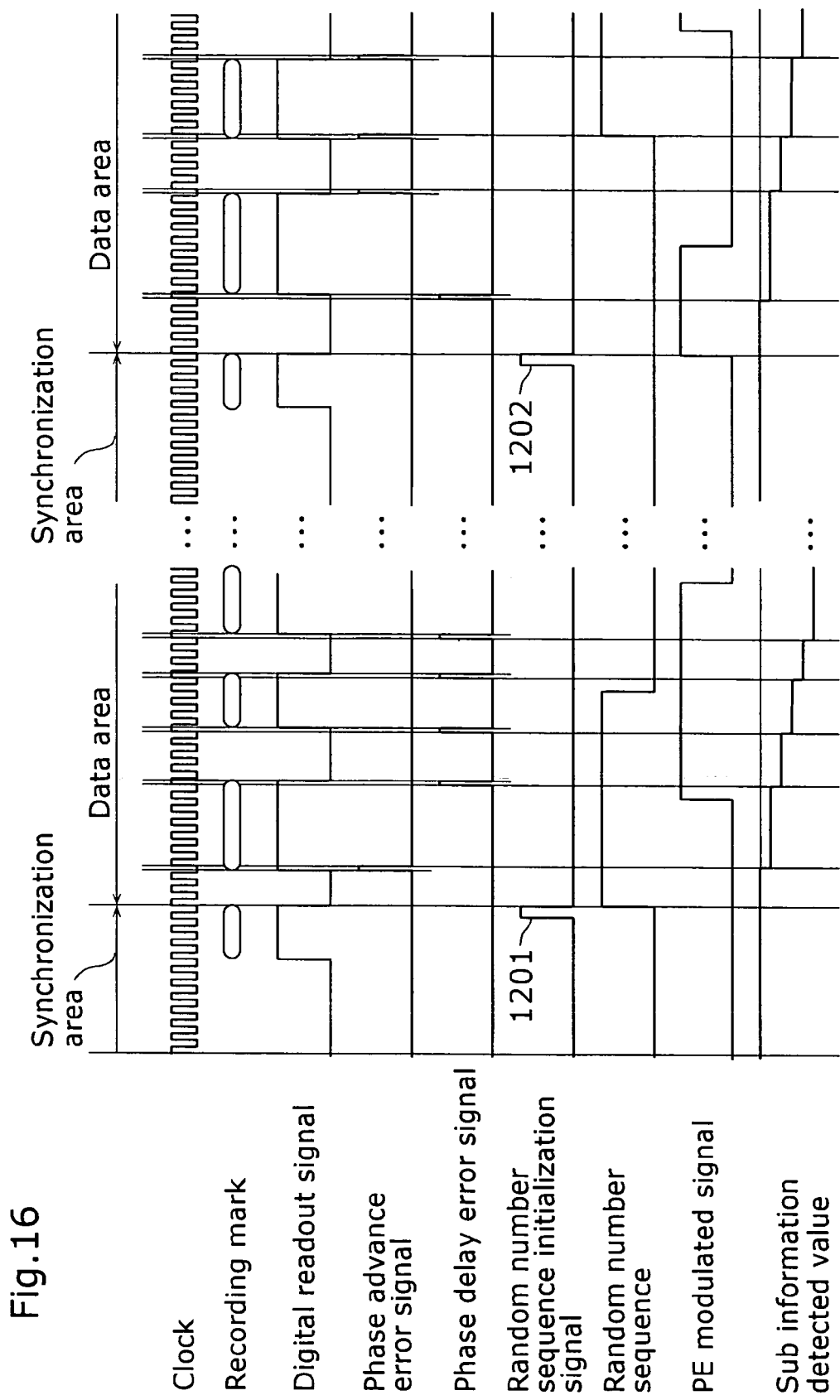
FIG. 16 is a signal waveform diagram showing a reproduction operation of the optical disc reproduction apparatus according to the second embodiment of the present invention.

Next, referring to FIG. 16, an explanation is given of the reproduction operation of the optical disc reproduction apparatus according to the present embodiment.

FIG. 16 is a signal waveform diagram showing the reproduction operation of the optical disc reproduction apparatus according to the present embodiment.

FIG. 16 shows how a sub information detection value is generated from the phase advance error signal and the phase delay error signal with respect to the edges of recording marks which are synchronized with the channel clock. Here, assume that the first six frames of an optical disc on which sub information is recorded will be reproduced. Note that an initial value of the random number sequence shall be "0x0001" and the first bit and the second bit of recorded sub information shall be "1" and "1", respectively.

First, according to a not-illustrated synchronization signal detected at the boundary between a synchronization area and a data area, the clock extractor 804 detects a phase error between a leading edge of the clock and an edge of the digital readout signal from a section excluding the synchronization area, and a phase advance error signal is outputted to the sub information detector 808 when the edge of the digital readout signal advances further than the leading edge of the clock. On the other hand, a phase delay error signal is outputted to the sub information detector 808 when the edge of the digital readout signal is behind the leading edge of the clock.

When the random number sequence initialization timing generator of the initial value operation unit 809 detects "H" in the synchronization signal, an H signal 1201 in the random number sequence initialization signal is outputted, and "0x0001" held in the operation counter of the initial value operation unit 809 is outputted to the random number generator 806 as an after-operation initial value. Then, the random number generator 806 performs initialization using such after-operation value as an initial value, generates a random number sequence, and outputs it to the PE modulator 807. The PE modulator 807 obtains a PE modulated signal by performing PE modulation on such inputted random number sequence, on the basis of the PE signal from the clock extractor 804, and outputs it to the sub information detector 808. The sub information detector 808 adds "1" to the sub information detection value held in the integrator 1102, if the phase advance error signal is detected when the PE modulated signal is "H" or if the phase delay error signal is detected when the PE modulated signal is "L", and subtracts "1" from the sub information detection value held in the integrator 1102 if the phase delay error signal is detected when the PE modulated signal is "H" or if the phase advance error signal is detected when the PE modulated signal is "L".

After the above process is repeated for three times, the threshold judgment unit 1103 reproduces sub information as "1" when the obtained sub information detection value is bigger than the positive threshold, whereas it reproduces sub information as "0" when the sub information detection value is smaller than the negative threshold.

Next, when the random number sequence initialization timing generator of the initial value operation unit 809 detects the synchronization signal for three times, an H signal 1202 in the random number sequence initialization signal is outputted, and "0x0002" held in the operation counter of the initial value operation unit 809 is outputted to the random number generator 806 as an after-operation initial value. Then, the initial value of the random number sequence is initialized to "0x0002", and the second sub information "1" is reproduced. In the above manner, the random number sequence is initialized every time "H" in the random number sequence initialization signal is detected, which is followed by the reproduction of sub information.

As described above, according to the optical disc reproduction apparatus of the present embodiment, since a random number sequence is changed on a unit recording frame basis, it is possible for sub information to be reproduced from an optical disc on which main information and sub information are recorded by the optical disc recording apparatus according to the first embodiment.

The optical disc reproduction apparatus according to the present invention related to jitter modulation has been explained on the basis of the present embodiment, but it should be understood that the present invention is not restricted to such embodiment. Also note that it is also possible to embody the present invention as a reproduction method which includes, as its steps, the characteristic constituent elements of the optical disc recording apparatus.

Third Embodiment

An explanation is given of an optical disc recording apparatus according to the third embodiment of the present invention with reference to the figures.

Figure 17:
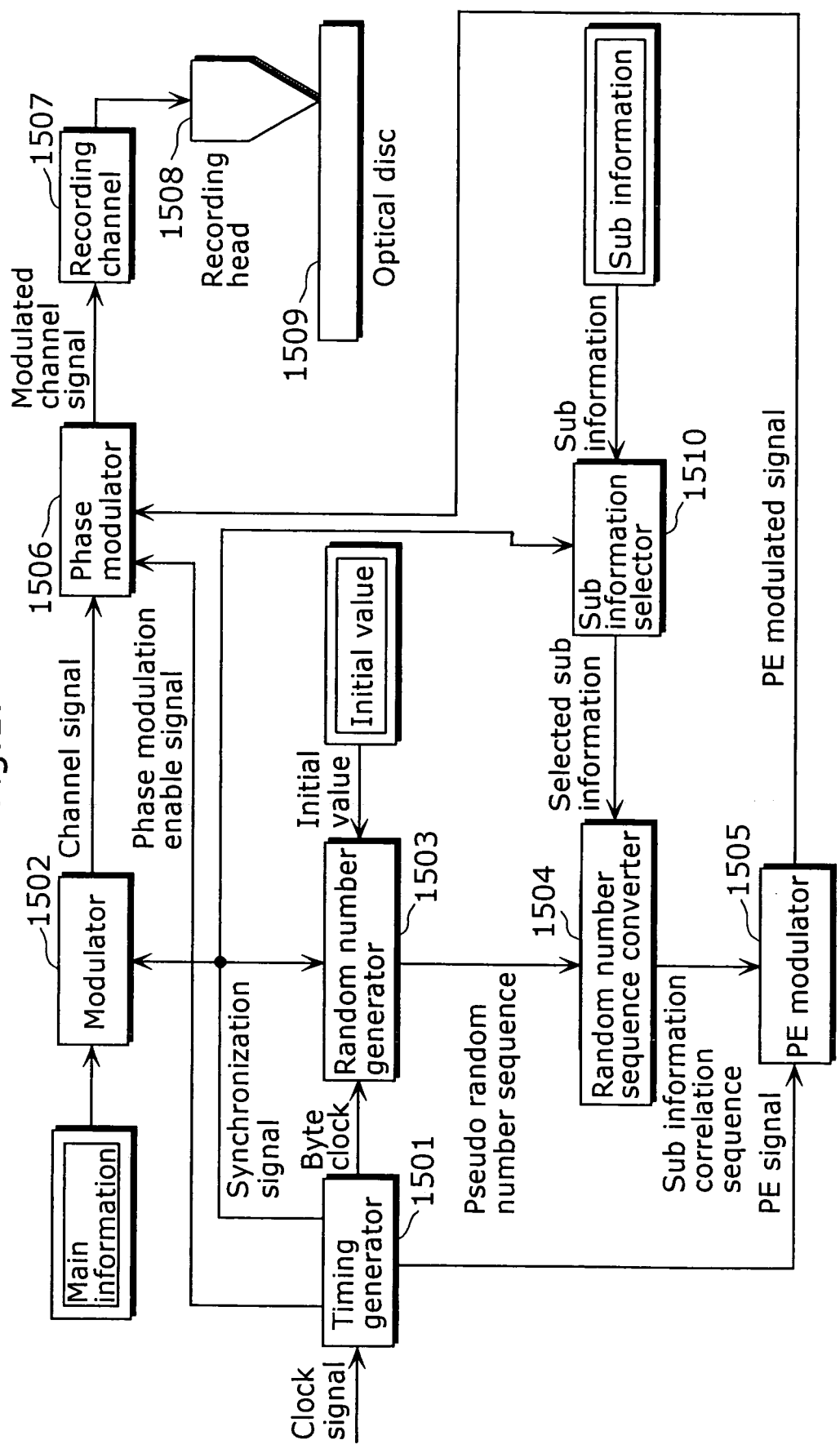
FIG. 17 is a block diagram showing a configuration of an optical disc recording apparatus according to a third embodiment of the present invention.

FIG. 17 is a block diagram showing the configuration of the optical disc recording apparatus according to the present embodiment.

This optical disc recording apparatus whose basic configuration is equivalent to that of the optical disc recording apparatus according to the first embodiment capable of recording main information and sub information at the same time, is characterized by that it records each bit of sub information on three frames, each of which is 16 lines apart from each other. Such optical disc recording apparatus is comprised of a timing generator 1501, a modulator 1502, a random number generator 1503, a random number sequence converter 1504, a PE modulator 1505, a phase modulator 1506, a recording channel 1507, a recording head 1508, and a sub information selector 1510.

Figure 18:
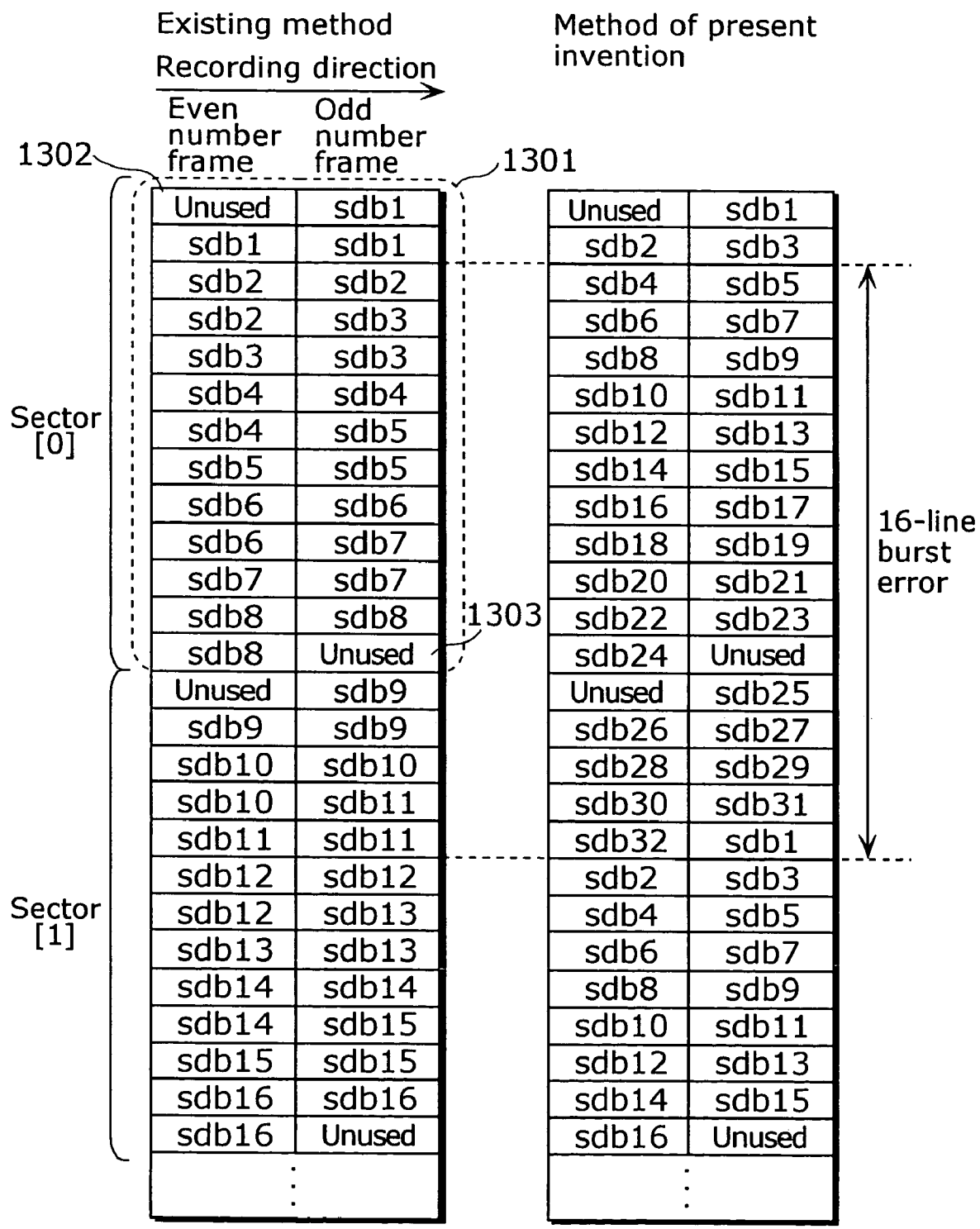
FIG. 18 is a sector structure conceptual diagram showing a recording method of the optical disc recording apparatus according to the third embodiment of the present invention.
Figure 19:
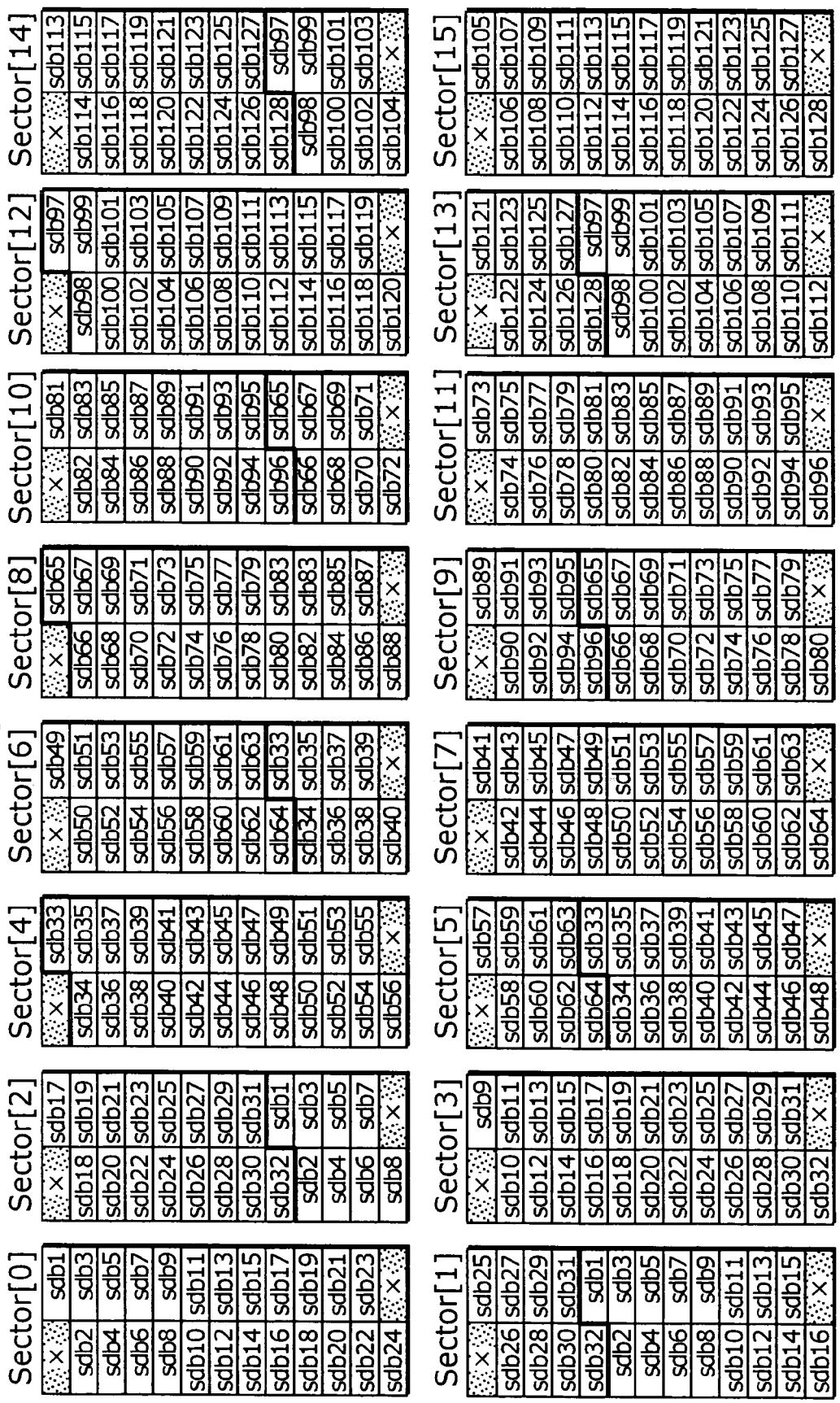
FIG. 19 is a detailed conceptual diagram of the optical disc recording apparatus according to the third embodiment of the present invention.

Here, referring to FIGS. 18 and 19, an explanation is given of the characteristics of a recording method employed by the optical disc recording apparatus according to the present embodiment, before giving explanations of its constituent elements.

FIG. 18 is a sector structure conceptual diagram showing an interleave recording method for recording sub information employed by the optical disc recording apparatus of the present embodiment, in comparison with an existing method.

In FIG. 18, an upper left frame 1302 is a frame [0] and a lower right frame 1303 is a frame [25] in each sector 1301, and a left frame is an even number frame and a right frame is an odd number frame (a left frame +1) in each line of frames.

In an optical disc according to the existing method, sub information is superimposed only on recording marks in data areas included in frames (frames [1~24]) except for the top frame 1302 (the frame that includes an address ID) and the last frame 1303, and 1-bit sub information is superimposed on three consecutive frames.

In an optical disc according to the present embodiment, on the other hand, 1-bit sub information is recorded in three frames as in the case of the existing method, but these three frames are located 16 or more lines apart from each other. As a result, if a burst error of 16 lines (the range indicated by a double-headed arrow in FIG. 18) occurs in the existing method, 10-bit sub information sdb2~sdb11 will be of a low degree of reliability and unable to be reproduced due to bit misalignment and the like, although the whole main information will become reproducible after error correction. With the method according to the present invention, on the other hand, although the reliability of sub information concerning one of three frames will be decreased, it is possible to reproduce sub information with increased sub information detection reliability, even in the event of burst errors, since the reliability of the other two frames can be maintained.

FIG. 19 is a conceptual diagram showing the placement of sub information which has been recorded in accordance with the present embodiment. In FIG. 19, frames within sectors are placed in the same manner as the one shown in FIG. 18. 1-bit sub information is superimposed on frames (frames [1~24]) other than the top frame (the frame that includes an address ID) and the last frame every three frames. In the present embodiment, the whole sub information forms 128 bit, and 1-bit sub information is superimposed on three frames in a distributed manner.

First, the optical disc recording apparatus according to the present embodiment superimposes sub information in a manner in which 32-bit consecutive sub information is repeatedly placed for three times and then next 32-bit consecutive sub information is placed for three times repeatedly. For example, 32-bit sub information sdb1~sdb32 are placed on frames starting from frame [1] in sector [0] to frame [8] in sector [1], and then 32-bit sub information sdb1~sdb32 are also placed on frames starting from frame [9] in sector [1] to frame [16] in sector [2] and from frame [17] in sector [2] to frame [24] in sector [3], respectively. And then, 32-bit sub information sdb33~sdb64 are placed on frames starting from frame [1] in the next sector [4] to frame [8] in sector [5]. In this manner, sub information is repeatedly placed and superimposed. Note that by superimposing a different number of sub information consecutively, it is possible to place sub information in accordance with the size of a burst error. For example, in order to support a burst error of 32 lines, consecutive 64-bit sub information shall be placed in combination with one another.

In the optical disc recording apparatus of the present embodiment capable of recording sub information by the use of the above recording method, the constituent elements other than the sub information selector 1510, that is, the timing generator 1501, the modulator 1502, the random number generator 1503, the random number sequence converter 1504, the PE modulator 1505, the phase modulator 1506, the recording channel 1507, and the recording head 1508 respectively have the same functionality and configuration as those of the timing generator 101, the modulator 102, the random number generator 103, the random number sequence converter 104, the PE modulator 105, the phase modulator 106, the recording channel 107, and the recording head 108 in the optical disc recording apparatus of the first embodiment shown in FIG. 4.

The sub information selector 1510 reorders sub information into the placement order shown in FIG. 18 at the timing indicated by the synchronization signal, and outputs the resultant to the random number sequence converter 1504.

Figure 20:
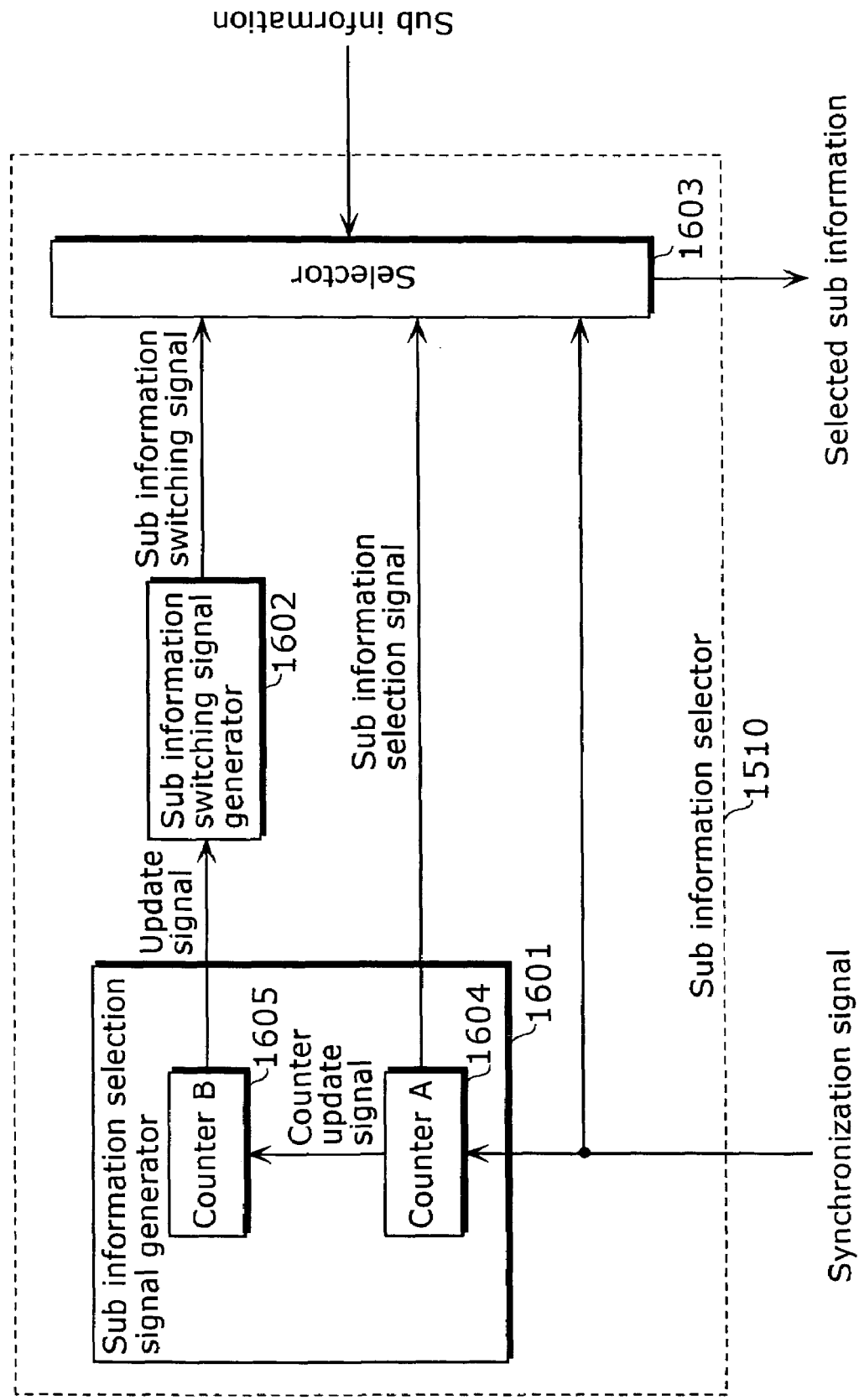
FIG. 20 is a block diagram showing a configuration of a sub information selector in the optical disc recording apparatus according to the third embodiment of the present invention.

FIG. 20 is a block diagram showing the configuration of the sub information selector 1510.

This sub information selector 1510 is made up of a sub information selection signal generator 1601, a sub information switching signal generator 1602, and a selector 1603.

The sub information selection signal generator 1601, which has a counter A1604 and a counter B1605, outputs a sub information selection signal to the selector 1603 at the timing indicated by the synchronization signal, and outputs an update signal to the sub information switching signal generator 1602.

The counter A1604 is an UP counter capable of holding values from 0 to 31. When "H" in the synchronization signal is inputted, the counter A1604 outputs, to the selector 1603, a count value a as a sub information selection signal indicating the number of "H"s in the synchronization signal inputted before such input, and adds "1" to the count value a when the count value a is a value other than 31. When the count value a is 31, the counter A1604 clears the count value a after outputting a counter update signal to the counter B1605.

The counter B1605 is an UP counter capable of holding values from 0 to 2. When the counter update signal is inputted, the counter B1605 adds "1" to a count value b when such counter value b indicating the number of counter update signals inputted before such input is a value other than 2. When the count value b is 2, the counter B1605 clears the count value b after outputting an update signal to the sub information switching signal generator 1602.

The sub information switching signal generator 1602 has an UP counter capable of holding values from 0 to 3. When the update signal is inputted, the sub information switching signal generator 1602 outputs, to the selector 1603, a count value c as a sub information switching signal indicating the number of update signals inputted before such input.

Figure 21:
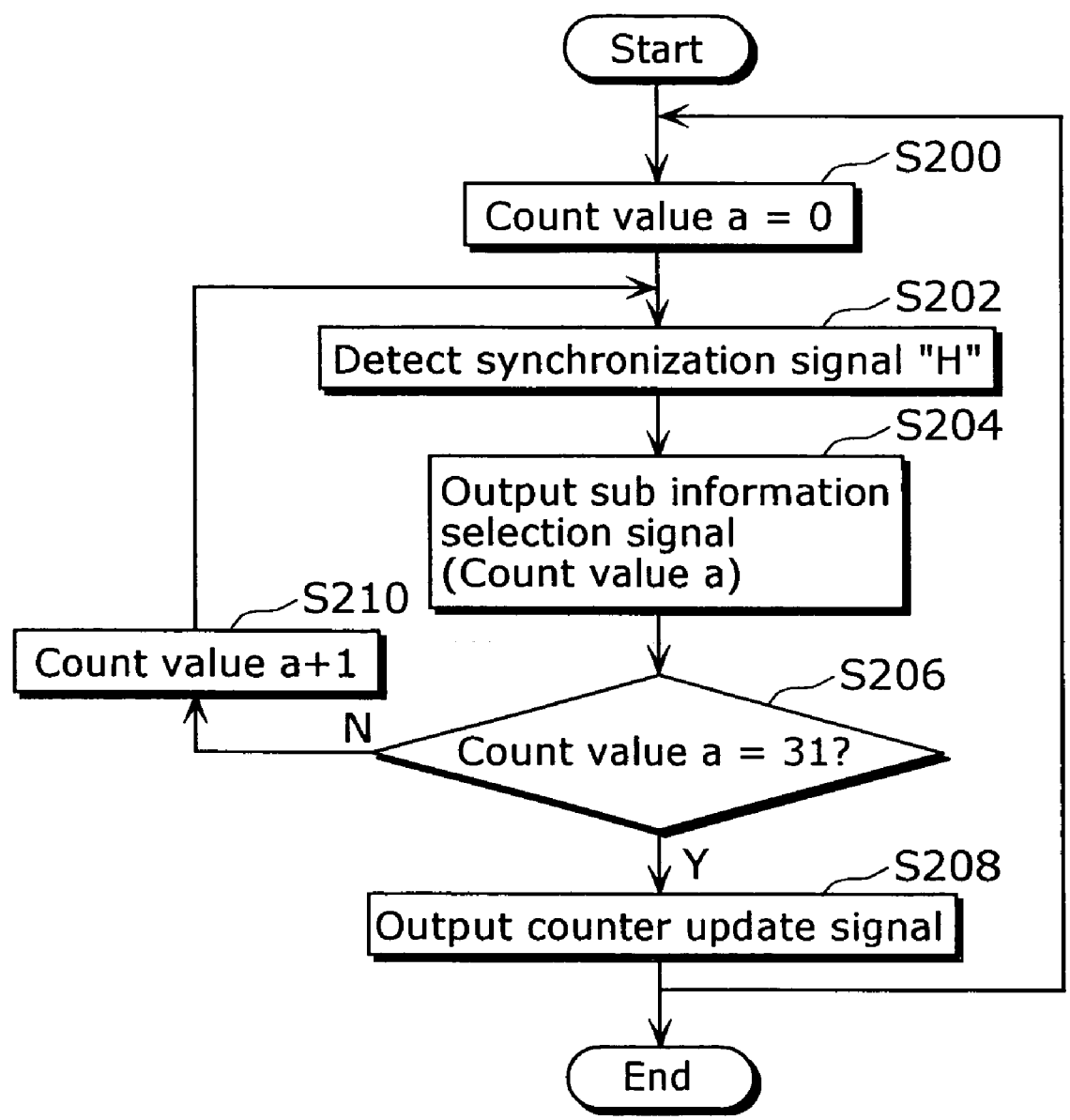
FIG. 21 is a flowchart showing an operation of a counter A of the sub information selector in the optical disc recording apparatus according to the third embodiment of the present invention.
Figure 22:
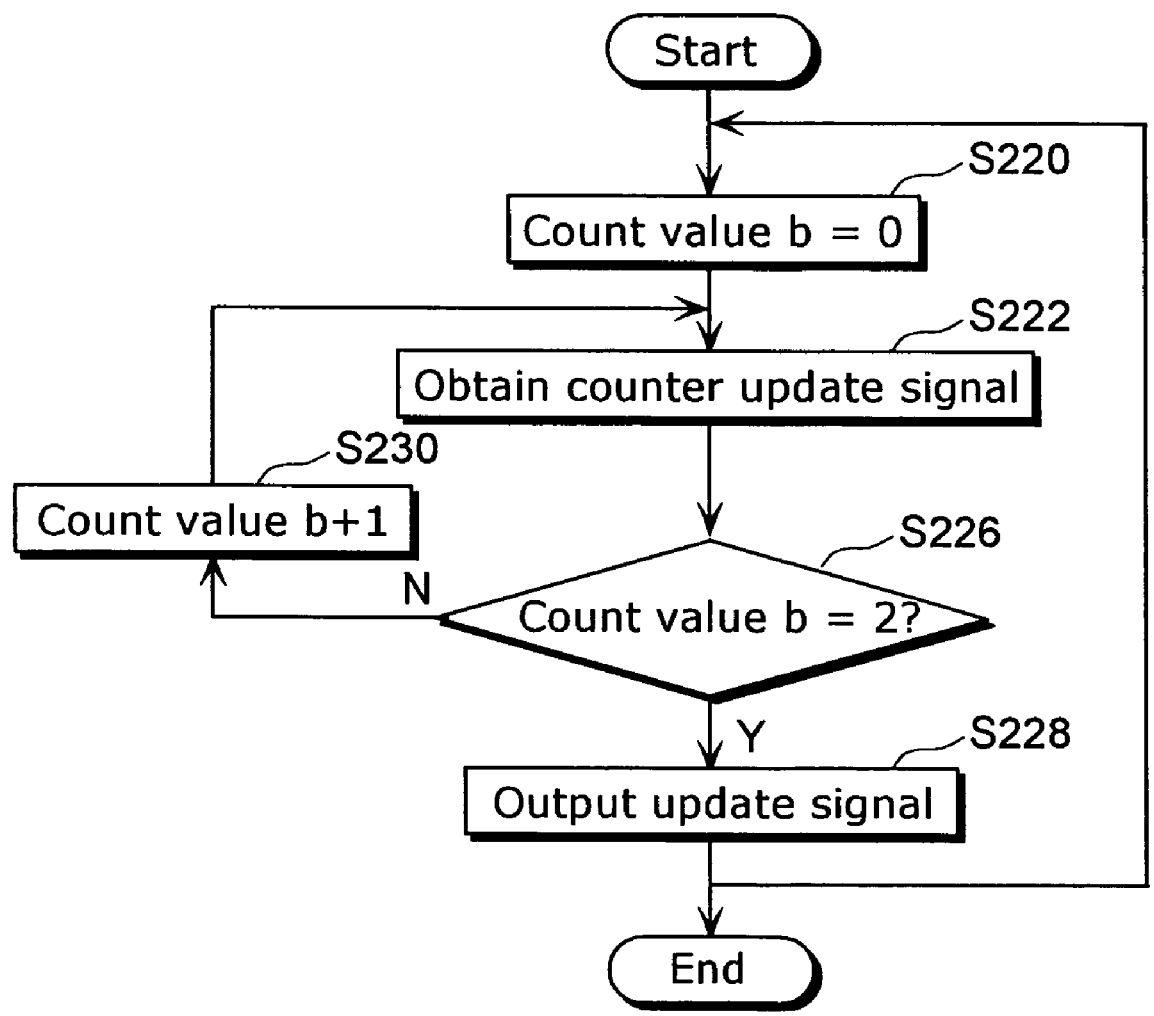
FIG. 22 is a flowchart showing an operation of a counter B of the sub information selector in the optical disc recording apparatus according to the third embodiment of the present invention.
Figure 23:
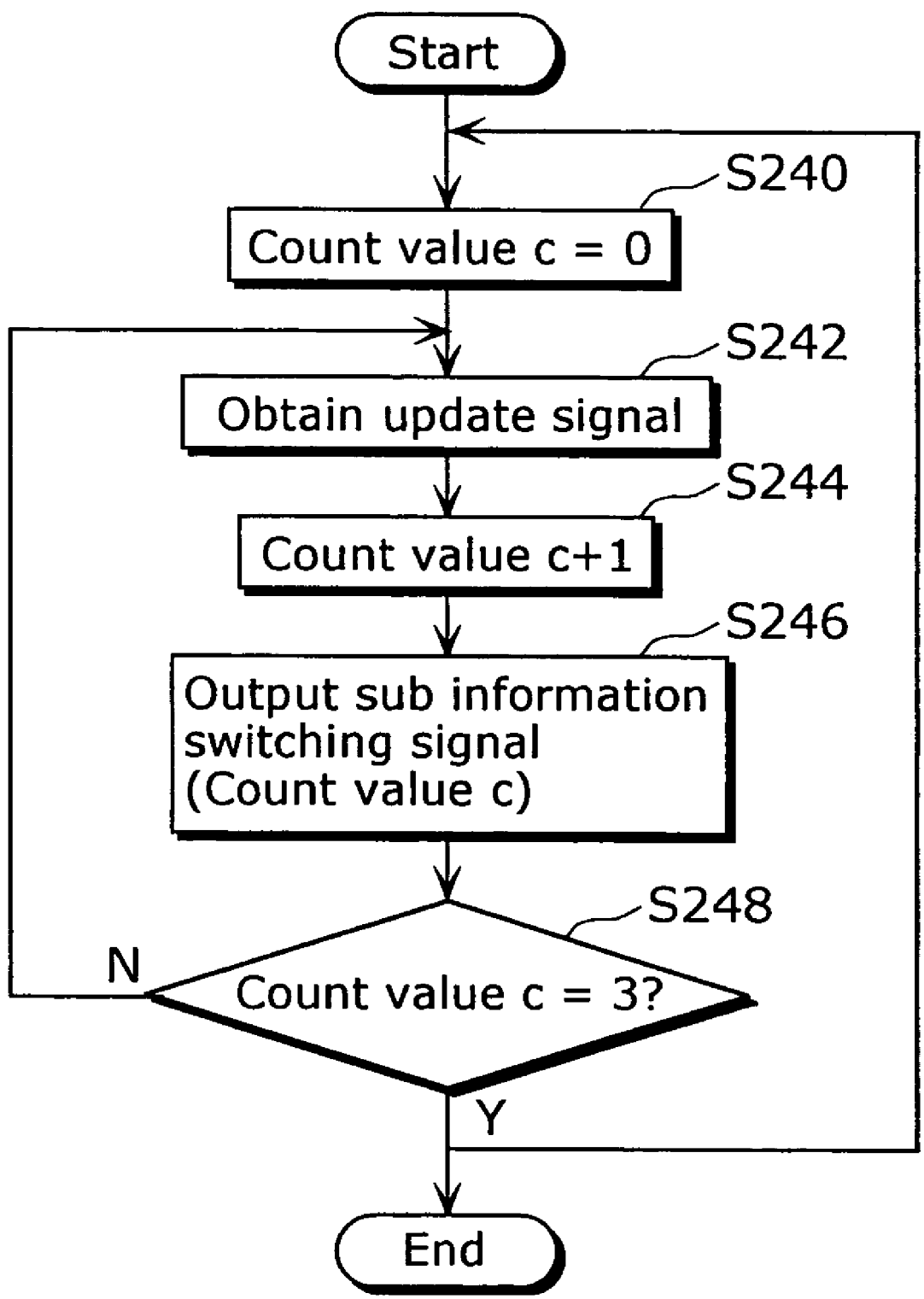
FIG. 23 is a flowchart showing an operation of a sub information switching signal generator of the sub information selector in the optical disc recording apparatus according to the third embodiment of the present invention.

FIGS. 21~23 are flowcharts showing in detail the above-explained operations of the counter A1604 and the counter B1605, as well as the sub information switching signal generator 1602.

Referring to FIG. 21, an explanation is given first of the operation of the counter A1604.

First, the counter A1604 sets a count value a to "0" as the default (Step S200).

Next, on the detection of "H" in the synchronization signal (Step S202), the counter A1604 outputs a sub information selection signal indicating the count value a to the selector 1603 (Step S204).

Here, the counter A1604 judges whether the count value a is 31 or not (Step S206). When the count value a is judged not to be 31 (N in Step S206), the counter A1604 adds "1" to the count value a (Step S210).

Meanwhile, when judging that "the count value a=31" in Step S206 (Y in Step S206), the counter A1604 outputs a counter update signal to the counter B1605 (Step S208).

Then, the counter A1604 executes steps starting from Step S200 again after executing Step S208, and repeats steps starting from Step S202 after executing Step S210.

Next, referring to FIG. 22, an explanation is given of the operation of the counter B1605.

First, the counter B1605 sets a count value b to "0" as the default (Step S220).

Then, when the counter B1605 obtains the counter update signal from the counter A1604 (Step S222), the counter B1605 judges whether the count value b is 2 or not (Step S226), and when judging that the count value b is not 2 (N in Step S226), the counter B1605 adds "1" to the count value b (Step S230).

Meanwhile, when judging that "the count value b=2" in Step S226 (Y in Step S226), the counter B1605 outputs an update signal to the sub information switching signal generator 1602 (Step S228).

Then, the counter B1605 executes steps starting from Step S220 again after executing Step S228, and repeats steps starting from Step 5222 after executing Step S230.

Next, referring to FIG. 23, an explanation is given of the operation of the sub information switching signal generator 1602.

First, the sub information switching signal generator 1602 sets a count value c to "0" as the default (Step S240).

Then, when the sub information switching signal generator 1602 obtains the update signal from the counter B1605 (Step S242), the sub information switching signal generator 1602 adds "1" to the count value c (Step S244), and outputs a sub information switching signal indicating the count value c (Step S246).

Here, the sub information switching signal generator 1602 judges whether the count value c is 3 or not (Step S248). When judging that the count value c is not 3 (N in Step S248), the sub information switching signal generator 1602 repeats steps starting from Step S242, whereas when judging that "the count value c=3" (Y in Step S248), the sub information switching signal generator 1602 repeats steps starting from S240.

The selector 1603 outputs, to the random number sequence converter 1504, sub information as selected sub information which has been selected from pieces of input sub information on the basis of the sub information selection signal and the sub information switching signal, at the timing indicated by the synchronization signal. Here, the selector 1603 calculates (a+32×c+1) using the count value a indicated by the sub information selection signal and the count value c indicated by the sub information switching signal, and selects the (a+32×c+1)th sub information. Accordingly, it is possible for sub information to be reordered into the placement shown in FIG. 18 and outputted.

Figure 24:
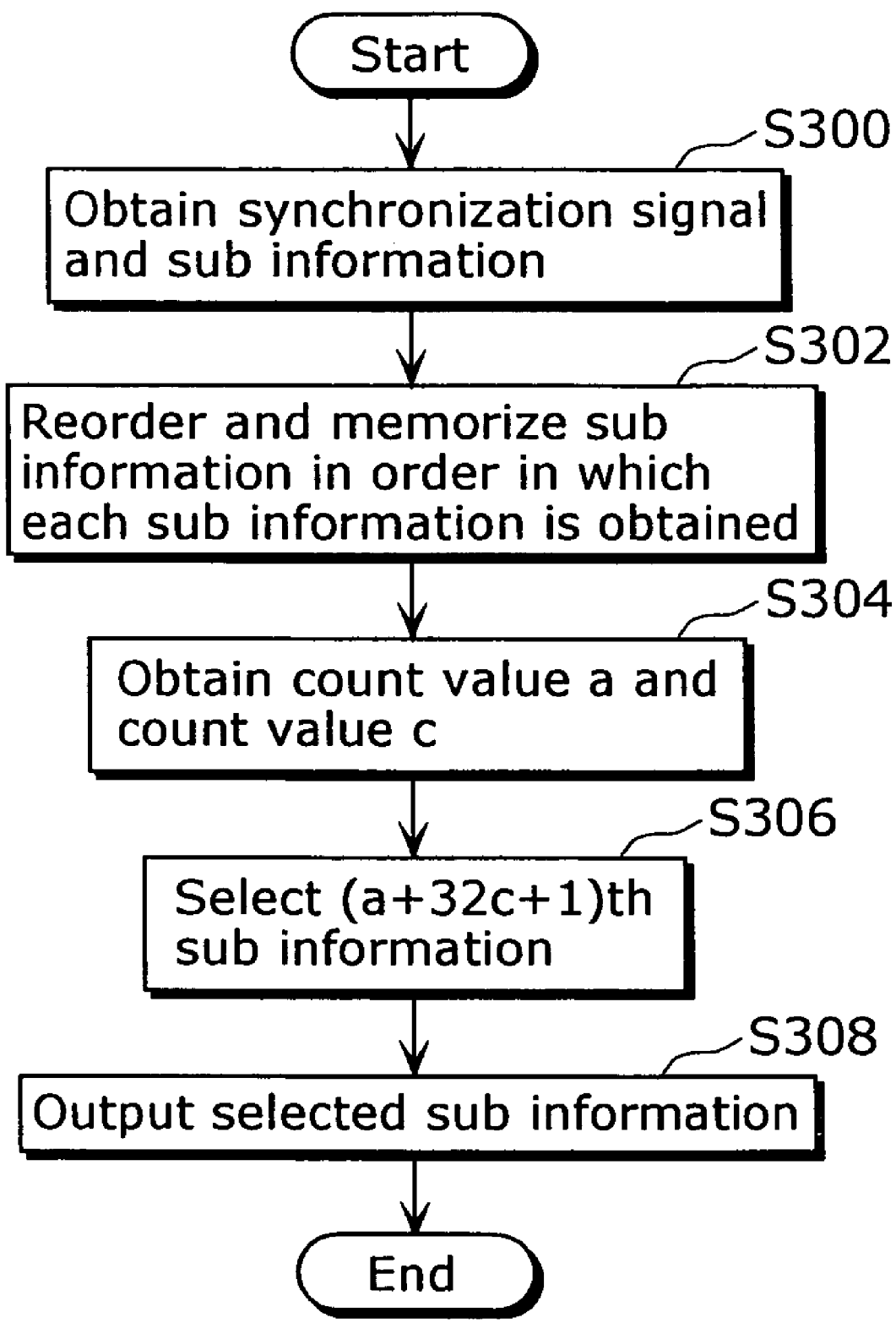
FIG. 24 is a flowchart showing an operation of a selector of the sub information selector in the optical disc recording apparatus according to the third embodiment of the present invention.

FIG. 24 is a flowchart showing the operation of the selector 1603.

First, the selector 1603 obtains the synchronization signal and sub information (Step S300).

Next, the selector 1603 memorizes the obtained sub information in association with the order in which each 1-bit sub information is obtained (Step S302).

Then, the selector 1603 obtains the sub information selection signal indicating the count value a from the counter A1604 and obtains the sub information switching signal indicating the count value c from the sub information switching signal generator 1602 (Step S304).

Here, the selector 1603 selects the (a+32×c+1)th sub information (Step S306).

Subsequently, the selector 1603 outputs the sub information selected in Step S306 as selected sub information (Step S308).

With reference to FIGS. 17 and 20, the following explains an overall operation of the optical disc recording apparatus according to the present embodiment.

First, when the sub information selector 1510 detects "H" in the synchronization signal outputted by the timing generator 1501, the sub information selector 1510 outputs, to the random number sequence converter 1504, selected sub information which has been selected by the selector 1603 according to a sub information selection signal from the sub information selection signal generator 1601 in the sub information selector 1510 and a sub information switching signal from the sub information switching signal generator 1602 in the sub information selector 1510. The random number sequence converter 1504 outputs, to the PE modulator 1505, a sub information correlation sequence generated as a result of carrying out exclusive OR between the above selected sub information and a pseudo random number sequence which is generated by the random number generator 1503 at the timing indicated by a byte clock outputted by the timing generator 1501.

Subsequently, the PE modulator 1505 performs PE modulation on the sub information correlation sequence, and outputs it to the phase modulator 1506 as a PE modulated signal. Then, the phase modulator 1506 performs phase modulation on a channel signal on the basis of such PE modulated signal in order to advance or delay the edge of recording marks of main information. Accordingly, sub information is recorded.

As described above, the optical disc recording apparatus according to the present embodiment records 1-bit sub information in three frames, each of which is 16 lines apart from each other. Thus, it becomes possible to realize a highly reliable recording method capable of reproducing sub information even in the event of a burst error.

More specifically, the optical disc recording apparatus according to the present embodiment is an optical disc recording apparatus that superimposes sub information by displacing the edges of the recording marks by a minute amount on the basis of a binary sequence code, when recording main information by forming optically-readable recording marks. Since such optical disc recording apparatus is equipped with a main information division means for dividing the main information into more than one consecutive frame and a displacement means for displacing the edges in a manner which allows each of M-bit sub information (M is a natural number: M is 1 in the present embodiment) to be superimposed on N inconsecutive frames (N is a natural number: N is 3 in the present embodiment), the optical disc recording apparatus is capable of reproducing sub information superimposed on frames other than one where a burst error occurs even in the event of a burst error and therefore is capable of improving the reliability of sub information reproduction because of the fact that identical pieces of sub information is recorded in a distributed manner.

Furthermore, in the optical disc recording apparatus of the present embodiment, the displacement means displaces the edges in a manner which allows K-bit sub information (K is a natural number: K is 32 in the present embodiment) to be superimposed every M-bits and which allows each of the N frames to be apart from each other by K/M frames (K/M is 32 in the present embodiment). Accordingly, since identical pieces of sub information is recorded in the N frames in a distributed manner, each being apart from each other by K/M frames, it is possible to reproduce sub information superimposed on frames other than one where a burst error occurs, and therefore to improve the reliability of sub information reproduction even in the event of a burst error. Also, since the fact that the K/M is 32 in the present embodiment makes it possible for each M-bit sub information to be recorded in frames, each of which is 16 lines apart from each other, it is possible to realize the recording of sub information with a high reliability, and therefore to reproduce sub information just like the main information is reproduced even in the event of a burst error.

Note that by incorporating the initial value operation unit 110 of the optical disc recording apparatus according to the first embodiment into the optical disc recording apparatus according to the present embodiment, it is possible to reduce a rate at which the whole bits of sub information are detected, even if a sequence which allows an illicit detection of 1-bit sub information out of the whole sub information is detected.

The optical disc recording apparatus according to the present invention related to jitter modulation has been explained on the basis of the present embodiment, but it should be understood that the present invention is not restricted to such embodiment. Also note that it is also possible to embody the present invention as a recording method which includes, as its steps, the characteristic constituent elements of the optical disc recording apparatus.

Fourth Embodiment

The following explains an optical disc reproduction apparatus according to the fourth embodiment of the present invention with reference to the figures.

Figure 25:
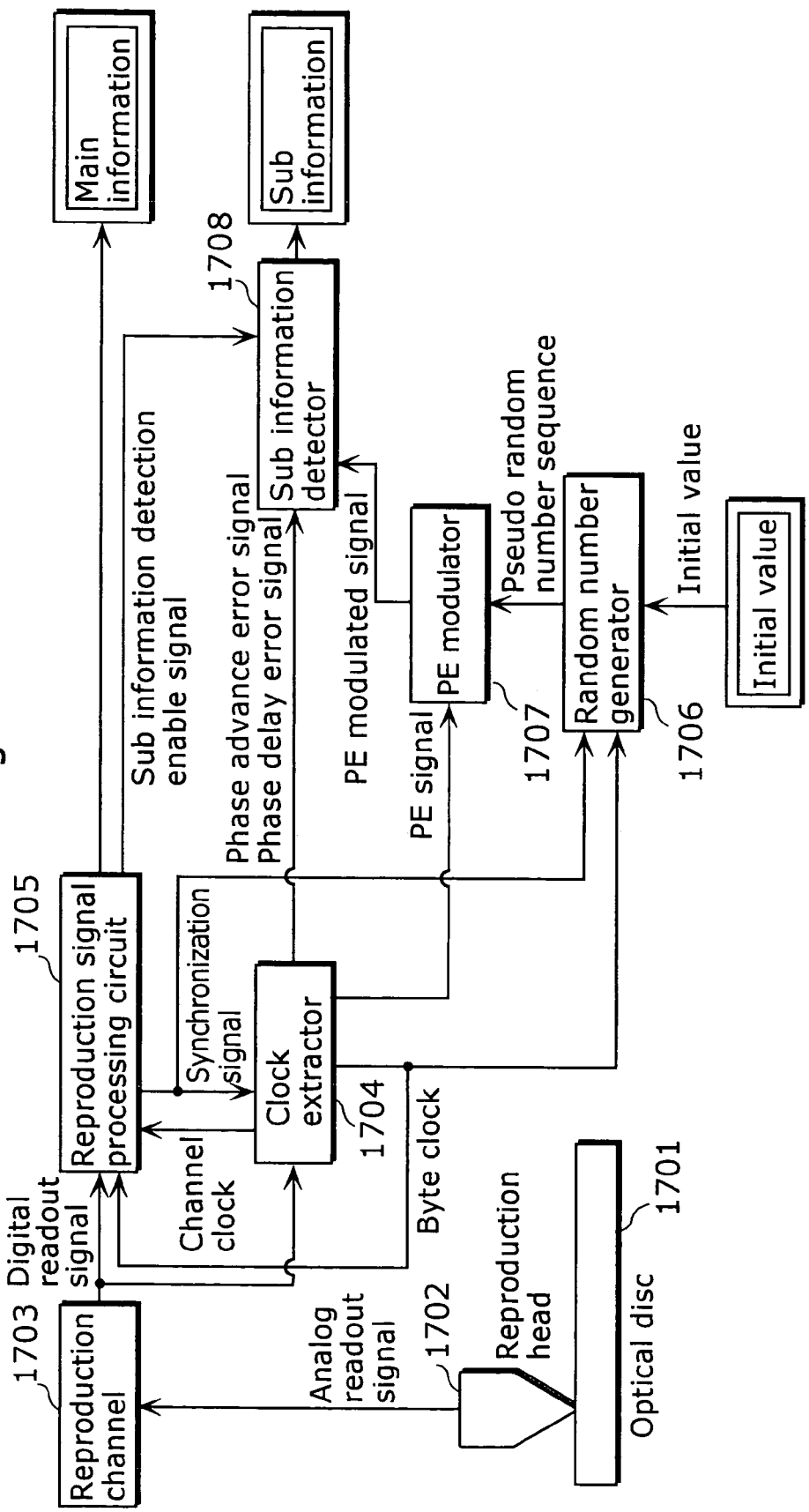
FIG. 25 is a block diagram showing a configuration of an optical disc reproduction apparatus according to a fourth embodiment of the present invention.

FIG. 25 is a block diagram showing the configuration of the optical disc reproduction apparatus according to the fourth embodiment of the present invention.

This optical disc reproduction apparatus is capable of reproducing main information on the basis of recording marks on an optical disc on which information has been recorded by the optical disc recording apparatus of the third embodiment as well as capable of detecting and reproducing sub information superimposed on jitters of the recording marks to be observed at the time of reproduction. Such optical disc reproduction apparatus is comprised of a reproduction head 1702, a reproduction channel 1703, a clock extractor 1704, a reproduction signal processing circuit 1705, a PE modulator 1707, a random number generator 1706, and a sub information detector 1708.

Here, the constituent elements other than the sub information detector 1708, that is, the reproduction head 1702, the reproduction channel 1703, the clock extractor 1704, the reproduction signal processing circuit 1705, the PE modulator 1707, and the random number generator 1706 respectively have the same functionality and configuration as those of the reproduction head 802, the reproduction channel 803, the clock extractor 804, the reproduction signal processing circuit 805, the PE modulator 807 and the random number generator 806 of the optical disc reproduction apparatus of the second embodiment shown in FIG. 12, and therefore explanations thereof are omitted.

The sub information detector 1708 according to the present embodiment is a circuit for detecting correlation between a phase advance error signal and a phase delay error signal outputted from the clock extractor 1704 and a PE modulated signal sent from the PE modulator 1707, as wells for detecting sub information.

Figure 26:
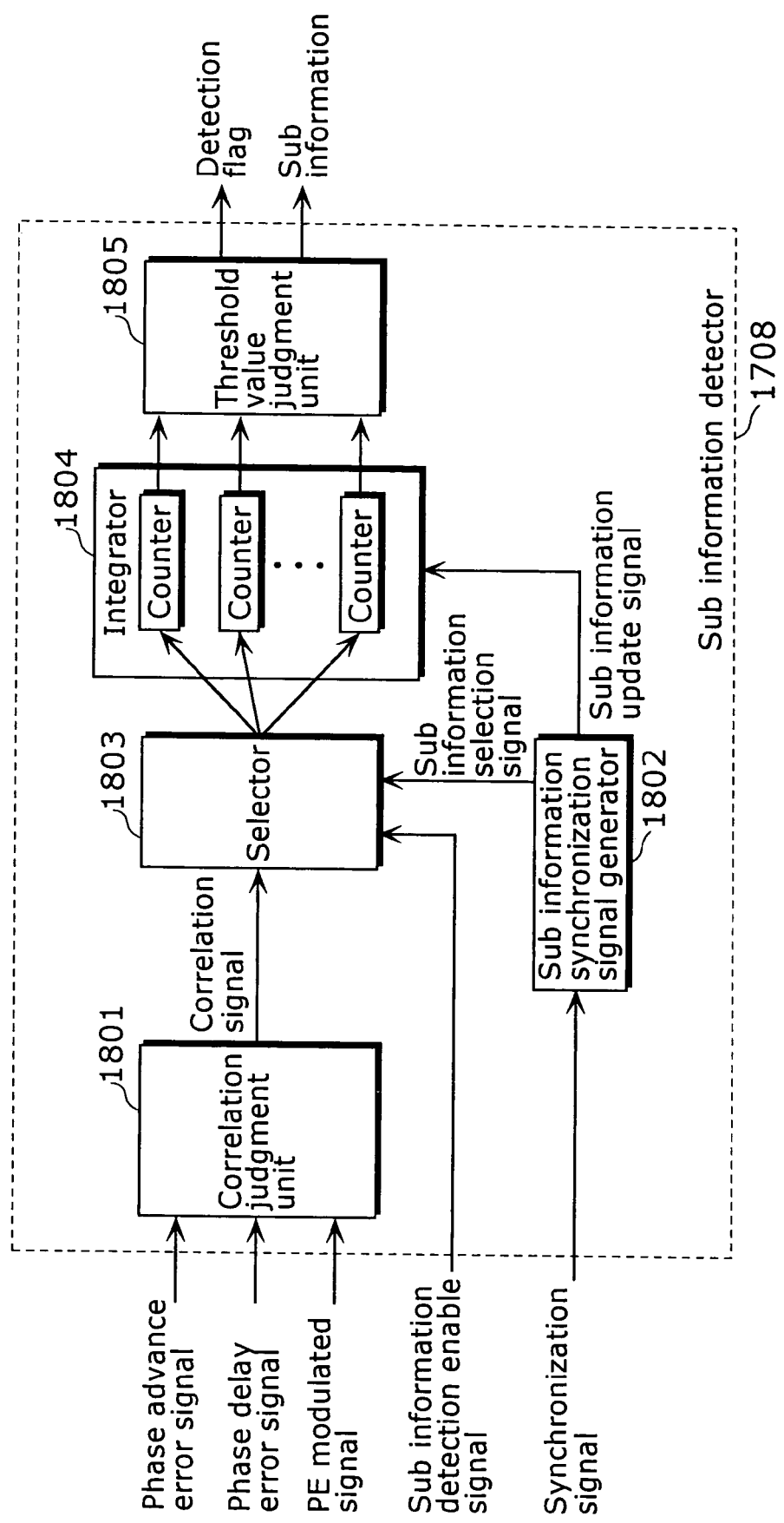
FIG. 26 is a block diagram showing a configuration of a sub information detector in the optical disc reproduction apparatus according to the fourth embodiment of the present invention.

FIG. 26 is a block diagram showing the configuration of the sub information detector 1708.

The sub information detector 1708 is comprised of a correlation judgment unit 1801, a selector 1803, an integrator 1804, a threshold judgment unit 1805, and a sub information synchronization signal generator 1802.

The correlation judgment unit 1801 outputs, to the selector 1803, "+1" as a correlation signal when the phase advance error signal is "H" and the PE modulated signal is "H", or when the phase delay error signal is "H" and the PE modulated signal is "L". On the other hand, the correlation judgment unit 1801 outputs, to the selector 1803, "−1" as a correlation signal when the phase advance error signal is "H" and the PE modulated signal is "L", or when the phase delay error signal is "H" and the PE modulated signal is "H".

The selector 1803, if detecting a sub information selection signal to be explained later from the sub information synchronization signal generator 1802 when a sub information detection enable signal is "H", determines where to output the above-mentioned correlation signal on the basis of such sub information selection signal, and outputs the correlation signal to the determined output destination.

The integrator 1804 has thirty two 12-bit UP/DOWN counters. When an UP/DOWN counter is determined to be the output destination by the selector 1803, it integrates values indicated by respective correlation signals obtained from the correlation judgment unit 1801 via the selector 1803. Then, on the detection of a sub information update signal to be explained later which is outputted from the sub information synchronization signal generator 1802, the integrator 1804 outputs, to the threshold judgment unit 1805, an integrated value signal indicating the integrated value determined in each of the counters, and clears each counter.

The threshold judgment unit 1805 is made up of a comparator and the like which decides, when detecting the integrated value signal from each counter of the integrator 1804, where in three sections separated by a predetermined positive threshold and a negative threshold, an integrated value indicated by an integrated value signal belongs to. The threshold judgment unit 1805 outputs an NRZ-format code string which shall be "1" when an integrated value is bigger than the above positive threshold and which shall be "0" when an integrated value is smaller than the above negative threshold, at the point of time when an integrated value signal is inputted from each counter of the integrator 1804, as well as setting a detection flag to "H". Moreover, the threshold judgment unit 1805 sets a detection flag to "L" when an integrated value belongs to the section between the above-mentioned two thresholds.

The sub information synchronization signal generator 1802 outputs a sub information selection signal to the selector 1803 on the basis of the input synchronization signal, and outputs a sub information update signal to the integrator 1804. In other words, the sub information synchronization signal generator 1802 specifies a counter in the integrator 1804 as an output destination of the selector 1803 by outputting a sub information selection signal to the selector 1803, and causes the threshold judgment unit 1805 to output an integrated value determined in each counter of the integrator 1804 and to clear the integrated value held in such counter by outputting a sub information update signal to the integrator 1804.

Figure 27:
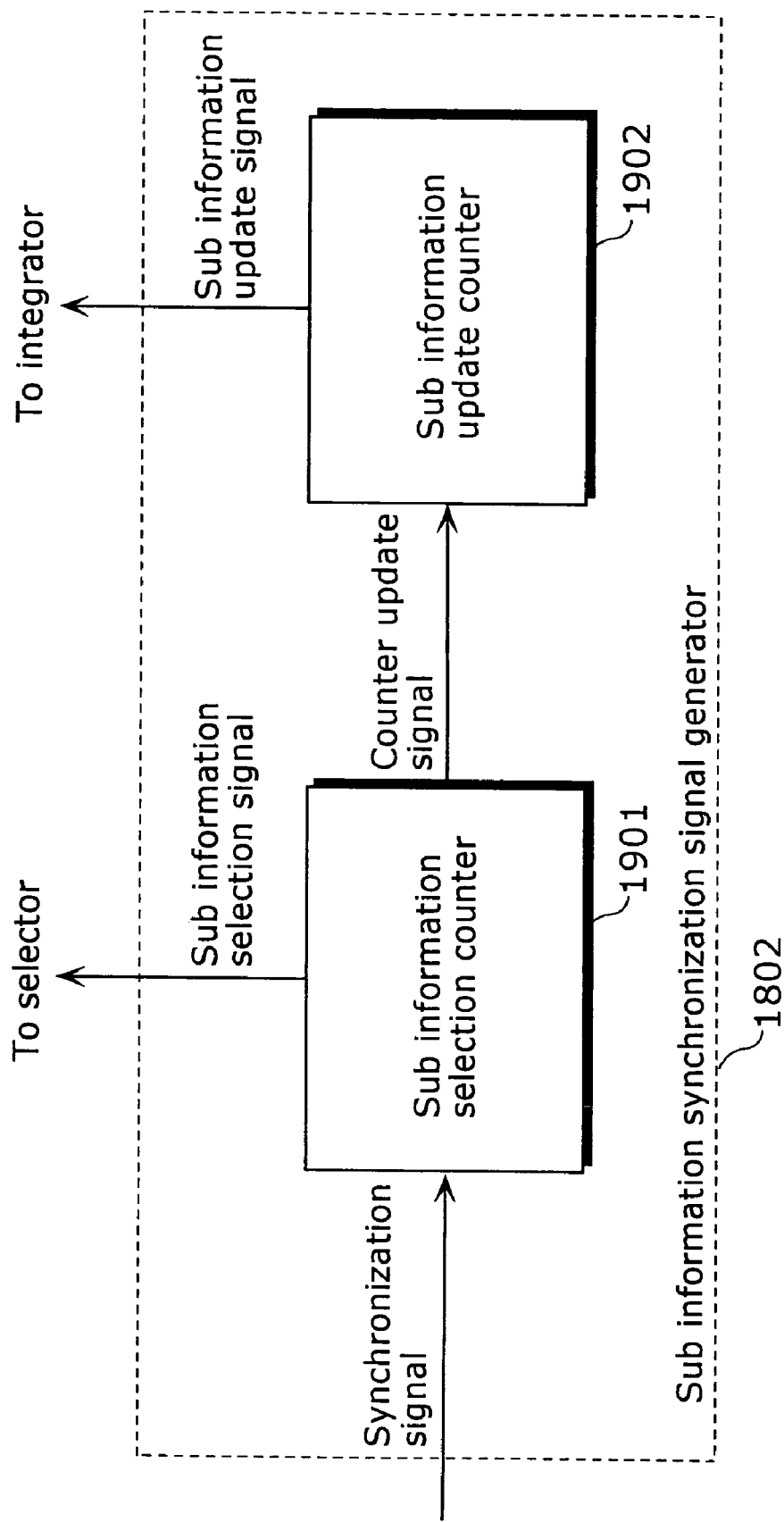
FIG. 27 is a block diagram showing a configuration of a sub information synchronization signal generator in the optical disc reproduction apparatus according to the fourth embodiment of the present invention.

FIG. 27 is a block diagram showing the configuration of the sub information synchronization signal generator 1802. The sub information synchronization signal generator 1802 is made up of a sub information selection counter 1901 and a sub information update counter 1902.

The sub information selection counter 1901, which is an UP counter capable of holding values from 0 to 31, counts the number of times the synchronization signal is detected (synchronization detection time). More specifically, on the detection of the synchronization signal, the sub information selection counter 1901 outputs, to the selector 1803, a sub information selection signal instructing that a counter appropriate for the synchronization detection time before such synchronization signal is detected, should be selected from the integrator 1804. Then, the sub information selection counter 1901 judges whether the synchronization detection time is "31" or not, and adds "1" to the synchronization detection time when it is not "31". Meanwhile, when judging that the synchronization detection time is "31", the sub information selection counter 1901 outputs a counter update signal to the sub information update counter 1902, and clears the synchronization detection time.

The sub information update counter 1902, which is an UP counter capable of holding values from 0 to 2, counts the number of times counter update signals is detected (update detection time). More specifically, on the detection of a counter update signal, the sub information update counter 1902 judges whether the update detection time is "2" or not, and adds "1" to the update detection time when it is not "2". Meanwhile, when judging that the update detection time is "2", the sub information update counter 1902 outputs a sub information update signal to the integrator 1804, and clears the update detection time. To put it another way, the sub information update counter 1902 outputs a sub information update signal when the synchronization detection time reaches (32×3).

Figure 28:
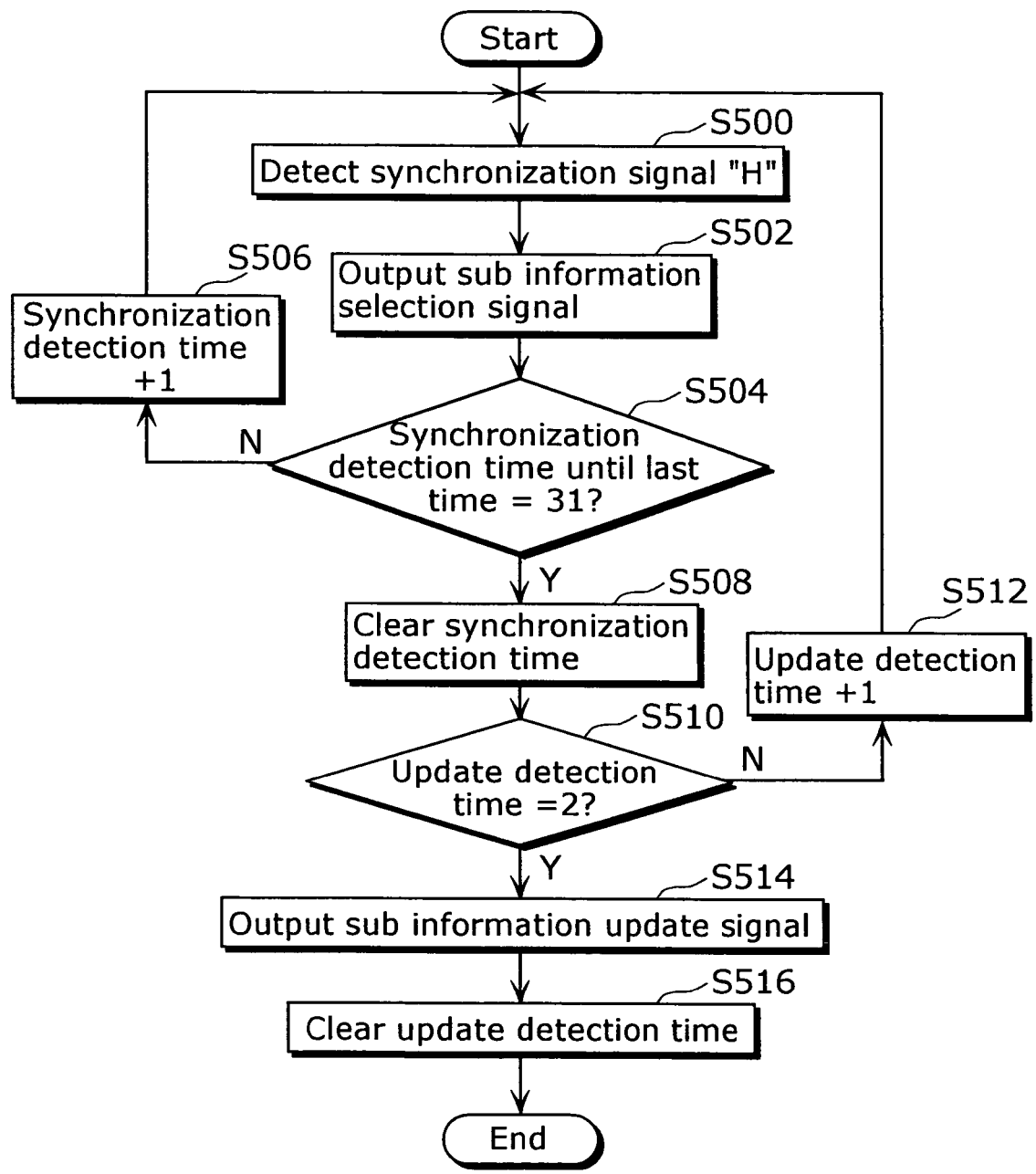
FIG. 28 is an operation flowchart showing an operation of the sub information synchronization signal generator in the optical disc reproduction apparatus according to the fourth embodiment of the present invention.

FIG. 28 is an operation flowchart showing the operation of the sub information synchronization signal generator 1802.

First, when detecting the synchronization signal (Step S500), the sub information selection counter 1901 outputs a sub information selection signal instructing that a counter appropriate for the synchronization detection time before such synchronization signal is detected, should be selected from the integrator 1804 (Step S502). Then, the sub information selection counter 1901 judges whether the synchronization detection time is "31" or not (Step S504), and when judging that the value has not reached "31" (N in Step S504), adds "1" to the synchronization detection time (Step S506), and repeats steps starting from Step S500. Meanwhile, when judging that the synchronization detection time is "31" (Y in Step S504), the sub information selection counter 1901 outputs a counter update signal indicative of such judgment result and clears the synchronization detection time (Step S508).

Subsequently, on the detection of the counter update signal, the sub information update counter 1902 judges whether the update detection time is "2" or not before such counter update signal is detected (Step S510). Here, when judging that the update detection time has not reached "2" (No in Step S510), the sub information update counter 1902 adds "1" to such update detection time (Step S512). Meanwhile, when judging that the update detection time is "2" (Y in Step S510), the sub information update counter 1902 outputs a sub information update signal to the integrator 1804 (Step S514), and clears the update detection time (Step S516).

Figure 29:
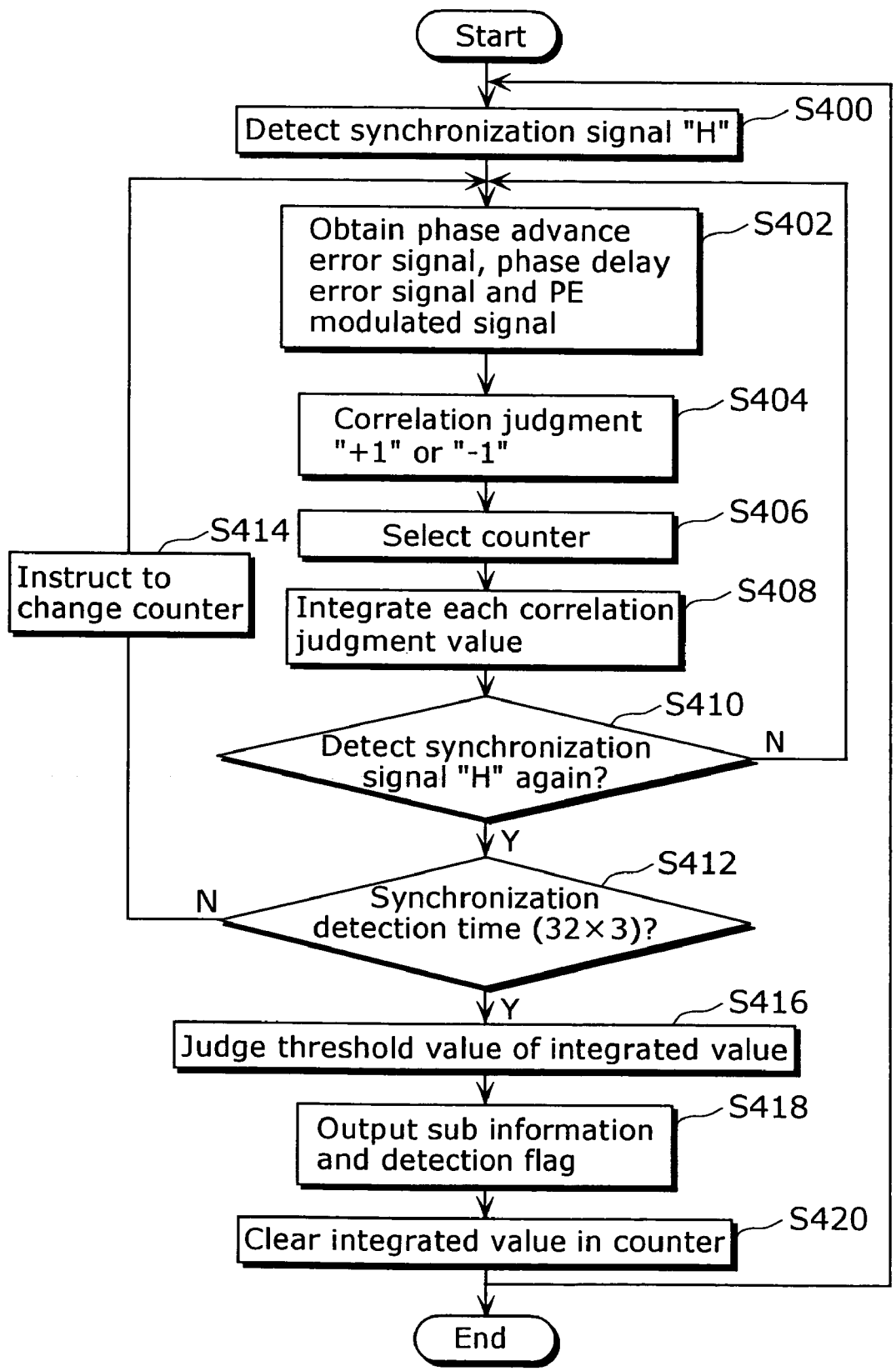
FIG. 29 is an operation flowchart showing an operation of the sub information detector in the optical disc reproduction apparatus according to the fourth embodiment of the present invention.

Here, referring to FIG. 29, an explanation is given of an overall operation of the sub information detector 1708 with the above configuration.

FIG. 29 is an operation flowchart showing the operation of the sub information detector 1708.

First, when the sub information synchronization signal generator 1802 detects the synchronization signal (Step S400) and the correlation judgment unit 1801 obtains the phase advance error signal and the phase delay error signal, as well as a PE modulated random number sequence (Step S402), the correlation judgment unit 1801 makes a judgment on correlation according to each of such signals, determines a correlation judgment value "+1" or "−1", and outputs a correlation signal indicating such correlation judgment value (Step S404).

Next, the selector 1803 selects a counter in the integrator 1804, on the basis of a sub information selection signal outputted by the sub information synchronization signal generator 1802 that has detected the synchronization signal (Step S406). The selected counter integrates each correlation judgment value (Step S408).

Here, when the synchronization signal is not detected again (N in Step S410), the sub information detector 1708 repeats steps starting from Step S402, and when the synchronization signal is detected again (Y in Step S410), the sub information synchronization signal generator 1802 judges whether the synchronization detection time is (32×3) or not (Step S412).

In Step S412, when the synchronization detection time is judged not to have reached (32×3) (N in Step S412), the sub information synchronization signal generator 1802 outputs a sub information selection signal instructing that a counter in the integrator 1804 which is different from one selected in Step S406 should be selected (Step S414), and the sub information detector 1708 repeats steps starting from Step S402, with the above sub information selection signal being outputted.

Meanwhile, in Step S412, when the synchronization detection time is judged to be (32×3) (Y in Step S412), the threshold judgment unit 1805 makes a threshold judgment on the integrated values determined in the respective 32 counters of the integrator 1804 (Step S416), and outputs sub information and detection flags on the basis of the results of judgments (Step S418). After this, each counter of the integrator 1804 will be cleared (Step S420), and the sub information detector 1708 repeats steps starting from Step S400.

As described above, the sub information detector 1708 according to the present embodiment integrates correlation judgment values on 32 frames, i.e. three frames, each of which is located 16 lines apart from each other, and detects 1-bit sub information superimposed on such three frames. Accordingly, it becomes possible to detect original sub information from an optical disc on which main information and sub information are recorded by the optical disc recording apparatus according to the third embodiment.

Next, referring to FIGS. 25 and 26, an explanation is given of the reproduction operation of the optical disc reproduction apparatus according to the present embodiment.

First, when the clock extractor 1704 detects the synchronization signal outputted by the reproduction signal processing circuit 1705, a phase error is detected between a leading edge of the clock and an edge of the digital readout signal, and "H" in the phase advance error signal or the phase delay error signal is outputted to the sub information detector 1708. Then, the random number generator 1706 outputs a pseudo random number sequence to the PE modulator 1707, on the detection of the synchronization signal outputted by the reproduction signal processing circuit 1705 and a byte clock outputted by the clock extractor 1704. The PE modulator 1707 performs PE modulation on such pseudo random number sequence, and outputs it to the sub information detector 1708 as a PE modulated signal.

Next, the sub information detector 1708 makes a judgment on correlation between "H" in the phase advance error signal or the phase delay error signal and the PE modulated signal using the correlation judgment unit 1801, and outputs the resulting correlation signal to the selector 1803. The selector 1803 outputs the correlation signal to a counter in the integrator 1804 selected by the sub information selection signal which has been outputted by the sub information synchronization signal generator 1802 on the basis of the synchronization signal, only for an interval where the sub information detection enable signal from the reproduction signal processing circuit 1705 is "H". After integrating correlation judgment values indicated by respective correlation signals by use of the counter selected by the selector 1803 and detecting the sub information update signal outputted by the sub information synchronization signal generator 1802, the integrator 1804 outputs, to the threshold judgment unit 1805, the integrated value determined in each counter. The threshold judgment unit 1805 outputs a detection flag "H" and "1" as sub information when an integrated value is bigger than the above positive threshold, outputs a detection flag "H" and "0" as sub information when an integrated value is smaller than the above negative threshold, and outputs a detection flag "L" without outputting sub information when an integrated value belongs to the section between the above-mentioned two thresholds. The above processes are repeated for reproducing sub information.

As described above, in the optical disc reproduction apparatus according to the present embodiment, since the sub information detector 1708 selects and outputs sub information recorded in three frames, each of which is 16 lines apart from each other, on the basis of the synchronization signal, it is possible to correctly reproduce sub information from an optical disc on which information is recorded by the optical disc recording apparatus according to the third embodiment.

In other words, the optical disc reproduction apparatus according to the present embodiment is an optical disc reproduction apparatus that reproduces main information and sub information from an optical disc on which sub information is recorded by displacing the edges of recording marks by a minute amount on the basis of a binary sequence code, when recording the main information in consecutive frames in a distributed manner by forming optically-readable recording marks. Since such optical disc reproduction apparatus is equipped with a sequence generation means for generating the binary sequence code and a detection means for detecting M-bit sub information (M is a natural number: M is 1 in the present embodiment) from any one of or all of N inconsecutive frames (N is a natural number: N is 3 in the present embodiment), the optical disc reproduction apparatus is capable of reproducing sub information correctly from an optical disc on which identical pieces of sub information is recorded in a distributed manner by the optical disc recording apparatus according to the third embodiment.

Furthermore, in the optical disc reproduction apparatus of the present embodiment, the detection means detects K-bit sub information (K is a natural number: M is 32 bit in the present embodiment) from each of consecutive frames every M-bits, and detects sub information from one of the N frames, each of which is apart from each other by K/M frames, the sub information being identical to one superimposed on another frame in the N frames. Accordingly, it becomes possible for such optical disc reproduction apparatus to correctly reproduce sub information from an optical disc on which identical pieces of sub information is recorded in a distributed manner by the optical disc recording apparatus according to the third embodiment in the N frames, each of which is apart from each other by K/M frames. Also, since K/M is 32 in the present embodiment, it is possible for sub information to be reproduced at a rate equivalent to that of main information even in the event of a burst error.

Moreover, by being equipped with a displacement detection means for detecting displacements of the edges, a correlation derivation means for deriving a correlation value on the basis of the displacements detected by the displacement detection means and on the binary sequence code generated by the sequence generation means, and an integration means for integrating each correlation value, derived by the correlation derivation means, with respect to the N inconsecutive frames, and by detecting M-bit sub information on the basis of an integrated value determined by the integration means, the optical disc reproduction apparatus is capable of reproducing sub information correctly from an optical disc on which identical pieces of sub information is recorded in a distributed manner by the optical disc recording apparatus according to the third embodiment.

Note that by incorporating the initial value operation unit 809 of the optical disc reproduction apparatus described in the first embodiment into the optical disc reproduction apparatus according to the present embodiment, it is possible to reproduce sub information which has been recorded in such a manner as allows the reduction in a rate at which the whole bits of sub information are detected, by changing initial values of a random number sequence.

The optical disc reproduction apparatus according to the present invention related to jitter modulation has been explained on the basis of the present embodiment, but it should be understood that the present invention is not restricted to such embodiment. Also note that it is also possible to embody the present invention as a reproduction method which includes, as its steps, the characteristic constituent elements of the optical disc reproduction apparatus.

(Variation)

Next, an explanation is given of an example of a variation of the optical disc reproduction apparatus according to the present embodiment.

Instead of the above-described sub information detector 1708, the optical disc reproduction apparatus according to this variation example includes a sub information detector which operates differently from the sub information detector 1708.

This sub information detector reproduces identical pieces of 1-bit sub information recorded in each of three frames by the optical disc recording apparatus according to the third embodiment as 3-bit divided sub information recorded on a frame-by-frame basis, and reproduces a value in these three frames which appears most frequently as a 1 bit of the original sub information.

Figure 30:
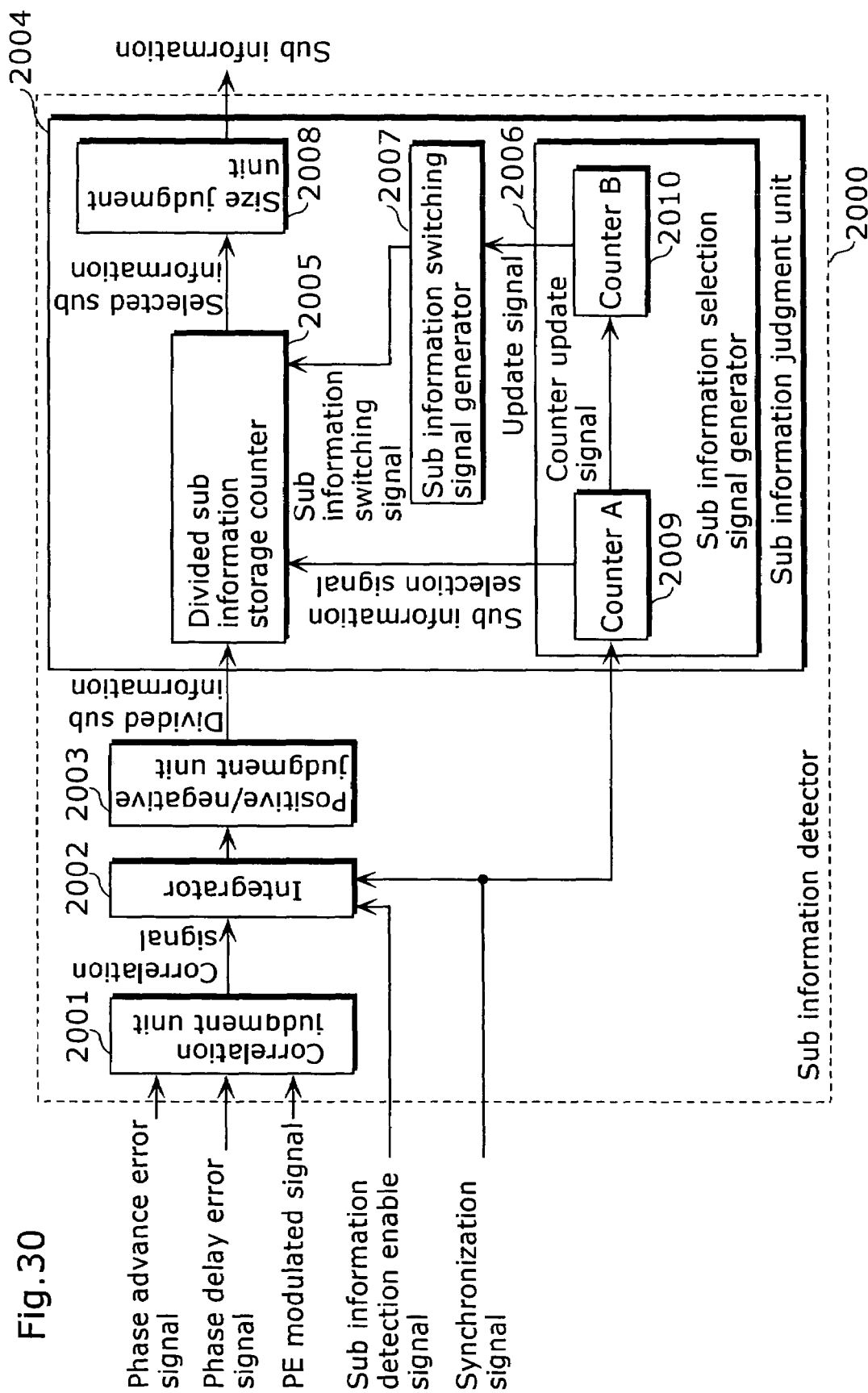
FIG. 30 is a block diagram showing a configuration of another sub information detector according to the fourth embodiment of the present invention.

FIG. 30 is a block diagram showing the configuration of a sub information detector 2000 according to the above-mentioned variation example.

This sub information detector 2000 is made up of a correlation judgment unit 2001, an integrator 2002, a positive/negative judgment unit 2003, and a sub information judgment unit 2004.

An explanation of the correlation judgment unit 2001 is omitted since it has the same functionality and configuration as those of the correlation judgment unit 1801 shown in FIG. 26.

The integrator 2002, which is a 12-bit UP/DOWN counter, integrates correlation judgment values indicated by respective correlation signals from the correlation judgment unit 2001, when a sub information detection enable signal is "H". Then, on the detection of a synchronization signal, the integrator 2002 outputs an integrated value to the positive/negative judgment unit 2003 as an integrated value signal, and then clears such integrated value.

The positive/negative judgment unit 2003 is made up of a comparator and the like which judges, when detecting the integrated value signal from the integrator 2002, whether or not an integrated value indicated by such integrated value signal is positive or "0" (to be referred to as "positive/negative judgment" hereinafter). In other words, the positive/negative judgment unit 2003 outputs, as divided sub information, an NRZ-format code string to the sub information judgment unit 2004 which shall be "1" when the integrated value is positive or "0" and which shall be "0" when the integrated value is negative at the point of time when the integrated value signal is inputted from the integrator 2002, The sub information judgment unit 2004 regards, as sub information, divided sub information indicating a value which appears most frequently out of values ("0" or "1") that indicate three pieces of divided sub information, each being outputted corresponding to three frames in which identical 1-bit sub information is recorded. Such sub information judgment unit 2004 is made up of a sub information selection signal generator 2006, a sub information switching signal generator 2007, a divided sub information storage counter 2005, and a size judgment unit 2008.

A counter A2009 and a counter B2010 of the sub information selection signal generator 2006 and the sub information switching signal generator 2007 have the same functionalities and configurations as those of the counter A1604 and the counter B1605 of the sub information selection signal generator 1601 and the sub information switching signal generator 1602 shown in FIG. 20, and operate in a manner equivalent to the one shown in FIGS. 21~23.

The divided sub information storage counter 2005 has thirty-two 2-bit UP counters. When divided sub information and the synchronization signal are inputted to the sub information judgment unit 2004, one of the 32 counters specified by a sub information selection signal outputted by the sub information selection signal generator 2006 integrates values indicated by the respective divided sub information, and the divided sub information storage counter 2005 outputs, to the size judgment unit 2008, selected sub information with the contents indicating an integrated value determined in each of the counters at the timing indicated by a sub information switching signal, and clears the integrated value held in each of the counters. Here, assuming that a value indicated by the sub information selection signal is "a" and a value indicated by the sub information switching signal is "c", divided sub information that the divided sub information storage counter 2005 has obtained from the positive/negative judgment unit 2003 is (a+32c+1)th sub information, and the divided sub information storage counter 2005 integrates values indicated by the respective divided sub information, using the (a+1)th counter.

The size judgment unit 2008 judges the size of the integrated value determined in a counter in the divided sub information storage counter 2005 indicated by the selected sub information (to be referred to as "size judgment" hereinafter), and outputs "1" when the integrated value is "2" or larger, whereas it outputs "0" when the integrated value is "1" or smaller.

Figure 31:
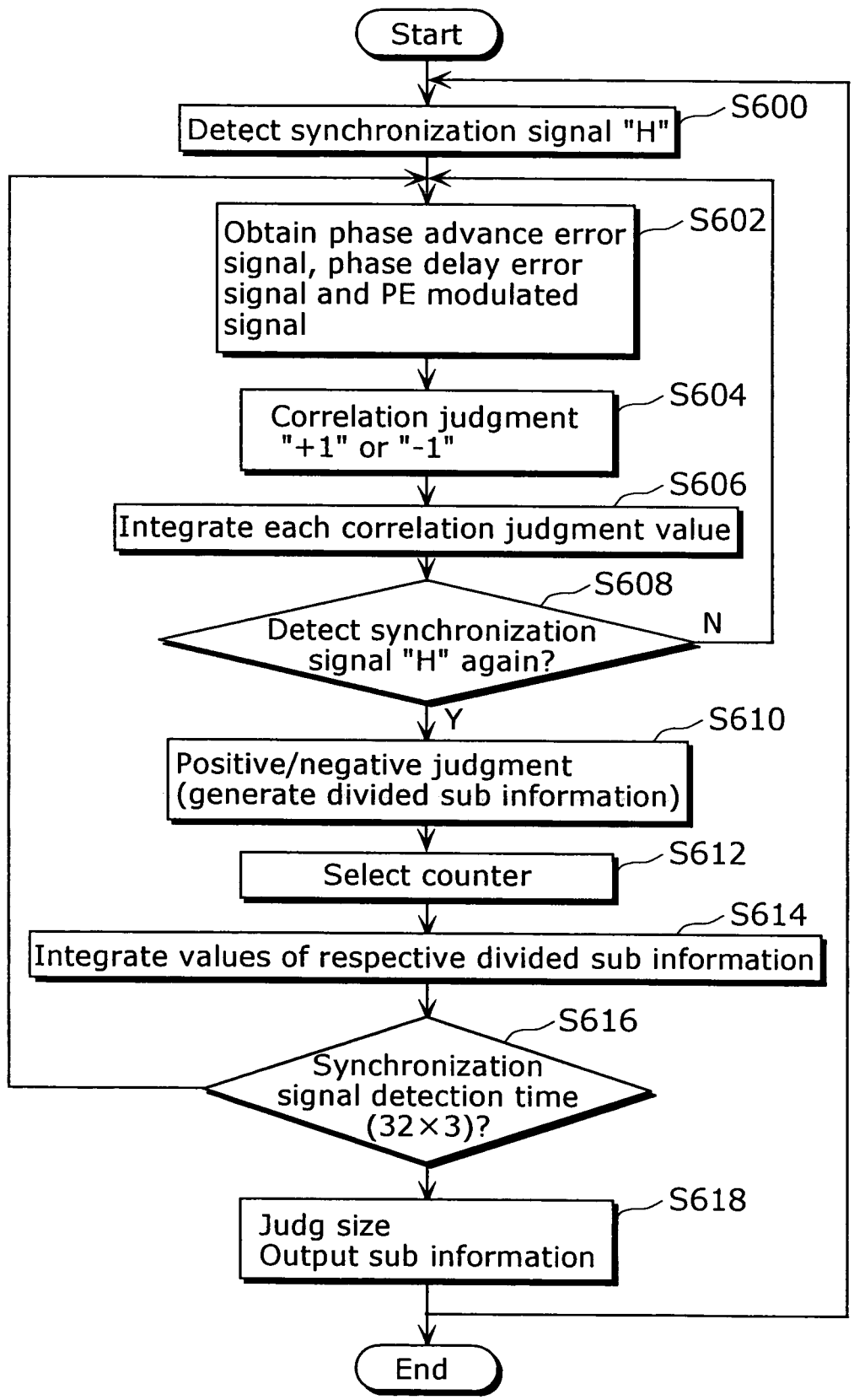
FIG. 31 is an operation flowchart showing an operation of said another sub information detector according to the fourth embodiment of the present invention.

FIG. 31 is an operation flowchart showing the operation of the sub information detector 2000.

First, when the integrator 2002 detects "H" in the synchronization signal when the sub information detection enable signal is "H" (Step S600) and the correlation judgment unit 2001 obtains the phase advance error signal and the phase delay error signal as well as a PE modulated random number sequence (Step S602), the correlation judgment unit 2001 judges correlation on the basis of each of these signals so as to determine "+1" or "−1" as a value of a correlation judgment value (Step S604) and the integrator 2002 integrates each correlation judgment value every time a correlation judgment value is determined (Step S606).

Here, when "H" in the synchronization signal is not detected again (N in Step S608), the sub information detector 2000 repeats steps starting from Step S602, and when "H" in the synchronization signal is detected again (Y in Step S608), the integrator 2002 notifies the positive/negative judgment unit 2003 of each integrated value determined in the above manner so as to have it make a positive/negative judgment on such integrated value (Step S610).

When obtaining divided sub information indicating the value shown by each judgment made by the positive/negative judgment unit 2003, the divided sub information storage counter 2005 in the sub information judgment unit 2004 selects one counter from among its 32 counters on the basis of a sub information selection signal outputted by the sub information selection signal generator 2006 (Step S612).

Then, the divided sub information storage counter 2005 integrates values indicated by the respective pieces of divided sub information, using the counter selected in the above manner (Step S614).

Here, the divided sub information storage counter 2005 judges whether the synchronization detection time has reached (32×3) on the basis of the sub information switching signal outputted by the sub information switching signal generator 2007 (Step S616).

When the divided sub information storage counter 2005 judges that the synchronization detection time has not reached (32×3) (N in Step S616), the sub information detector 2000 repeats steps starting from Step S602. When judging that the synchronization detection time has reached (32×3) (Y in Step S616), the divided sub information storage counter 2005 causes the size judgment unit 2008 to make a size judgment on each of integrated values determined in each of its counter (Step S618). More specifically, when this is done, the size judgment unit 2008 outputs sub information indicating "1", when an integrated value determined in each of the 32 counters of the divided sub information storage counter 2005 is "2" or larger, and outputs sub information indicating "0", when such integrated value is "1" or smaller. After this, the sub information detector 2000 repeats steps starting from Step S600.

By integrating, in the divided sub information storage counter 2005, values indicated by respective pieces of divided sub information corresponding to three frames in which identical pieces of 1-bit sub information is recorded after making a judgment on the pieces of divided sub information on a frame-by-frame basis, and by specifying sub information on the basis of the size of the resulting integrated value, the sub information detector 2000 with the above configuration regards one piece of the divided sub information that appears most frequently as sub information, out of the pieces of divided sub information corresponding to the above three frames.

Accordingly, although the number of bits required for counters making up the integrator 1804 is 12 bits×32=384 bits in the case of the sub information detector 1708, 2 bits×32+12 bits=76 bits is enough as the number of bits required for counters of the divided sub information storage counter 2005 and for counters of the integrator 2002 in the case of the sub information detector 2000. This allows a reduction in the capacity of counters.

Also, in the optical disc reproduction apparatus according to this variation example, a detection means, unlike the detection means described in the above embodiment, includes a displacement detection means for detecting displacements of the edges, a correlation derivation means for deriving a correlation value based on the displacements detected by the displacement detection means and on the binary sequence code generated by the sequence generation means, an integration means for integrating each correlation value, derived by the correlation derivation means, with respect to each of the N inconsecutive frames, and a judgment means for making a judgment on sub information on each of the frames based on the integrated value determined by the integration means, and sub information with the largest number of mutually identical sub information is regarded as M-bit sub information detected in the N frames, out of plural pieces of sub information on which the judgment unit has made a judgment. Accordingly, sub information that appears most frequently is detected out of the plural pieces of sub information on which a judgment has been made on frame-by-frame basis. This allows sub information to be correctly reproduced from an optical disc on which identical pieces of sub information is recorded in a distributed manner by the optical disc recording apparatus according to the third embodiment.

Note that it is possible to embody the present invention as a reproduction method which includes, as its steps, the characteristic constituent elements of the optical disc reproduction apparatus equipped with the sub information detector 2000 with the above configuration.

INDUSTRIAL APPLICABILITY

The optical disc recording method and the optical disc reproduction method according to the present inventions is suited to be employed by an optical disc recording apparatus for recording information such as digital copyrighted works onto an optical disc including a DVD as well as by an optical disc reproduction apparatus for reproducing such information from the optical disc.

The invention claimed is:

1. An optical disc recording method for superimposing sub information by displacing edges of one or more optically-readable recording marks by a minute amount on the basis of a binary sequence code, when recording main information by forming said one or more recording marks, the optical disc recording method comprising:
   a sequence generation step of generating a first binary sequence code and a second binary sequence code that is different from the first binary sequence code;
   a first displacement step of displacing one of the edges according to the first binary sequence code;
   a second displacement step of displacing another of the edges according to the second binary sequence code; and
   a main information division step of dividing the main information into a plurality of consecutive frames,
   wherein, in the first and second displacement steps, the edges are displaced so that M-bit (M is a natural number) sub information is superimposed on N (N is a natural number) of the frames.

2. The optical disc recording method according to claim 1,
   wherein, in the first and second displacement steps, the N frames are consecutive.

3. The optical disc recording method according to claim 2,
   wherein, in the first displacement step, said one of the edges of any one of the plurality of frames is displaced on the basis of the first binary sequence code, and
   in the second displacement step, said another of the edges of another one of the plurality of frames is displaced on the basis of the second binary sequence code.

4. The optical disc recording method according to claim 3,
   wherein the first and second binary sequence codes are M sequence codes.

5. The optical disc recording method according to claim 4,
   wherein initial values of the first and second binary sequence codes are different from each other.

6. The optical disc recording method according to claim 5, further comprising an initial value operation step of deriving the initial value of the second binary sequence code by performing an operation based on the initial value of the first binary sequence code.

7. The optical disc recording method according to claim 4,
   wherein generating polynomials for generating the first and second binary sequence codes are different from each other.

8. The optical disc recording method according to claim 1,
   wherein, in the first and second displacement steps, the N frames are inconsecutive, and the edges are displaced so that identical M-bit sub information is superimposed on each of said frames.

9. The optical disc recording method according to claim 8,
   wherein, in the first and second displacement steps, K-bit (K is a natural number) sub information is superimposed on each of the consecutive frames every M bit, and the N frames are apart from each other by K/M frames.

10. The optical disc recording method according to claim 9,
    wherein the K/M is 32.

11. An optical disc reproduction method for reproducing main information and sub information from an optical disc on which said sub information is superimposed by displacing an edge of an optically-readable recording mark by a minute amount on the basis of a binary sequence code, when recording said main information by forming said recording mark, the optical disc reproduction method comprising:
    a sequence generation step of generating a first binary sequence code and a second binary sequence code that is different from the first binary sequence code; and
    a detection step of detecting the sub information based on the first and second binary sequence codes,
    wherein the main information is divided and recorded in a plurality of consecutive frames, and
    in the detection step, M-bit (M is a natural number) sub information is detected from N (N is a natural number) of the frames.

12. The optical disc reproduction method according to claim 11,
    wherein, in the detection step, the N frames are consecutive.

13. The optical disc reproduction method according to claim 12,
wherein, in the detection step, sub information in any one of the plurality of frames is detected on the basis of the first binary sequence code, and sub information in another one of the plurality of frames is detected on the basis of the second binary sequence code.

14. The optical disc reproduction method according to claim 13,
wherein the first and second binary sequence codes are M sequence codes.

15. The optical disc reproduction method according to claim 14,
wherein initial values of the first and second binary sequence codes are different from each other.

16. The optical disc reproduction method according to claim 15, further comprising an initial value operation step of deriving the initial value of the second binary sequence code by performing an operation based on the initial value of the first binary sequence code.

17. The optical disc reproduction method according to claim 14,
wherein generating polynomials for generating the first and second binary sequence codes are different from each other.

18. The optical disc reproduction method according to claim 11,
wherein, in the detection step, the N frames are inconsecutive, and the m-bit sub information is detected from any one of the N frames.

19. The optical disc reproduction method according to claim 18,
wherein, in the detection step, K-bit (K is a natural number) sub information is detected from each of the consecutive frames every M bit, and sub information is detected from any one of the N frames that are apart from each other by K/M frames, the sub information being identical to sub information superimposed on another frame out of the N frames.

20. The optical disc reproduction method according to claim 19,
wherein the K/M is 32.

21. The optical disc reproduction method according to claim 20,
wherein the detection step includes the following steps:
a displacement detection step of detecting a displacement of the edge;
a correlation derivation step of deriving a correlation value based on the displacement detected in the displacement detection step and one of the binary sequence codes generated in the sequence generation step; and
an integration step of integrating each correlation value derived in the correlation derivation step for the N frames which are inconsecutive,
wherein the m-bit sub information is detected on the basis of an integrated value determined in the integration step.

22. The optical disc reproduction method according to claim 20,
wherein the detection step includes the following steps:
a displacement detection step of detecting a displacement of the edge;
a correlation derivation step of deriving a correlation value based on the displacement detected in the displacement detection step and one of the binary sequence codes generated in the sequence generation step;
an integration step of integrating each correlation value derived in the correlation derivation step for each of the N frames which are inconsecutive; and
a judgment step of making a judgment on plural pieces of sub information on a frame-by-frame basis based on an integrated value determined in the integration step,
wherein sub information is regarded as the m-bit sub information detected from the N frames, the sub information having a largest number of sub information identical to said sub information, out of the plural pieces of sub information on which the judgment is made in the judgment step.

23. An optical disc recording apparatus for superimposing sub information by displacing edges of one or more optically-readable recording marks by a minute amount on the basis of a binary sequence code, when recording main information by forming said one or more recording marks, the optical disc recording apparatus comprising:
a sequence generation unit operable to generate a first binary sequence code and a second binary sequence code that is different from the first binary sequence code;
a first displacement unit operable to displace one of the edges according to the first binary sequence code;
a second displacement unit operable to displace another of the edges according to the second binary sequence code; and
a main information division unit operable to divide the main information into a plurality of consecutive frames,
wherein the first and second displacement units displace the edges so that M-bit (M is a natural number) sub information is superimposed on N (N is a natural number) of the frames.

24. The optical disc recording apparatus according to claim 23,
wherein the first and second displacement units displace the edges of the N frames which are consecutive.

25. The optical disc recording apparatus according to claim 24,
wherein the first displacement unit displaces said one of the edges of any one of the plurality of frames on the basis of the first binary sequence code, and
the second displacement unit displaces said another of the edges of another one of the plurality of frames on the basis of the second binary sequence code.

26. The optical disc recording apparatus according to claim 25,
wherein the first and second binary sequence codes are M sequence codes.

27. The optical disc recording apparatus according to claim 26,
wherein initial values of the first and second binary sequence codes are different from each other.

28. The optical disc recording apparatus according to claim 27, further comprising an initial value operation unit operable to derive the initial value of the second binary sequence code by performing an operation based on the initial value of the first binary sequence code.

29. The optical disc recording apparatus according to claim 26,
wherein generating polynomials for generating the first and second binary sequence codes are different from each other.

30. The optical disc recording apparatus according to claim 26,
wherein the first and second displacement units displace the edges so that identical m-bit sub information is superimposed on each of the N frames which are inconsecutive.

31. The optical disc recording apparatus according to claim 30,
wherein the first and second displacement units displace the edges so that K-bit (K is a natural number) sub information is superimposed on each of the consecutive frames every M bit and the N frames are apart from each other by K/M frames.

32. The optical disc recording apparatus according to claim 31,
wherein the K/M is 32.

33. An optical disc reproduction apparatus for reproducing main information and sub information from an optical disc on which said sub information is superimposed by displacing an edge of an optically-readable recording mark by a minute amount on the basis of a binary sequence code, when recording said main information by forming said recording mark, the optical disc reproduction apparatus comprising:
a sequence generation unit operable to generate a first binary sequence code and a second binary sequence code that is different from the first binary sequence code; and
a detection unit operable to detect the sub information based on the first and second binary sequence codes,
wherein the main information is divided and recorded in a plurality of consecutive frames, and
the detection unit detects M-bit (M is a natural number) sub information from N (N is a natural number) of the frames.

34. The optical disc reproduction apparatus according to claim 33,
wherein the detection unit detects sub information from the N frames which are consecutive.

35. The optical disc reproduction apparatus according to claim 34,
wherein the detection unit detects sub information in any one of the plurality of frames on the basis of the first binary sequence code, and detects sub information in another one of the plurality of frames on the basis of the second binary sequence code.

36. The optical disc reproduction apparatus according to claim 35,
wherein the first and second binary sequence codes are M sequence codes.

37. The optical disc reproduction apparatus according to claim 36,
wherein initial values of the first and second binary sequence codes are different from each other.

38. The optical disc reproduction apparatus according to claim 37, further comprising an initial value operation unit operable to derive the initial value of the second binary sequence code by performing an operation based on the initial value of the first binary sequence code.

39. The optical disc reproduction apparatus according to claim 36,
wherein generating polynomials for generating the first and second binary sequence codes are different from each other.

40. The optical disc reproduction apparatus according to claim 33,
wherein the detection unit detects the M-bit sub information from any one of the N frames which are inconsecutive.

41. The optical disc reproduction apparatus according to claim 40,
wherein the detection unit detects K-bit (K is a natural number) sub information from each of the consecutive frames every M bit, and detects sub information from any one of the N frames that are apart from each other by K/M frames, the sub information being identical to sub information superimposed on another frame out of the N frames.

42. The optical disc reproduction apparatus according to claim 41,
wherein the K/M is 32.

43. The optical disc reproduction apparatus according to claim 42,
wherein the detection unit includes:
a displacement detection unit operable to detect a displacement of the edge;
a correlation derivation unit operable to derive a correlation value based on the displacement detected by the displacement detection unit and one of the binary sequence codes generated by the sequence generation unit; and
an integration unit operable to integrate each correlation value derived by the correlation derivation unit for the N frames which are inconsecutive, and
the displacement detection unit detects the M-bit sub information on the basis of an integrated value determined by the integration unit.

44. The optical disc reproduction apparatus according to claim 42,
wherein the detection unit includes:
a displacement detection unit operable to detect a displacement of the edge;
a correlation derivation unit operable to derive a correlation value based on the displacement detected by the displacement detection unit and one of the binary sequence codes generated by the sequence generation unit;
an integration unit operable to integrate each correlation value derived by the correlation derivation unit for each of the N frames which are inconsecutive; and
a judgment unit operable to make a judgment on plural pieces of sub information on a frame-by-frame basis based on an integrated value determined by the integration unit, and
the displacement detection unit regards sub information as the M-bit sub information detected from the N frames, the sub information having a largest number of sub information identical to said sub information, out of the plural pieces of sub information on which the judgment is made by the judgment unit.

45. An optical disc on which sub information is superimposed by displacing an edge of an optically-readable recording mark by a minute amount on the basis of a binary sequence code, when recording main information by forming said recording mark, the optical disc comprising the following edges formed on said disc:
a first edge which is displaced on the basis of a first binary sequence code; and
a second edge which is displaced on the basis of a second binary sequence code that is different from the first binary sequence code, wherein the main information is divided and recorded in a plurality of consecutive frames, and the first and second edges are displaced so that M-bit (M is a natural number) sub information is superimposed on N (N is a natural number) of the frames.

46. The optical disc according to claim 45, wherein the first and second edges are displaced so that the M-bit sub information is superimposed on the N frames which are consecutive.

47. The optical disc according to claim 46, wherein the first edge is formed in any one of the plurality of frames, and the second edge is formed in another one of the plurality of frames.

48. The optical disc according to claim 47, wherein the first and second binary sequence codes are M sequence codes.

49. The optical disc according to claim 48, wherein initial values of the first and second binary sequence codes are different from each other.

50. The optical disc according to claim 49, wherein the initial value of the second binary sequence code is derived by performing an operation on the basis of the initial values of the first binary sequence code.

51. The optical disc according to claim 48, wherein generating polynomials for generating the first and second binary sequence codes are different from each other.

52. The optical disc according to claim 45, wherein the first and second edges are displaced so that identical M-bit sub information is superimposed on each of the N frames which are inconsecutive.

53. The optical disc according to claim 52, wherein the first and second edges are displaced so that K-bit (K is a natural number) sub information is superimposed on each of the consecutive frames every M bit and the N frames are apart from each other by K/M frames.

54. The optical disc according to claim 53, wherein the K/M is 32.

55. An optical disc recording method for superimposing sub information by displacing an edge of an optically-readable recording mark by a minute amount on the basis of a binary sequence code, when recording main information by forming said recording mark, the optical disc recording method comprising:

a main information division step of dividing the main information into a plurality of consecutive frames; and a displacement step of displacing the edge so that identical M-bit (M is a natural number) sub information is superimposed on each of N (N is a natural number) of the frames which are inconsecutive.

56. The optical disc recording method according to claim 55, wherein, in the displacement step, the edge is displaced so that K-bit (K is a natural number) sub information is superimposed on each of the consecutive frames every M bit and the N frames are apart from each other by K/M frames.

57. The optical disc recording method according to claim 56, wherein the K/M is 32.

58. An optical disc reproduction method for reproducing main information and sub information from an optical disc on which said sub information is superimposed by displacing an edge of an optically-readable recording mark by a minute amount on the basis of a binary sequence code, when recording said main information by forming said recording mark, the optical disc reproduction method comprising:

a sequence generation step of generating the binary sequence code; and a detection step of detecting M-bit (M is a natural number) sub information from any one of or all of N (N is a natural number) of the frames which are inconsecutive based on the binary sequence code.

59. The optical disc reproduction method according to claim 58, wherein, in the detection step, K-bit (K is a natural number) sub information is detected from each of the consecutive frames every M bit, and sub information is detected from any one of the N frames that are apart from each other by K/M frames, the sub information being identical to sub information superimposed on another frame out of the N frames.

60. The optical disc reproduction method according to claim 59, wherein the K/M is 32.

61. The optical disc reproduction method according to claim 60, wherein the detection step includes the following steps:

a displacement detection step of detecting a displacement of the edge;

a correlation derivation step of deriving a correlation value based on the displacement detected in the displacement detection step and the binary sequence code generated in the sequence generation step; and an integration step of integrating each correlation value derived in the correlation derivation step for the N frames which are inconsecutive, wherein the m-bit sub information is detected on the basis of an integrated value determined in the integration step.

62. The optical disc reproduction method according to claim 60, wherein the detection step includes the following steps:

a displacement detection step of detecting a displacement of the edge;

a correlation derivation step of deriving a correlation value based on the displacement detected in the displacement detection step and the binary sequence code generated in the sequence generation step;

an integration step of integrating each correlation value derived in the correlation derivation step for each of the N frames which are inconsecutive; and a judgment step of making a judgment on plural pieces of sub information on a frame-by-frame basis based on an integrated value determined in the integration step, wherein sub information is regarded as the M-bit sub information detected from the N frames, the sub information having a largest number of sub information identical to said sub information, out of the plural pieces of sub information on which the judgment is made in the judgment step.

63. An optical disc recording apparatus for superimposing sub information by displacing an edge of an optically-readable recording mark by a minute amount on the basis of a binary sequence code, when recording main information by forming said recording mark, the optical disc recording apparatus comprising:

a main information division unit operable to divide the main information into a plurality of consecutive frames; and a displacement unit operable to displace the edge so that identical M-bit (M is a natural number) sub information is superimposed on each of N (N is a natural number) of the frames which are inconsecutive.

64. The optical disc recording apparatus according to claim 63,
wherein the displacement unit displaces the edge so that K-bit (K is a natural number) sub information is superimposed on each of the consecutive frames every M bit and the N frames are apart from each other by K/M frames.

65. The optical disc recording apparatus according to claim 64,
wherein the K/M is 32.

66. An optical disc reproduction apparatus for reproducing main information and sub information from an optical disc on which said sub information is superimposed by displacing an edge of an optically-readable recording mark by a minute amount on the basis of a binary sequence code, when recording said main information by forming said recording mark, the optical disc reproduction apparatus comprising:
a sequence generation unit operable to generate the binary sequence code; and
a detection unit operable to detect M-bit (M is a natural number) sub information from any one of or all of N (N is a natural number) of the frames which are inconsecutive based on the binary sequence code.

67. The optical disc reproduction apparatus according to claim 66,
wherein the detection unit detects K-bit (K is a natural number) sub information from each of the consecutive frames every M bit, and detects sub information from any one of the N frames that are apart from each other by K/M frames, the sub information being identical to sub information superimposed on another frame out of the N frames.

68. The optical disc reproduction apparatus according to claim 67,
wherein the K/M is 32.

69. The optical disc reproduction apparatus according to claim 68,
wherein the detection unit includes:
a displacement detection unit operable to detect a displacement of the edge;
a correlation derivation unit operable to derive a correlation value based on the displacement detected by the displacement detection unit and the binary sequence code generated by the sequence generation unit; and
an integration unit operable to integrate each correlation value derived by the correlation derivation unit for the N frames which are inconsecutive, and
the detection unit detects the M-bit sub information on the basis of an integrated value determined by the integration unit.

70. The optical disc reproduction apparatus according to claim 68,
wherein the detection unit includes:
a displacement detection unit operable to detect a displacement of the edge;
a correlation derivation unit operable to derive a correlation value based on the displacement detected by the displacement detection unit and the binary sequence code generated by the sequence generation unit;
an integration unit operable to integrate each correlation value derived by the correlation derivation unit for each of the N frames which are inconsecutive; and
a judgment unit operable to make a judgment on plural pieces of sub information on a frame-by-frame basis based on an integrated value determined by the integration unit, and
the detection unit regards sub information as the M-bit sub information detected from the N frames, the sub information having a largest number of sub information identical to said sub information, out of the plural pieces of sub information on which the judgment is made by the judgment unit.

71. An optical disc on which sub information is superimposed by displacing an edge of an optically-readable recording mark by a minute amount on the basis of a binary sequence code, when recording main information by forming said recording mark,
wherein the main information is divided and recorded in a plurality of consecutive frames, and
the edge is formed on said optical disc, the edge being displaced so that identical M-bit (M is a natural number) sub information is superimposed on each of N (N is a natural number) of the frames which are inconsecutive.

72. The optical disc according to claim 71,
wherein the edge is displaced so that K-bit (K is a natural number) sub information is superimposed on each of the consecutive frames every M bit and the N frames are apart from each other by K/M frames.

73. The optical disc according to claim 72,
wherein the K/M is 32.

* * * * *